US012801842B2

(12) United States Patent
Kosslyn et al.

(10) Patent No.: US 12,801,842 B2
(45) Date of Patent: *Nov. 17, 2026

(54) INFRASTRUCTURE FOR INTERFACING WITH A GENERATIVE MODEL FOR CONTENT EVALUATION AND CUSTOMIZATION

(71) Applicant: Google LLC, Mountain View, CA (US)

(72) Inventors: Justin Lewis Kosslyn, New York, NY (US); Mathias Jean René Sallé, Mountain View, CA (US); Subodh Gupta, Mountain View, CA (US)

(73) Assignee: GOOGLE LLC, Mountain View, CA (US)

(*) Notice: Subject to any disclaimer, the term of this patent is extended or adjusted under 35 U.S.C. 154(b) by 92 days.

This patent is subject to a terminal disclaimer.

(21) Appl. No.: 18/625,861

(22) Filed: Apr. 3, 2024

(65) Prior Publication Data

US 2025/0315609 A1 Oct. 9, 2025

(51) Int. Cl.
*G06F 40/20* (2020.01)
*G06F 40/56* (2020.01)

(52) U.S. Cl.
CPC .................................... *G06F 40/20* (2020.01)

(58) Field of Classification Search
CPC ................................ G06F 40/20; G06F 40/56
USPC .......................................... 704/231–232, 251
See application file for complete search history.

(56) References Cited

FOREIGN PATENT DOCUMENTS

| | | | |
|---|---|---|---|
| CN | 107193805 | 9/2017 | |
| CN | 107193805 A * | 9/2017 | ....... G06V 30/19147 |

* cited by examiner

*Primary Examiner* — George C Monikang
(74) *Attorney, Agent, or Firm* — DORITY & MANNING, P.A.

(57) ABSTRACT

Systems and methods for domain-specific model-generated content item generation, evaluation, and selection can include generating a plurality of candidate model-generated content items that can then be evaluated based on one or more signals, which can then be leveraged for candidate model-generated content item selection. The plurality of candidate model-generated content items can be generated with a generative model that was tuned for domain-specific content item generation. The selected model-generated content item can be processed to generate an outline that may then be provided to a user for user interaction to generate an augmented outline. The augmented outline may then be processed to generate an updated model-generated content item.

18 Claims, 33 Drawing Sheets

200

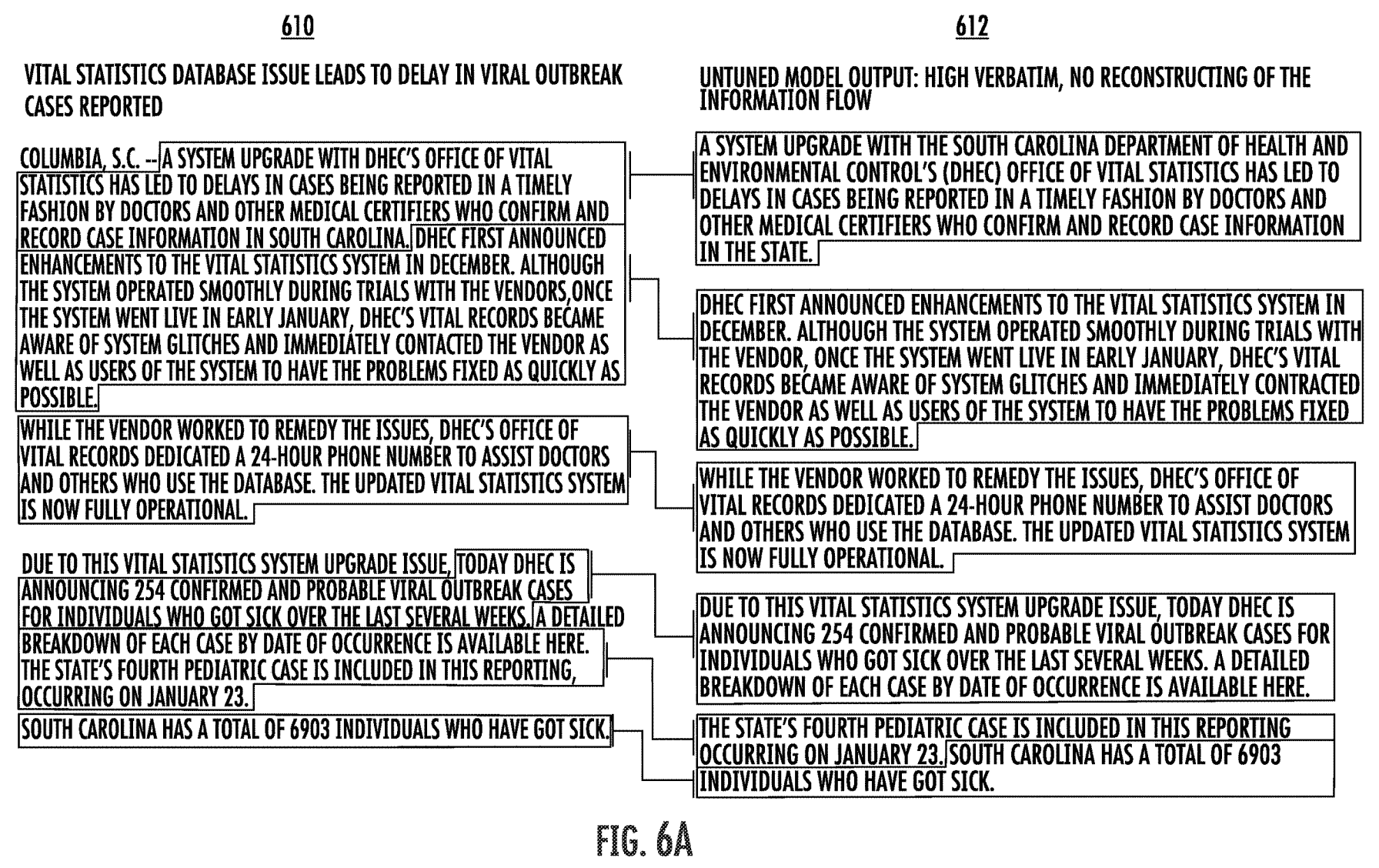

610

VITAL STATISTICS DATABASE ISSUE LEADS TO DELAY IN VIRAL OUTBREAK CASES REPORTED

COLUMBIA, S.C. --A SYSTEM UPGRADE WITH DHEC'S OFFICE OF VITAL STATISTICS HAS LED TO DELAYS IN CASES BEING REPORTED IN A TIMELY FASHION BY DOCTORS AND OTHER MEDICAL CERTIFIERS WHO CONFIRM AND RECORD CASE INFORMATION IN SOUTH CAROLINA. DHEC FIRST ANNOUNCED ENHANCEMENTS TO THE VITAL STATISTICS SYSTEM IN DECEMBER. ALTHOUGH THE SYSTEM OPERATED SMOOTHLY DURING TRIALS WITH THE VENDORS,ONCE THE SYSTEM WENT LIVE IN EARLY JANUARY, DHEC'S VITAL RECORDS BECAME AWARE OF SYSTEM GLITCHES AND IMMEDIATELY CONTACTED THE VENDOR AS WELL AS USERS OF THE SYSTEM TO HAVE THE PROBLEMS FIXED AS QUICKLY AS POSSIBLE.

WHILE THE VENDOR WORKED TO REMEDY THE ISSUES, DHEC'S OFFICE OF VITAL RECORDS DEDICATED A 24-HOUR PHONE NUMBER TO ASSIST DOCTORS AND OTHERS WHO USE THE DATABASE. THE UPDATED VITAL STATISTICS SYSTEM IS NOW FULLY OPERATIONAL.

DUE TO THIS VITAL STATISTICS SYSTEM UPGRADE ISSUE, TODAY DHEC IS ANNOUNCING 254 CONFIRMED AND PROBABLE VIRAL OUTBREAK CASES FOR INDIVIDUALS WHO GOT SICK OVER THE LAST SEVERAL WEEKS. A DETAILED BREAKDOWN OF EACH CASE BY DATE OF OCCURRENCE IS AVAILABLE HERE. THE STATE'S FOURTH PEDIATRIC CASE IS INCLUDED IN THIS REPORTING, OCCURRING ON JANUARY 23.

SOUTH CAROLINA HAS A TOTAL OF 6903 INDIVIDUALS WHO HAVE GOT SICK.

612

UNTUNED MODEL OUTPUT: HIGH VERBATIM, NO RECONSTRUCTING OF THE INFORMATION FLOW

A SYSTEM UPGRADE WITH THE SOUTH CAROLINA DEPARTMENT OF HEALTH AND ENVIRONMENTAL CONTROL'S (DHEC) OFFICE OF VITAL STATISTICS HAS LED TO DELAYS IN CASES BEING REPORTED IN A TIMELY FASHION BY DOCTORS AND OTHER MEDICAL CERTIFIERS WHO CONFIRM AND RECORD CASE INFORMATION IN THE STATE.

DHEC FIRST ANNOUNCED ENHANCEMENTS TO THE VITAL STATISTICS SYSTEM IN DECEMBER. ALTHOUGH THE SYSTEM OPERATED SMOOTHLY DURING TRIALS WITH THE VENDOR, ONCE THE SYSTEM WENT LIVE IN EARLY JANUARY, DHEC'S VITAL RECORDS BECAME AWARE OF SYSTEM GLITCHES AND IMMEDIATELY CONTRACTED THE VENDOR AS WELL AS USERS OF THE SYSTEM TO HAVE THE PROBLEMS FIXED AS QUICKLY AS POSSIBLE.

WHILE THE VENDOR WORKED TO REMEDY THE ISSUES, DHEC'S OFFICE OF VITAL RECORDS DEDICATED A 24-HOUR PHONE NUMBER TO ASSIST DOCTORS AND OTHERS WHO USE THE DATABASE. THE UPDATED VITAL STATISTICS SYSTEM IS NOW FULLY OPERATIONAL.

DUE TO THIS VITAL STATISTICS SYSTEM UPGRADE ISSUE, TODAY DHEC IS ANNOUNCING 254 CONFIRMED AND PROBABLE VIRAL OUTBREAK CASES FOR INDIVIDUALS WHO GOT SICK OVER THE LAST SEVERAL WEEKS. A DETAILED BREAKDOWN OF EACH CASE BY DATE OF OCCURRENCE IS AVAILABLE HERE.

THE STATE'S FOURTH PEDIATRIC CASE IS INCLUDED IN THIS REPORTING OCCURRING ON JANUARY 23. SOUTH CAROLINA HAS A TOTAL OF 6903 INDIVIDUALS WHO HAVE GOT SICK.

FIG. 6A

610

VITAL STATISTICS DATABASE ISSUE LEADS TO DELAY IN VIRAL OUTBREAK CASES REPORTED

COLUMBIA, S.C. --A SYSTEM UPGRADE WITH DHEC'S OFFICE OF VITAL STATISTICS HAS LED TO DELAYS IN CASES BEING REPORTED IN A TIMELY FASHION BY DOCTORS AND OTHER MEDICAL CERTIFIERS WHO CONFIRM AND RECORD CASE INFORMATION IN SOUTH CAROLINA. FIRST ANNOUNCED ENHANCEMENTS TO THE VITAL STATISTICS SYSTEM IN DECEMBER. ALTHOUGH THE SYSTEM OPERATED SMOOTHLY DURING TRIALS WITH THE VENDORS,ONCE THE SYSTEM WENT LIVE IN EARLY JANUARY, DHEC'S VITAL RECORDS BECAME AWARE OF SYSTEM GLITCHES AND IMMEDIANTLY CONTACTED THE VENDOR AS WELL AS USERS OF THE SYSTEM TO HAVE THE PROBLEMS FIXED AS QUICKLY AS POSSIBLE.

WHILE THE VENDOR WORKED TO REMEDY THE ISSUES, DHEC'S OFFICE OF VITAL RECORDS DEDICATED A 24-HOUR PHONE NUMBER TO ASSIST DOCTORS AND OTHERS WHO USE THE DATABASE. THE UPDATED VITAL STATISTICS SYSTEM IS NOW FULLY OPERATIONAL.

DUE TO THIS VITAL STATISTICS SYSTEM UPGRADE ISSUE, TODAY DHEC IS ANNOUNCING 254 CONFIRMED AND PROBABLE VIRAL OUTBREAK CASES FOR INDIVIDUALS WHO DIED OVER THE LAST SEVERAL WEEKS. A DETAILED BREAKDOWN OF EACH CASE BY DATE OF OCCURENCE IS AVAILABLE HERE. THE STATE'S FOURTH PEDIATRIC CASE IS INCLUDED IN THIS REPORTING, OCCURRING ON JANUARY 23.

SOUTH CAROLINA HAS A TOTAL OF 6903 INDIVIDUALS WHO HAVE GOT SICK.

614

REWRITE: FROM THE UNTUNED MODEL OUTPUT RESULTS, A TRAINED JOURNALISTS CHANGED THE FLOW: E.G. MOVED THE CONFIRMED CASES INTO THE LEDE.

THE CITY OF COLUMBIA CONFIRMED TODAY THAT 254 INDIVIDUALS EITHER GOT SICK OR PROBABLY DIED FROM VIRAL INFECTION OVER THE LAST SEVERAL WEEKS.

THE STATISTICS WERE ANNOUNCED AFTER DELAYS DUE TO AN ERROR IN A SYSTEM UPGRADE AT THE SOUTH CAROLINA DEPARTMENT OF HEALTH AND ENVIRONMENTAL CONTROL (DHEC).

DHEC FIRST ANNOUNCED A SYSTEM UPGRADE IN DECEMBER AND WHILE IT OPERATED WITHOUT ERRORS DURING THE TEST PHASE WITH THE VENDOR, IT PRESENTED GLITCHES WHEN IT WENT LIVE IN EARLY JANUARY. IN A PRESS RELEASE, THE DHEC INFORMED THAT THEY "IMMEDIATELY CONTACTED THE VENDOR AS WELL AS USERS OF THE SYSTEM TO HAVE THE PROBLEMS FIXED AS QUICKLY AS POSSIBLE."

WHILE THE OFFICE FIXED THE SYSTEM, DHEC DEDICATED A 24-HOUR PHONE NUMBER TO ASSIST DOCTORS AND OTHERS WHO USE THE DATABASE. "THE UPDATED VITAL STATISTICS SYSTEM IS NOE FULLY OPERATIONAL", READS THE PRESS STATEMENT.

A DETAILED BREAKDOWN OF EACH CASE BY DATE OF OCCURRENCE CAN BE ACCESSED ON THE OFFICE'S WEBSITE. IT INCLUDES THE STATE'S FOURTH PEDIATRIC CASE, WHICH OCCURRED ON JANUARY 23RD.

SOUTH CAROLINA HAS A TOTAL OF 6,903 INDIVIDUALS WHO HAVE GOT SICK.

FIG. 6B

610

VITAL STATISTICS DATABASE ISSUE LEADS TO DELAY IN VIRAL INFECTION CASES REPORTED

COLUMBIA, S.C. -- A SYSTEM UPGRADE WITH DHEC'S OFFICE OF VITAL STATISTICS HAS LED TO DELAYS IN CASES BEING REPORTED IN A TIMELY FASHION BY DOCTORS AND OTHER MEDICAL CERTIFIERS WHO CONFIRM AND RECORD CASE INFORMATION IN SOUTH CAROLINA. DHEC FIRST ANNOUNCED ENHANCEMENTS TO THE VITAL STATISTICS SYSTEM IN DECEMBER. ALTHOUGH THE SYSTEM OPERATED SMOOTHLY DURING TRIALS WITH THE VENDORS,ONCE THE SYSTEM WENT LIVE IN EARLY JANUARY, DHEC'S VITAL RECORDS BECAME AWARE OF SYSTEM GLITCHES AND IMMEDIATELY CONTACTED THE VENDOR AS WELL AS USERS OF THE SYSTEM TO HAVE THE PROBLEMS FIXED AS QUICKLY AS POSSIBLE.

WHILE THE VENDOR WORKED TO REMEDY THE ISSUES, DHEC'S OFFICE OF VITAL RECORDS DEDICATED A 24-HOUR PHONE NUMBER TO ASSIST DOCTORS AND OTHERS WHO USE THE DATABASE. THE UPDATED VITAL STATISTICS SYSTEM IS NOW FULLY OPERATIONAL.

DUE TO THIS VITAL STATISTICS SYSTEM UPGRADE ISSUE, TODAY DHEC IS ANNOUNCING 254 CONFIRMED AND PROBABLE VIRAL INFECTION CASES FOR INDIVIDUALS WHO GOT SICK OVER THE LAST SEVERAL WEEKS. A DETAILED BREAKDOWN OF EACH CASE BY DATE OF OCCURRENCE IS AVAILABLE HERE. THE STATE'S FOURTH PEDIATRIC CASE IS INCLUDED IN THIS REPORTING, OCCURRING ON JANUARY 23.

SOUTH CAROLINA HAS A TOTAL OF 6903 INDIVIDUALS WHO GOT SICK.

616

PROMPT RESULT: THE FINE-TUNED MODEL ALSO DETECTS THAT THE CONFIRMED CASES BELONGS IN THE LEDE; REDUCES VERBATIM

THERE WERE 254 CONFIRMED AND PROBABLE VIRAL INFECTION CASES REPORTED BY DHEC THURSDAY, WITH THE DEPARTMENT SAYING A TECHNICAL GLITCH DELAYED THE REPORTING OF THE CASES OVER THE PAST SEVERAL WEEKS.

THE TECHNICAL GLITCH WAS THE RESULT OF AN UPGRADE TO DHEC'S OFFICE OF VITAL STATISTICS DATABASE, WHICH IS USED BY DOCTORS AND MEDICAL CERTIFIERS TO RECORD CASE INFORMATION, THE DEPARTMENT SAID. THE UPGRADE WAS FIRST ANNOUNCED IN DECEMBER, WITH DHEC SAYING THE SYSTEM OPERATED SMOOTHLY DURING TRIALS WITH THE VENDOR BUT ONCE THE SYSTEM WENT LIVE EARLY IN JANUARY, THEY BECAME AWARE OF GLITCHES.

THE SYSTEM IS NOW FULLY OPERATIONAL, ACCORDING TO DHEC, BUT THE DEPARTMENT SAID THE VENDOR WORKED ON A REMEDY WHILE DHEC DEDICATED A 24-HOUR PHONE NUMBER TO ASSIST DOCTORS AND OTHERS IN USING THE DATABASE. AS A RESULT OF THE DELAY, DHEC SAID THURSDAY'S REPORT INCLUDES THE STATE'S FOURTH PEDIATRIC CASE, WHICH OCCURRED JANUARY 23.

THE TOTAL NUMBER OF VIRAL INFECTION CASES IN SOUTH CAROLINA IS NOW 6,903.

FIG. 6C

1250

HEADER 1252

DAILY UPDATE - MONDAY JUN 24, 2023

MESSAGE FROM THE EDITOR 1254

HEY THERE, CITY NEWS READERS! WE'VE GOT THE LATEST UPDATES FOR JUNE 24TH, 2023. GET READY FOR AN AWESOME DAY WITH PLENTY OF SUNSHINE AND A REFRESHING BREEZE. THE TEMPERATURE IS SET TO REACH A DELIGHTFUL 80 DEGREES. AND GUESS WHAT? WE'VE GOT BREAKING NEWS ON A NEW WILD LAND FIRE BURNING EAST OF SNOW-CITY. STAY TUNED AS WE DIG INTO THE DETAILS AND KEEP YOU IN THE LOOP.

CURATED LIST OF STORIES: IMAGE HEADLINE SUMMARY HYPERLINK 1256

TOP STORIES

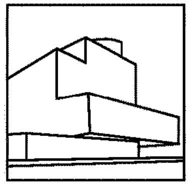

CITY COUNCIL APPROVES NEW DEVELOPMENT PROJECT
THE CITY COUNCIL APPROVED A NEW DEVELOPMENT PROJECT THAT WILL BRING HUNDREDS OF NEW JOBS AND MILLIONS OF DOLLARS IN INVESTMENT TO THE CITY. SEE HOW THE PROJECT WILL IMPACT THE COMMUNITY.
READ MORE

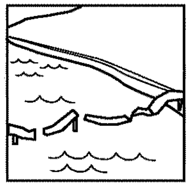

THE LIBERTY BRIDGE COLLAPSED OVERNIGHT, NO CASUALTIES.
THE LIBERTY BRIDE COLLAPSED OVERNIGHT, BUT THERE WERE NO CASUALTIES. THE CAUSE OF THE COLLAPSE IS STILL UNDER INVESTIGATION.
READ MORE

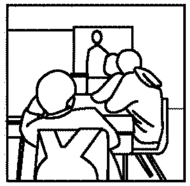

NEW SCHOOL PROGRAM AIMS TO REDUCE CRIME
A NEW SCHOOL PROGRAM IS AIMING TO REDUCE CRIME BY TEACHING STUDENTS ABOUT THE CONSEQUENCES OF THEIR ACTIONS AND HOW TO MAKE BETTER CHOICES. GET THE FULL STORY ON HOW THE PROGRAM IS WORKING.
READ MORE

FIG. 12B

1400

1402

THE MINISTRY OF NATURAL RESOURCES AND FORESTRY HAS IMPLEMENTED A PROHIBITION ON OPEN-AIR BURNING IN THE MUNICIPALITY OF SAULT STE. MARIE. THIS PROHIBITON WILL REMAIN IN EFFECT UNTIL FURTHER NOTICE. CONSEQUENTLY, FIRE SERVICES WILL NOT BE GRANTING OR ISSUING PERMITS DURING THIS PERIOD.

ANY INDIVIDUAL FOUND ENGAGING IN BURNING ACTIVITIES DURING THE BAN WILL BE LIABLE TO FACE PENALTIES. FURTHERMORE, THE CITY WOULD LIKE TO REMIND RESIDENTS TO PRIORITIES THEIR SAFETY AND ADHERE TO THE HEALTH RECOMMENDATIONS PROVIDED BY ALGOMA PUBLIC HEALTH.

1404

THE MINISTRY OF NATURAL RESOURCES AND FORESTRY HAS IMPLEMENTED A FIRE BAN ACROSS SAULT STE. MARIE AND SURROUNDING AREAS, AND IT WILL REMAIN IN EFFECT UNTIL FURTHER NOTICE. " CONSEQUENTLY, FIRE SERVICES WILL NOT BE GRANTING OR ISSUING PERMITS DURING THIS PERIOD," THE STATEMENT CONTINUES. ANY INDIVIDUAL FOUND ENGAGING IN BURNING ACTIVITIES DURING THE BAN WILL BE LIABLE TO FACE PENALTIES. THE CITY OF SAULT ST. MARIE ALSO MENTIONED A REMINDER TO KEEP SAFE AND REVIEW THE HEALTH TIPS ALGOMA PUBLIC HEALTH HAS PROVIDED. ALGOMA PUBLIC HEALTH HAS RECOMMENDED THAT TURNING ON YOUR SPRINKLER OUTSIDE AND RUNNING THROUGH IT HOURLY TO KEEP YOUR SKIN COOL.

VERBATIM

FIG. 14

INFRASTRUCTURE FOR INTERFACING WITH A GENERATIVE MODEL FOR CONTENT EVALUATION AND CUSTOMIZATION

FIELD

The present disclosure relates generally to model-generated content item generation infrastructure. More particularly, the present disclosure relates to generating a plurality of candidate model-generated content items, evaluating the plurality of candidate model-generated content items, and selecting a particular candidate model-generated content item based on the evaluation datasets.

BACKGROUND

Specific fields of expertise can have different structures, terminology, and/or other attributes. The different domains may differ in style, length, syntax, vocabulary, and/or other features. Creation of content items within the different domains can be time consuming, require a level of expertise, and/or labor intensive.

Large language models can be utilized for realistic generation of a natural language content, which can be trained on large training datasets including diverse language instances. However, the generated language outputs may fail to meet domain-specific requirements, which may cause issues with readability, reliability, trust, and/or other quality metrics. Additionally, large language models may generate hallucinations that may include fabricated facts and/or sources.

SUMMARY

Aspects and advantages of embodiments of the present disclosure will be set forth in part in the following description, or can be learned from the description, or can be learned through practice of the embodiments.

One example aspect of the present disclosure is directed to a computing system for machine-learned model content generation. The system can include one or more processors and one or more non-transitory computer-readable media that collectively store instructions that, when executed by the one or more processors, cause the computing system to perform operations. The operations can include obtaining input data. The input data can include source content that comprises a set of details associated with a topic. The operations can include processing the input data with a generative model to generate a plurality of candidate model-generated news article drafts. The plurality of candidate model-generated news article drafts can be generated based on the source content. In some implementations, the generative model may have been tuned on a domain-specific training dataset comprising a plurality of news articles. In some implementations, the plurality of news articles can include a particular information structure and a particular set of publication type-specific stylistic characteristics. The operations can include evaluating, based on a plurality of signals, the plurality of candidate model-generated news article drafts to generate a plurality of respective evaluation datasets. Each of the plurality of respective evaluation datasets can be associated with a respective candidate model-generated news article draft of the plurality of candidate model-generated news article drafts. The operations can include selecting a particular candidate model-generated news article draft of the plurality of candidate model-generated news article drafts based on the plurality of respective evaluation datasets and providing the particular candidate model-generated news article draft as output.

In some implementations, the operations can include processing the input data to determine one or more particular generative models of a plurality of candidate generative models to process the source content with to generate the plurality of candidate model-generated news article drafts. The generative model can include the one or more particular generative models. The plurality of candidate generative models can include one or more generative language models and one or more image generation models. In some implementations, processing the input data to determine the one or more particular generative models of a plurality of candidate generative models can include determining a particular task associated with the input data and determining the one or more particular generative models of a plurality of candidate generative models are associated with the particular task.

In some implementations, selecting the particular candidate model-generated news article draft of the plurality of candidate model-generated news article drafts based on the plurality of respective evaluation datasets can include filtering, based on the plurality of respective evaluation datasets, the plurality of candidate model-generated news article drafts based on a plurality of thresholds associated with the plurality of signals. In some implementations, selecting the particular candidate model-generated news article draft of the plurality of candidate model-generated news article drafts based on the plurality of respective evaluation datasets can include comparing the plurality of respective evaluation datasets associated with the plurality of candidate model-generated news article drafts to generate a respective ranking for each of the plurality of candidate model-generated news article drafts and selecting the particular candidate model-generated news article draft of the plurality of candidate model-generated news article drafts based on the respective rankings.

In some implementations, the operations can include processing the particular candidate model-generated news article draft with the generative model to generate an outline of the particular candidate model-generated news article draft and providing the outline of the particular candidate model-generated news article draft for display. In some implementations, the operations can include obtaining an augmentation input associated with a request to augment the outline of the particular candidate model-generated news article draft, generating an augmented outline based on the augmentation input and the outline of the particular candidate model-generated news article draft, and providing the augmented outline for display. The operations can include processing the augmented outline with the generative model to generate an updated model-generated output and providing the updated model-generated output for display. The updated model-generated output can include an updated model-generated news article. In some implementations, the augmentation input can adjust a structure and one or more topic points of the outline of the particular candidate model-generated news article draft. The updated model-generated output and the particular candidate model-generated news article draft can include different structures. In some implementations, the updated model-generated output can include one or more additional sections associated with one or more additional topic points compared to the particular candidate model-generated news article draft.

Another example aspect of the present disclosure is directed to a computer-implemented method. The method can include obtaining, by a computing system including one or more processors, input data. The input data can include source content that includes a set of details associated with a topic. The method can include processing, by the computing system, the input data with a generative model to generate a plurality of candidate model-generated outputs. The plurality of candidate model-generated outputs can include a plurality of candidate model-generated news articles. The plurality of candidate model-generated outputs can be generated based on the source content. In some implementations, the generative model may have been tuned on a domain-specific training dataset associated with journalism. The domain-specific training dataset can include a plurality of news articles including a particular information structure and a particular set of publication type-specific stylistic characteristics. The method can include evaluating, by the computing system and based on a plurality of signals, the plurality of candidate model-generated outputs to generate a plurality of respective evaluation datasets. Each of the plurality of respective evaluation datasets can be associated with a respective candidate model-generated output of the plurality of respective evaluation datasets. The method can include determining, by the computing system and based on the plurality of respective evaluation datasets, a subset of the plurality of candidate model-generated outputs are associated with a subset of respective evaluation datasets that meet one or more signal thresholds. The method can include determining, by the computing system, a particular candidate model-generated output of the subset of the plurality of candidate model-generated outputs to provide as an output based on the subset of respective evaluation datasets.

In some implementations, the source content can include a press release associated with a particular topic. Each of the plurality of candidate model-generated outputs can include content associated with the particular topic. The plurality of candidate model-generated outputs can include at least a subset of the set of details from the press release. In some implementations, the plurality of signals can include a grounding signal. Each of the plurality of respective evaluation datasets can include a grounding metric descriptive of a level of factual grounding a respective candidate model generated output has. The level of factual grounding can be determined based on cross checking facts in the respective candidate model-generated output to facts in the source content.

In some implementations, the plurality of signals can include an attribution signal. Each of the plurality of respective evaluation datasets can include an attribution metric descriptive of a level of attribution a respective candidate model generated output has. The level of attribution can be determined based on determining a quality of attributions in the respective candidate model generated output associated with whether attributions are correctly included and whether the attributions cite a correct source. In some implementations, the plurality of signals can include a verbatim signal. Each of the plurality of respective evaluation datasets can include a verbatim metric descriptive of a level of verbatim matching a respective candidate model generated output has with the source content.

Another example aspect of the present disclosure is directed to one or more non-transitory computer-readable media that collectively store instructions that, when executed by one or more computing devices, cause the one or more computing devices to perform operations. The operations can include obtaining input data. The input data can include source content that comprises a set of details associated with a topic. The source content can include a press release and one or more interview transcripts. The operations can include processing the input data with a generative model to generate a plurality of candidate model-generated outputs. The plurality of candidate model-generated outputs can be generated based on the source content. The plurality of candidate model-generated outputs can include a plurality of candidate model-generated news articles. In some implementations, the generative model may have been tuned on a domain-specific training dataset associated with a particular field of expertise. The operations can include evaluating, based on a plurality of signals, the plurality of candidate model-generated outputs to generate a plurality of respective evaluation datasets. Each of the plurality of respective evaluation datasets can be associated with a respective candidate model-generated output of the plurality of respective evaluation datasets. The operations can include selecting a particular candidate model-generated output of the plurality of candidate model-generated outputs based on the plurality of respective evaluation datasets and processing the particular candidate model-generated output with the generative model to generate a model-generated outline descriptive of a structure and content within the particular candidate model-generated output. The particular candidate model-generated output can include a particular model-generated news article of the plurality of candidate model-generated news articles. The operations can include providing the model-generated outline as output.

In some implementations, an application programming interface can transmit the source content to the generative model, can obtain the plurality of candidate model-generated outputs, can transmit the plurality of candidate model-generated outputs to a ranking engine, can obtain the particular candidate model-generated output, and can transmits the particular candidate model-generated output to the generative model to generate the model-generated outline. In some implementations, the generative model can include a pre-trained generative model that was tuned on the domain-specific training dataset after an initial training.

In some implementations, processing the input data with the generative model to generate the plurality of candidate model-generated outputs can include obtaining a set of tunable parameters associated with a particular user. The set of tunable parameters may have been tuned on a plurality of user-generated content items. Processing the input data with the generative model to generate the plurality of candidate model-generated outputs can include processing the input data and the set of tunable parameters with the generative model to generate the plurality of candidate model-generated outputs.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which:

FIG. 6A depicts an illustration of an example pre-tuned content generation according to example embodiments of the present disclosure.

FIG. 6B depicts an illustration of an example journalist rewrite according to example embodiments of the present disclosure.

FIG. 6C depicts an illustration of an example tuned domain-specific content generation according to example embodiments of the present disclosure.

FIG. 12B depicts an illustration of an example newsletter according to example embodiments of the present disclosure.

FIG. 14 depicts an illustration of an example mark-up interface according to example embodiments of the present disclosure.

Figure 1:
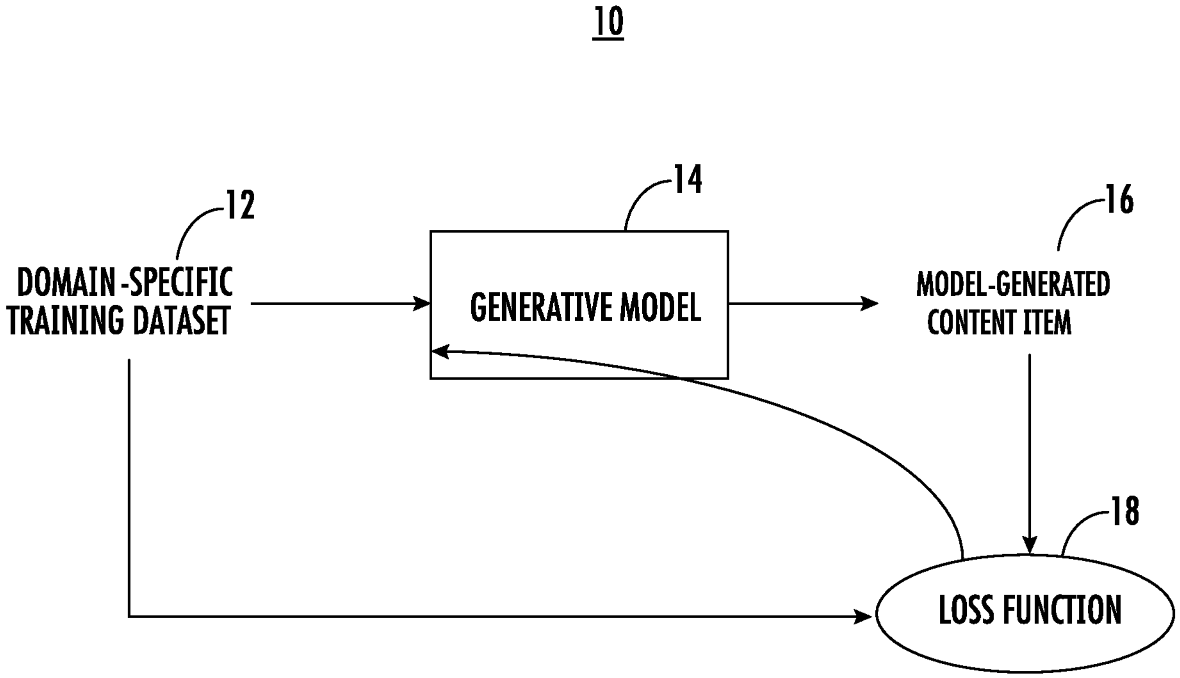
FIG. 1 depicts a block diagram of an example generative model tuning system according to example embodiments of the present disclosure.

Reference numerals that are repeated across plural figures are intended to identify the same features in various implementations.

DETAILED DESCRIPTION

Generally, the present disclosure is directed to a serving infrastructure for facilitating the generation and selection of model-generated content items. In particular, the serving infrastructure disclosed herein can leverage request handling, candidate model-generated content item generation, signal-based evaluation, candidate model-generated content item filtering, and/or candidate model-generated content item ranking to determine a particular candidate model-generated content item to utilize. The particular candidate model-generated content item can then be processed to generate an outline for the particular candidate model-generated content item. The outline may then be provided to the user. An augmentation input from the user can then be received, which may then be utilized to generate an augmented outline. The augmented outline may then be processed with the generative model to generate an updated model-generated content item.

The systems and methods can include obtaining input data, which may include source content. The source content can include a set of details to be included in the content item generation. The source content can include a press release, a fact pattern, experimental result results, and/or other detail sets. The input data can be processed with one or more generative models to generate a plurality of candidate model-generated content items. The one or more generative models may be tuned for domain-specific content generation (e.g., news article generation, newsletter generation, academic paper generation, etc.). The plurality of candidate model-generated content items can be evaluated based on a plurality of signals (e.g., the appropriateness of content, the factual grounding, the length, correctness of recitation, attribution properness, level of verbatim usage, and/or other signals of the model-generated content item) to generate a plurality of respective evaluation datasets. A particular candidate model-generated content item can then be selected based on the plurality of respective evaluation datasets. The selection may include filtering the candidate model-generated content items based on one or more evaluation value thresholds. The subset of candidate model-generated content items may then be ranked based on the respective evaluation datasets. The ranking can then be utilized for selection.

The particular candidate model-generated content item may be provided for display. Alternatively and/or additionally, the particular candidate model-generated content item can be processed to generate an outline of the particular candidate model-generated content item, which can then be provided for display in a graphical user interface. The graphical user interface can be configured to receive inputs from the user to augment the outline. The augmented outline may then be processed to generate an updated model-generated content item. The updated model-generated content item can then be provided as the output.

The serving infrastructure can be leveraged to determine and/or facilitate the generation of candidate domain-specific content items that can be evaluated to determine a particular domain-specific content item to provide to a user. The particular domain-specific content item may be provided to the user; however, an outline of the particular domain-specific content item may be more manageable for the user to review and/or interact with to update the topics, subtopics, and/or order of the model-generated content item.

A domain-specific generative model system can be utilized by news publishers (e.g., local and/or regional newspapers) to quickly generate news articles from press releases, while maintaining journalistic style, terminology, and structure. The domain-specific generative model system may be leveraged for other domain-specific content generation (e.g., email campaigns, newsletters, speeches, marketing reports, etc.). A serving infrastructure can be utilized to evaluate and filter model-generated content items, generate outlines for user-evaluation and customization, and generate updated model-generated content items.

News articles and other specialized areas can have specific stylization, terminology, processes, and/or structure to their content items. Large language models can generate detailed content items; however, the content items may fail to have the domain-specific features. Additionally, different publishers may have varying styles, terminologies, and/or other signature features that may be lost via the use of traditional large language models. Moreover, large language models can suffer from hallucinations and may provide plagiarism concerns.

An infrastructure system can be implemented to interface with domain-specific generative models to obtain, filter, and rank model-generated content items to determine particular model-generated content items to provide to a user. Additionally, the system may include models for generating outlines and/or processing user-provided customization inputs. Application programming interfaces can be utilized for interfacing with generative models and user-facing platform features. Quality signals including abusive content signals, factual grounding signals, recitation signals, verbatim signals, attribution signals, and length signals can be determined for the candidate content items, which can then be leveraged for the filtering and/or ranking.

The infrastructure system can facilitate the content item generation, which can include filtering content items based on content attributes that are domain-specific. For example, length, attribution, and factual grounding thresholds may vary from domain to domain. Additionally, the system can be leveraged to determine which model and/or model-output to utilize for specific tasks based on output evaluations.

The domain-specific generative model can be trained on a domain-specific training dataset for domain-specific content generation. The domain-specific training dataset can include a plurality of domain-specific content items. The domain-specific training dataset and/or the user-specific training dataset can include a plurality of content items submitted by industry professionals as examples of their work in that domain. For example, journalists and/or the newspaper publishers may submit their articles to be utilized to tune the generative model and/or the soft prompt. Moreover, authors (e.g., journalists, academics, researchers, newsletter drafters, etc.) or assignees may publish their content items to one or more mediums and may select one or more preferences for how the content item is utilized, which may include preferences on whether the content item can be utilized for training and/or tuning generative models. Additionally and/or alternatively, the generative model and/or soft prompt tuning may be performed in a closed loop system. For example, the user and/or a closed network of users (e.g., via an encrypted network, an intranet, and/or other closed system) can generate a dataset of their domain-specific content items, which can then be utilized to tune parameters of a generative model and/or a soft prompt without disclosing the content items, the generative model, the soft prompt, and/or the tuning data outside of the closed network. In some implementations, organization(s) of experts in a particular field (e.g., experts in a particular domain) may aggregate their domain-specific content items to generate a domain-specific dataset for training and/or tuning. The domain-specific dataset can be generated based on explicit submission of the content items with the users providing consent for the utilization of their content items for training and/or tuning. The users can be provided with privileges that allow the user to withdraw their content items from the training dataset and/or tuning dataset upon request.

The systems and methods of the present disclosure provide a number of technical effects and benefits. As one example, the system and methods can be utilized to tune a generative model and/or guide generative model content item generation. In particular, the systems and methods disclosed herein can leverage a domain-specific training dataset and one or more evaluation signals to tune a pre-trained generative model for generating model-generated content items that include one or more domain-specific attributes. In particular, the model-generated content items can include drafts of news articles with a particular structure and/or terminology and may be generated by processing a press release.

Another example technical effect and benefit can include leveraging a serving infrastructure to select a particular candidate model-generated content item that may be provided for display to the user. Alternatively and/or additionally, the selected candidate model-generated content item may be further processed to generate an outline of the particular candidate model-generated content item, which can then be provided for display to the user. The serving infrastructure can include an application programming interface that is leveraged to facilitate the input data obtainment and transmittal along with obtaining a plurality of candidate model-generated content items that are then filtered and/or ranked for selection. The selection may be based on evaluating the candidate model-generated content items based on one or more evaluation signals to generate evaluation datasets that may then be leveraged for threshold based filtering and/or ranking.

Another example technical effect and benefit relates to improved computational efficiency and improvements in the functioning of a computing system. For example, a technical benefit of the systems and methods of the present disclosure is the ability to reduce the computational resources needed for training and/or tuning a generative model for generating high quality outputs for downstream tasks with domain-specific and user-specific attributes. In particular, the generative language model can be utilized to generate domain-specific content items that emulate styles, tones, and/or terminology identified as being user/publisher specific. In some implementations, the generative language model and/or one or more soft prompts (e.g., a set of machine-learned parameters that can be processed with the input by the generative language model) can be trained to emulate the tone, style, and/or vocabulary of a particular domain, a particular user, and/or a particular set of users (e.g., a publishing group).

With reference now to the Figures, example embodiments of the present disclosure will be discussed in further detail.

FIG. 1 depicts a block diagram of an example generative model tuning system 10 according to example embodiments of the present disclosure. In some implementations, the generative model tuning system 10 is configured to receive, and/or obtain, a domain-specific training dataset 12 that includes a plurality of input examples and a plurality of respective domain-specific content items and, as a result of receipt of the domain-specific training dataset 12, generate, determine, and/or provide a model-generated content item 16 that is utilized to evaluate a loss function 18 to tune one or more parameters of a generative model 14. Thus, in some implementations, the generative model tuning system 10 can include a generative model 14 that is operable to perform a plurality of predictions to generate a model-generated content item 16.

In particular, the generative model tuning system 10 can obtain a domain-specific training dataset 12. The domain-specific training dataset 12 can include a plurality of domain-specific content items. In some implementations, the plurality of domain-specific content items can include one or more domain-specific attributes associated with a particular field of expertise. The domain-specific training dataset 12 can include a plurality of respective input examples associated with the plurality of domain-specific content items. The plurality of domain-specific content items can include a plurality of new articles. The plurality of news articles may include one or more journalistic-specific attributes including the structure, the terminology, and factual pattern layout. In particular, the one or more domain-specific attributes can include an order of content, which may include a lede (i.e., lead) before the background information. The lede can summarize a key aspect of a story in an opening sentence and/or paragraph. The plurality of input examples can include a plurality of press releases (and/or enrichment materials (e.g., interview transcripts)) associated with the plurality of news articles. For example, the plurality of press releases (and/or the enrichment materials (e.g., interview transcripts)) can be a brief statement of facts on respective stories, and the plurality of news articles can include full length news articles that include at least a subset of the facts of the brief statements of facts on respective stories.

The plurality of respective input examples can include a plurality of example source content datasets. The plurality of example source content datasets can include a set of details that may be the basis for content generation. The plurality of example source content datasets may include press releases, interview transcripts, experimental data, blog posts, fact patterns, etc. The domain-specific training dataset 12 can be generated based on authors, industry professionals, and/or publishers submitting their domain-specific content items and their source content datasets.

The generative model tuning system 10 can process an input example (and/or another input prompt) with a generative model 14 to generate a model-generated content item 16. The generative model 14 can include a pre-trained generative language model that was pre-trained on a plurality of different natural language processing tasks. The input example may include a set of details associated with one or more topics. The model-generated content item 16 can include one or more particular attributes. Additionally and/or alternatively, the model-generated content item 16 can include a plurality of predicted word sequences that includes at least a subset of the set of details of the input example and a plurality of words predicted to be associated with the set of details and/or the one or more topics.

The generative model tuning system 10 can then evaluate a loss function 18 based at least in part on the model-generated content item 16 and a respective domain-specific content item associated with the input example. The loss function 18 may generate a gradient descent based on comparing the model-generated content item 16 and a respective domain-specific content item. In particular, the loss function 18 may include penalization terms based on differences between the one or more particular attributes (e.g., the style, structure, tone, and/or terminology of the model-generated content item 16) and the one or more domain-specific attributes (e.g., the style, structure, tone, and/or terminology of the domain-specific content item).

Additionally and/or alternatively, the loss function 18 may include penalization terms based on one or more signals associated with the model-generated content item 16. In some implementations, the loss function 18 can evaluate the accuracy of facts within the model-generated content item 16, the properness of source attribution, the likelihood of plagiarism, the length, the reasoning behind arguments (e.g., whether a theme and/or direction is backed by facts), and/or other signals.

One or more parameters of the generative model 14 can then be adjusted based on the loss function 18. For example, the gradient descent may be backpropagated to the generative model 14 to tune weights of the generative model 14 for domain-specific content generation. The process can be iteratively performed to tune the generative model 14 to generate content items that include the domain-specific attributes (e.g., to generate news articles with journalistic style, news article structure (e.g., beginning with a lede), active voice, and/or journalistic terminology).

Figure 2:
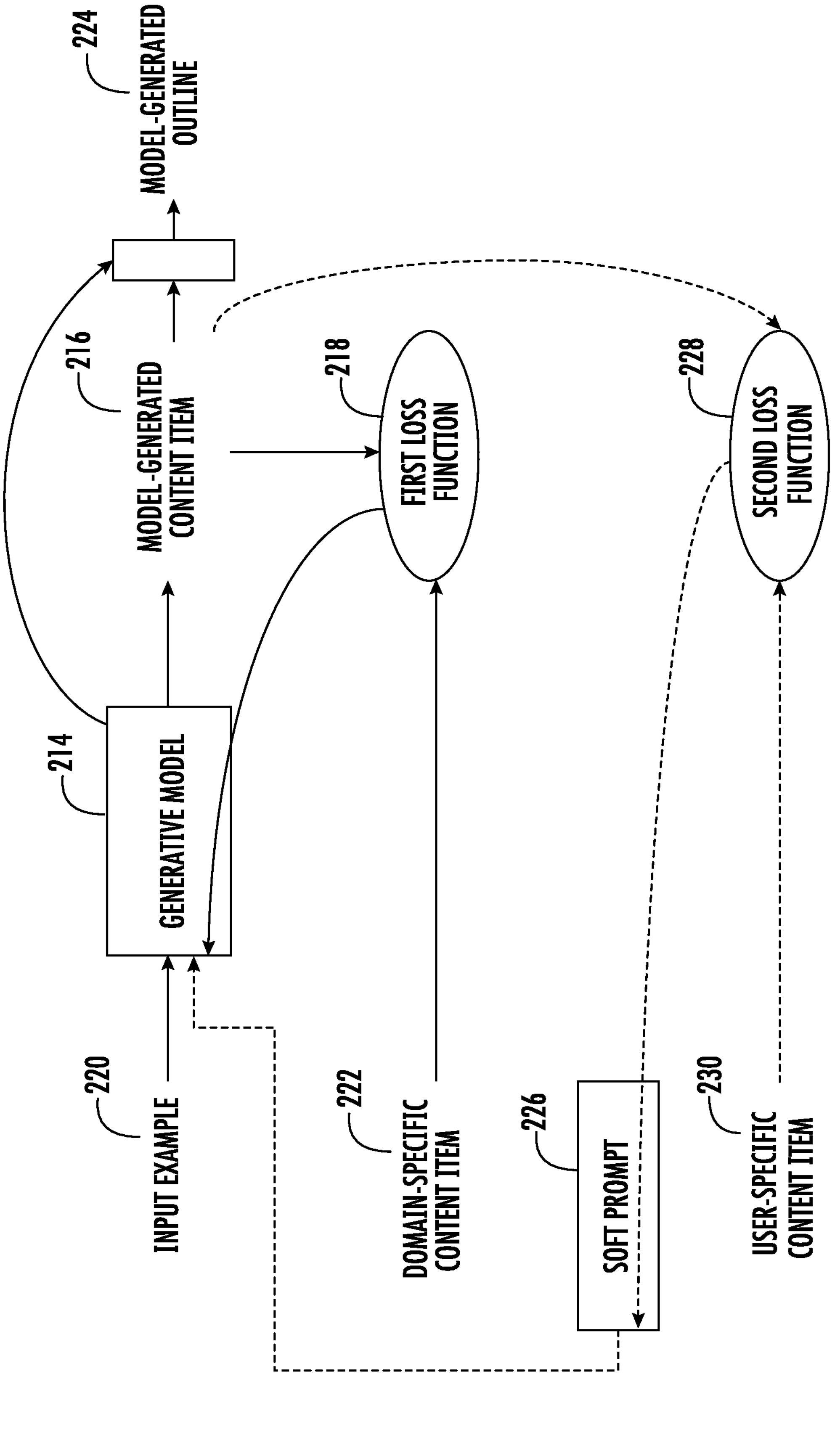
FIG. 2 depicts a block diagram of an example domain-specific tuning system according to example embodiments of the present disclosure.

FIG. 2 depicts a block diagram of an example domain-specific tuning system 200 according to example embodiments of the present disclosure. The domain-specific tuning system 200 is similar to the generative model tuning system 10 of FIG. 1 except that the domain-specific tuning system 200 further includes a soft-prompt 226 for user-specific content generation conditioning.

In particular, the domain-specific tuning system 200 can obtain a domain-specific training dataset. The domain-specific training dataset may be obtained from a domain-specific database. The domain-specific database can include content items explicitly submitted by content owners. The content items may have been created and/or curated by industry professionals. The domain-specific training dataset can include a plurality of domain-specific content items 222. In some implementations, the plurality of domain-specific content items 222 can include one or more domain-specific attributes associated with a particular field of expertise (e.g., news articles (i.e., journalism), research papers (i.e., academia), newsletters, emails, policy bills (i.e., politics)). The domain-specific training dataset can include a plurality of respective input examples 220 associated with the plurality of domain-specific content items 222. The plurality of domain-specific content items 222 can include a plurality of new articles (e.g., articles that provide factual information on a news event). The plurality of news articles may include one or more journalistic-specific attributes including the structure, the terminology, and factual pattern layout. In particular, the one or more domain-specific attributes can include an order of content, which may include a lede (i.e., lead) before the background information. The lede can summarize a key aspect of a story (e.g., the winner of a race, the outcome of a sporting event, the overall statistics on damage by a natural disaster, etc.) in an opening sentence and/or paragraph. The plurality of input examples 220 can include a plurality of press releases associated with the plurality of news articles. For example, the plurality of press releases can be a brief statements of facts on respective stories (e.g., statistics, context information including location and/or time, key individuals of note), and the plurality of news articles can include full length news articles that include at least a subset of the facts of the brief statements of facts on respective stories.

The plurality of respective input examples 220 can include a plurality of example source content datasets. The plurality of example source content datasets can include a set of details that may be the basis for content generation. The plurality of example source content datasets may include press releases, interview transcripts, experimental data, blog posts, fact patterns, speeches (e.g., the state of the union address), etc.

The domain-specific tuning system 200 can process an input example 220 with a generative model 214 to generate a model-generated content item 216. Alternatively and/or additionally, the generative model 214 may process an input prompt to generate the model-generated content item 216 (e.g., a model-generated draft of a news article). The input prompt may not be part of the domain-specific training dataset. The input prompt may include a real world source content example, a synthetic source content example, a freeform text prompt, and/or a few-shot example. The generative model 214 can include a pre-trained generative language model (e.g., a large language model) that was pre-trained on a plurality of different natural language processing tasks. The input example 220 may include a set of details associated with one or more topics (e.g., a story, a particular entity, a theory, etc.). The model-generated content item 216 can include one or more particular attributes (e.g., a particular style, a particular tone, a particular structure, a particular dialect, etc.). Additionally and/or alternatively, the model-generated content item 216 can include a plurality of predicted word sequences (e.g., predicted phrases, sentences, and/or paragraphs) that includes at least a subset of the set of details of the input example and a plurality of words predicted to be associated with the set of details and/or the one or more topics.

The domain-specific tuning system 200 can then evaluate a first loss function 218 based at least in part on the model-generated content item 216 and a respective domain-specific content item 222 associated with the input example 220. The first loss function 218 may generate a gradient descent based on comparing the model-generated content item 216 and a respective domain-specific content item 222. In particular, the first loss function 218 may include penalization terms based on differences between the one or more particular attributes (e.g., the style, structure, tone, and/or terminology of the model-generated content item 216) and the one or more domain-specific attributes (e.g., the style, structure, tone, and/or terminology of the domain-specific content item 222).

Additionally and/or alternatively, the first loss function 218 may include penalization terms based on one or more signals associated with the model-generated content item 16. In some implementations, the first loss function 218 can evaluate the accuracy of facts within the model-generated content item 216, the properness of source attribution, the likelihood of plagiarism, the length, the reasoning behind arguments (e.g., whether a theme and/or direction is backed by facts), and/or other signals. The first loss function 218 may include a plurality of loss terms and/or a plurality of loss functions.

One or more parameters of the generative model 214 can then be adjusted based on the first loss function 218. For example, the gradient descent may be backpropagated to the generative model 214 to tune weights of the generative model 214 for domain-specific content generation. The process can be iteratively performed to tune the generative model 214 to generate content items that include the domain-specific attributes (e.g., to generate news articles with journalistic style, news article structure (e.g., beginning with a lede), active voice, and/or journalistic terminology).

Additionally and/or alternatively, the domain-specific tuning system 200 may leverage one or more soft prompts 226 for conditioning the generative model 214 for domain-specific and/or user-specific content generation. In particular, the one or more soft prompts 226 can include a set of tunable parameters (and/or a set of tunable weights). The one or more soft prompts 226 can include computer-readable, machine-learned vector representations. The one or more soft prompts 226 can be stored in association with a particular user (and/or sets of users).

For example, the soft prompt 226 can be tuned based on user-specific attributes (e.g., a user style, a user tone, and/or a user vocabulary (which may include slang and/or a particular word choice)). The soft prompt 226 and the input example 220 can be processed together by the generative model 214 to generate a model-generated content item 216 that includes the set of details from the input example 220 and the user-specific attributes (as conditioned based on the soft prompt 226).

The soft prompt 226 can be tuned and/or trained (or learned) by evaluating a second loss function 228 to generate a gradient descent that can then be backpropagated to adjust one or more parameters (and/or weights) of the soft prompt 226. The second loss function 2280 may adjust the one or more parameters of the soft prompt 226 to train the soft prompt 226 to condition the generative model 214 to generate model-generated content items that include user-specific attributes (e.g., emulates the style, tone, and/or vocabulary of the user). The second loss function 228 can be evaluated by comparing the attributes of the model-generated content item 216 and the user-specific content item 230.

A tuned generative model 214 (e.g., a fine-tuned domain-specific generative model) and/or a tuned soft prompt 226 may then be utilized for model inference. Source content and/or the soft prompt 226 can be processed with the generative model 214 to generate a domain-specific model-generated content item 216. The domain-specific model-generated content item 216 may emulate the structure, style, tone, and/or terminology of content items within the particular domain. The domain-specific model-generated content item 216 may then be provided for display to the user.

Alternatively and/or additionally, the model-generated content item 216 may then be processed with the generative model 214 to generate a model-generated outline 224. The model-generated outline 224 can be descriptive of the content within the model-generated content item 216 including the topics, subtopics, theme, and/or order. The model-generated outline 224 can include key points covered by the model-generated content item 216. The model-generated outline 224 may then be provided for display to the user. A user may interact with the model-generated outline 224 to generate an augmented outline. The augmented outline can then be processed by the generative model 214 to generate an updated model-generated content item. The updated model-generated content item may be provided to the user.

In some implementations, the systems and methods disclosed herein can leverage a domain-specific training dataset and a plurality of evaluation signals to tune a generative model for domain-specific content item generation. For example, a domain-specific training dataset can be obtained. The domain-specific training dataset can include a plurality of input examples and/or a plurality of respective domain-specific content items. The plurality of input examples can include a plurality of example source content datasets. The input examples can include a set of facts (e.g., a press release, a fact pattern, a sports box score, experimental research results, a knowledge graph, etc.), a commentary direction (e.g., an editorial perspective, a theory, a logic string, etc.), and/or other topic information. The plurality of respective domain-specific content items can include ground truth examples of domain-specific content items. The respective domain-specific content items may be associated with the topics of the input examples and may include domain-specific attributes, which may include a specific structure, specific terminology, specific tense, a specific tone, and/or other domain-specific attributes. A generative model can process an input example to generate a model-generated content item with one or more model-generated attributes. A loss function can then evaluate differences between the model-generated content item and a respective domain-specific content item associated with the input example to generate a gradient descent. The gradient descent can be backpropagated to adjust one or more parameters of the generative model to tune the generative model for domain-specific content item generation.

Content items of different domains (e.g., fields of expertise) can have a domain-specific structure, style, terminology, tone, and/or other attributes. For example, news articles can begin with a lede that includes an opening sentence and/or paragraph that includes an overview of a key aspect of a story (e.g., the most important aspect of a story, which can include the "who, what, when, where, why, and/or how"). News articles can include a particular tone, particular syntax, particular terminology, and/or other specific attributes. The generative model can be tuned to generate model-generated content items with the specific attributes.

The generative model tuning can include evaluating the model-generated content item based on one or more signals. The evaluation can then be utilized to adjust one or more parameters of the generative model. For example, the appropriateness of content, the factual grounding, the length, correctness of recitation, attribution properness, level of verbatim usage, and/or other signals of the model-generated content item can be determined then utilized to tune the generative model. The different signals may be domain-specific and/or may be utilized for a plurality of different domains. In some implementations, the signal thresholds may differ based on the domain.

Additionally and/or alternatively, a soft prompt may be generated and/or tuned for conditioning a generative model to emulate a style, tone, and/or writing characteristics of a particular user and/or a particular set of users (e.g., a publisher may tune and/or generate a soft prompt based on their newspaper's specific style).

A domain-specific generative model system can be utilized by news publishers (e.g., local and/or regional newspapers) to quickly generate news articles from press releases, while maintaining journalistic style, terminology, and structure. Alternatively and/or additionally, the domain-specific generative model system may be leveraged for other domain-specific content generation (e.g., email campaigns, newsletters, marketing reports, academic papers, etc.). The generative models can be tuned to a particular domain to provide high quality content items with the domain-specific attributes. For example, a press release and/or enrichment materials (e.g., interview transcripts) can be processed to generate a news article. Experimental data may be processed to generate an academic paper. Articles may be processed to generate a newsletter. Meeting notes and/or company data may be processed to generate a company-wide email.

News articles and other specialized areas can have specific stylization, terminology, processes, and/or structure to their content items. Large language models can generate detailed content items; however, the content items may fail to have the domain-specific features. Additionally, different publishers may have varying styles, terminologies, and/or other signature features that may be lost via the use of traditional large language models. Moreover, large language models can suffer from hallucinations and may provide plagiarism concerns.

A generative model can be tuned on domain-specific datasets (e.g., press releases and associated news articles) for domain-specific content item generation. The tuning may further include tuning for factual grounding, proper attribution, verbatim mitigation, length, and/or other factors. The tuning dataset may include model-generated content items. Soft prompts may be generated and/or tuned for publisher specific features. For example, parameters of a soft prompt can be tuned on a publisher-specific dataset to generate a soft prompt that can be utilized to condition the domain-specific model for publisher-specific generation.

The domain-specific model can be utilized by publishers (e.g., newspapers and/or news aggregators) to generate drafts of domain-specific content items (e.g., news articles) quickly with domain-specific features (e.g., style, structure, and/or terminology). The utilization of a soft prompt can further condition the content item generation for variances from publisher to publisher, which may include a level of formality, dialect, length, and/or other varying features.

Figure 3:
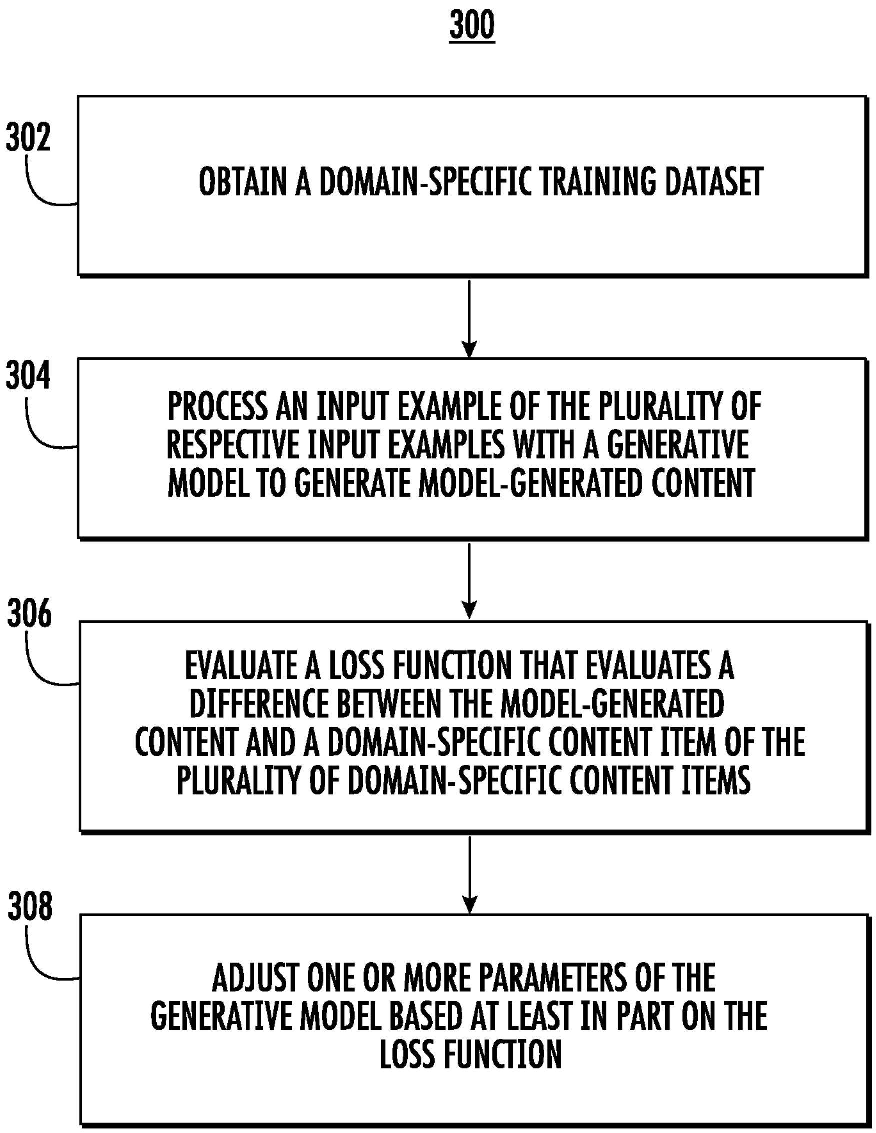
FIG. 3 depicts a flow chart diagram of an example method to perform generative model tuning according to example embodiments of the present disclosure.

FIG. 3 depicts a flow chart diagram of an example method to perform according to example embodiments of the present disclosure. Although FIG. 3 depicts steps performed in a particular order for purposes of illustration and discussion, the methods of the present disclosure are not limited to the particularly illustrated order or arrangement. The various steps of the method 300 can be omitted, rearranged, combined, and/or adapted in various ways without deviating from the scope of the present disclosure.

At 302, a computing system can obtain a domain-specific training dataset. The domain-specific training dataset can include a plurality of domain-specific content items (e.g., a plurality of news articles). In some implementations, the plurality of domain-specific content items can include one or more domain-specific attributes associated with a particular field of expertise (e.g., a plurality of news articles with one or more domain-specific attributes associated with the field of journalism (e.g., news articles)). The one or more domain-specific attributes can include a particular information structure and a set of particular stylistic characteristics associated with a particular publication type for the particular field of expertise (e.g., the one or more domain-specific attributes may include a particular news article information structure and a set of particular news article stylistic characteristics). The domain-specific training dataset can include a plurality of respective input examples associated with the plurality of domain-specific content items (e.g., a plurality of respective press releases associated with the plurality of news articles). The plurality of domain-specific content items can include a plurality of new articles. The plurality of news articles may include one or more journalistic-specific attributes including the structure, the terminology, and factual pattern layout. In particular, the one or more domain-specific attributes can include an order of content, which may include a lede before the background information. The lede can summarize a key aspect of a story in an opening sentence and/or paragraph. The plurality of input examples can include a plurality of press releases (and/or enrichment materials (e.g., interview transcripts)) associated with the plurality of news articles. For example, the plurality of press releases can be a brief statement of facts on respective stories, and the plurality of news articles can include full length news articles that include at least a subset of the facts of the brief statements of facts on respective stories.

In some implementations, the domain-specific training dataset can include a plurality of domain-specific content items of a particular publication type. The particular publication type can include a news article type, a research paper type, a newsletter type, an email type, and/or other publication type. The plurality of domain-specific content items of the particular publication type can include the particular information structure and the set of particular stylistic characteristics associated the particular publication type for the particular field of expertise. The particular information structure can include an inverted pyramid structure for news article types. For example, the news article can begin with the who, what, when, where, why, and how of the story (e.g., the most newsworthy information). The news article can then include important details that provide additional key details associated with the who, what, when, where, why, and how of the story. Other lesser details can then be included after the additional key details. The particular information structure for scientific research papers can include a high-level abstract then an introduction, then related works, then a discussion of the discovery including the researcher's method, then experimental data, and then a conclusion. The particular information structure for a newsletter can include a title, a greeting, an introduction, and a list of pertinent topics.

In some implementations, the set of particular stylistic characteristics associated the particular publication type can include the tone (e.g., a factual tone for news article), particular publication type-specific stylistic name or term use (e.g., news articles write out the full name of a person upon first instance, news articles may limit slang to quotes, and/or news articles may use particular term for a certain occupation, pace, or thing), particular lengths (e.g., news articles may have relatively short sentences and paragraphs, when compared to a literary review of an artistic work), publication type-specific citations (e.g., attribution in news articles can follow different citation style requirements than academic papers or law briefs), and/or other publication type-specific stylistic characteristics.

At 304, the computing system can process an input example of the plurality of respective input examples with a generative model to generate model-generated content. The input example may include a press release of the plurality of respective press releases. The model-generated content may include a model-generated news article. The model-generated content (e.g., the model-generated news article) can include a plurality of model-generated attributes. In some implementations, the model-generated content can include a model-generated news article (e.g., a model-generated draft of a news article) that includes facts included in the input example (e.g., the example press release). The model-generated content can be generated based on a plurality of sequence predictions. The plurality of model-generated attributes can include the structure, content, terminology, and/or other features of the model-generated content.

At 306, the computing system can evaluate a loss function that evaluates a difference between the model-generated content and a domain-specific content item of the plurality of domain-specific content items. For example, the computing system may evaluate differences between the model-generated news article and a respective news article of the plurality of news articles. In some implementations, the loss function can evaluate semantic differences between the model-generated content (e.g., the model-generated news article) and a domain-specific content item of the plurality of domain-specific content items (e.g., a respective news article from the domain-specific training dataset). The loss function can evaluate factual grounding of the model-generated content associated with details from the input example. For example, the loss function may evaluate factual grounding of the model-generated news article associated with details from the press release and/or one or more interviews. In some implementations, the loss function can evaluate the appropriateness of the content, which may include a penalization term for profanity, abusive content, vulgarity, and/or other inappropriate content. Additionally and/or alternatively, the loss function can evaluate a length of the model-generated content, which may include evaluating sub-lengths of the lede, the background information, the additional context, the headline, the subtitle, and/or other sections. In some implementations, the loss function can evaluate correct recitation, proper attribution, and/or a level of verbatim usage. The recitation can be evaluated based on determining if the recitation in the model-generated content properly recites the quote and/or facts of the input example. The attribution can be evaluated based on whether the source(s) are properly cited in the model-generated content. The level of verbatim usage can be determined based on a level of verbatim usage of phrases, sentences, etc. by the model-generated content with respect to the input example and the respective domain-specific content item. The factual grounding, appropriateness, length, correct recitation, proper attribution, and/or a level of verbatim usage may be evaluated based on one or more respective penalization terms that may be part of the loss function. Alternatively and/or additionally, the factual grounding, appropriateness, length, correct recitation, proper attribution, and/or a level of verbatim usage may be separate loss functions. In some implementations, the loss function can evaluate the plurality of model-generated attributes based on the particular information structure and the set of particular stylistic characteristics associated with the particular publication type (e.g., the particular news article information structure and the set of particular news article stylistic characteristics). Alternatively and/or additionally, the loss function may include one or more penalization terms for penalizing deviation from the particular information structure and/or the set of particular stylistic characteristics associated with the particular publication type.

At 308, the computing system can adjust one or more parameters of the generative model based at least in part on the loss function. The adjustment may be leveraged to tune the generative model for domain-specific usage (e.g., news article generation, newsletter generation, and/or other domains). Alternatively and/or additionally, parameters (e.g., weights of a set of parameters) of a soft prompt can be tuned based on the loss function.

In some implementations, the computing system can obtain an input dataset. The computing system can process the input dataset with the generative model to generate a domain-specific model-generated output and process the domain-specific model-generated output to generate a model-generated outline descriptive of a summary of substantive points within the domain-specific model-generated output. The computing system can then provide the model-generated outline for display. The domain-specific model-generated output can include a model-generated news article draft. Processing the domain-specific model-generated output to generate the model-generated outline descriptive of the summary of substantive points within the domain-specific model-generated output can include processing the domain-specific model-generated output with the generative model.

Additionally and/or alternatively, the computing system can obtain an augmentation input. The augmentation input can be descriptive of a request to augment the model-generated outline. The computing system can then generate an augmented outline based on the augmentation input and the domain-specific model-generated output. The computing system can process the augmented outline with the generative model to generate an updated model-generated output and provide the updated model-generated output for display. The updated model-generated output can include an updated model-generated news article draft. In some implementations, the augmentation input can be descriptive of an additional topic to add to the domain-specific model-generated output. The updated model-generated output can include an additional section associated with the additional topic. Alternatively and/or additionally, the augmentation input can be descriptive of a change in a structure (e.g., an order structure) of the domain-specific model-generated output. The updated model-generated output can then include an updated structure (e.g., an updated order structure).

In some implementations, the computing system can obtain a publisher-specific dataset. The publisher-specific dataset can include a plurality of publisher content item examples. The computing system can generate an additional model-generated content item with the generative model. The additional model-generated content item can include one or more attribute features. The computing system can evaluate a second loss function that evaluates a difference between the additional model-generated content item and one or more of the plurality of publisher content item examples and adjust parameters of the generative model based at least in part on the second loss function. Alternatively and/or additionally, the second loss function may be utilized to tune parameters of a soft prompt. The soft prompt can then be stored for future use by the particular user. The second loss function and the loss function may differ. Alternatively and/or additionally, the second loss function and the loss function may be similar.

In some implementations, evaluating the second loss function that evaluates the difference between the additional model-generated content item and the one or more of the plurality of publisher content item examples can include comparing the one or more attribute features of the additional model-generated content item and one or more ground truth features of the one or more of the plurality of publisher content item examples. The one or more ground truth features can include stylistic attributes associated with a publisher-specific style. The one or more ground truth features can include terminology attributes associated with a publisher-specific vocabulary.

Figure 4:
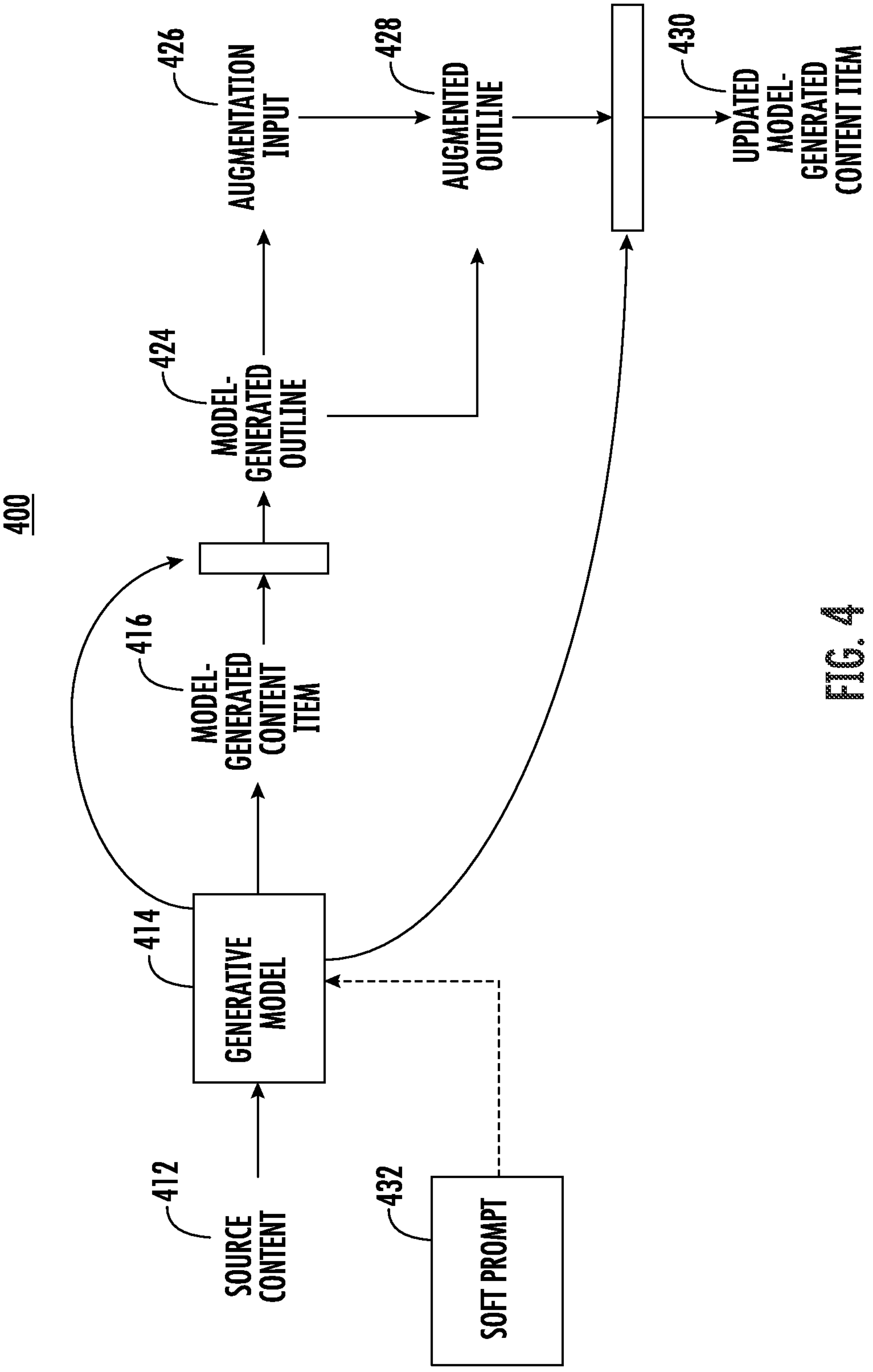
FIG. 4 depicts a block diagram of an example content item generation system according to example embodiments of the present disclosure.

FIG. 4 depicts a block diagram of an example content item generation system 400 according to example embodiments of the present disclosure. The content item generation system 400 can be utilized to generate a domain-specific content item that may include an order and/or content that was specifically selected and/or reviewed by a user. In particular, the content item generation system 400 can process source content 412 with a generative model 414 to generate a model-generated outline 424 that can then be interacted with to generate an augmented outline 428. The augmented outline 428 may be processed with the generative model 414 to generate an updated model-generated content item 430. The review and/or augmentation of the model-generated outline 424 can provide for quick and intuitive review of the order and/or content of the model-generated content item 416.

For example, the content item generation system 400 can obtain source content 412 from a user computing system. The source content 412 can include a set of details associated with one or more topics. The source content 412 can include facts, themes, points of reason, and/or other details. In some implementations, the source content 412 can include a press release, interviews, experimental data, headlines, notes, and/or other source content.

Additionally and/or alternatively, a soft prompt 432 can be obtained. The soft prompt 432 may be associated with a particular user and/or a set of users. The soft prompt 432 may be obtained based on the source content 412 being obtained from a user computing system associated with the particular user and/or particular set of users.

The generative model 414 can process the source content 412 and/or the soft prompt 432 to generate a model-generated content item 416 (e.g., a model-generated draft of a domain-specific content item). The model-generated content item 416 can include domain-specific attributes based on the generative model 414 being tuned for domain-specific content generation. Additionally, the model-generated content item 416 can include user-specific attributes based on the tuned parameters of the soft prompt 432. The model-generated content item 416 can include details from the source content 412.

The model-generated content item 416 can be processed (e.g., with the generative model 414) to generate a model-generated outline 424. The model-generated outline 424 can include a structured summary of the model-generated content item 416 (e.g., a bullet point list of key points (and/or topics) covered by the model-generated content item 416).

The model-generated outline 424 can be provided for display in an interactive user interface. The content item generation system 400 can obtain an augmentation input 426 via the interactive user interface. The augmentation input 426 can be descriptive of a request to change an order and/or topic points of the model-generated outline 424. In some implementations, an augmented outline 428 can be generated based on the model-generated outline 424 and the augmentation input 426.

The augmented outline 428 can then be processed with the generative model 414 to generate an updated model-generated content item 430. The updated model-generated content item 430 can be descriptive of the order and content of the augmented outline 428 and may include the domain-specific attributes of a full length domain-specific content item. The updated model-generated content item 430 may then be provided to the user computing system.

Figure 5:
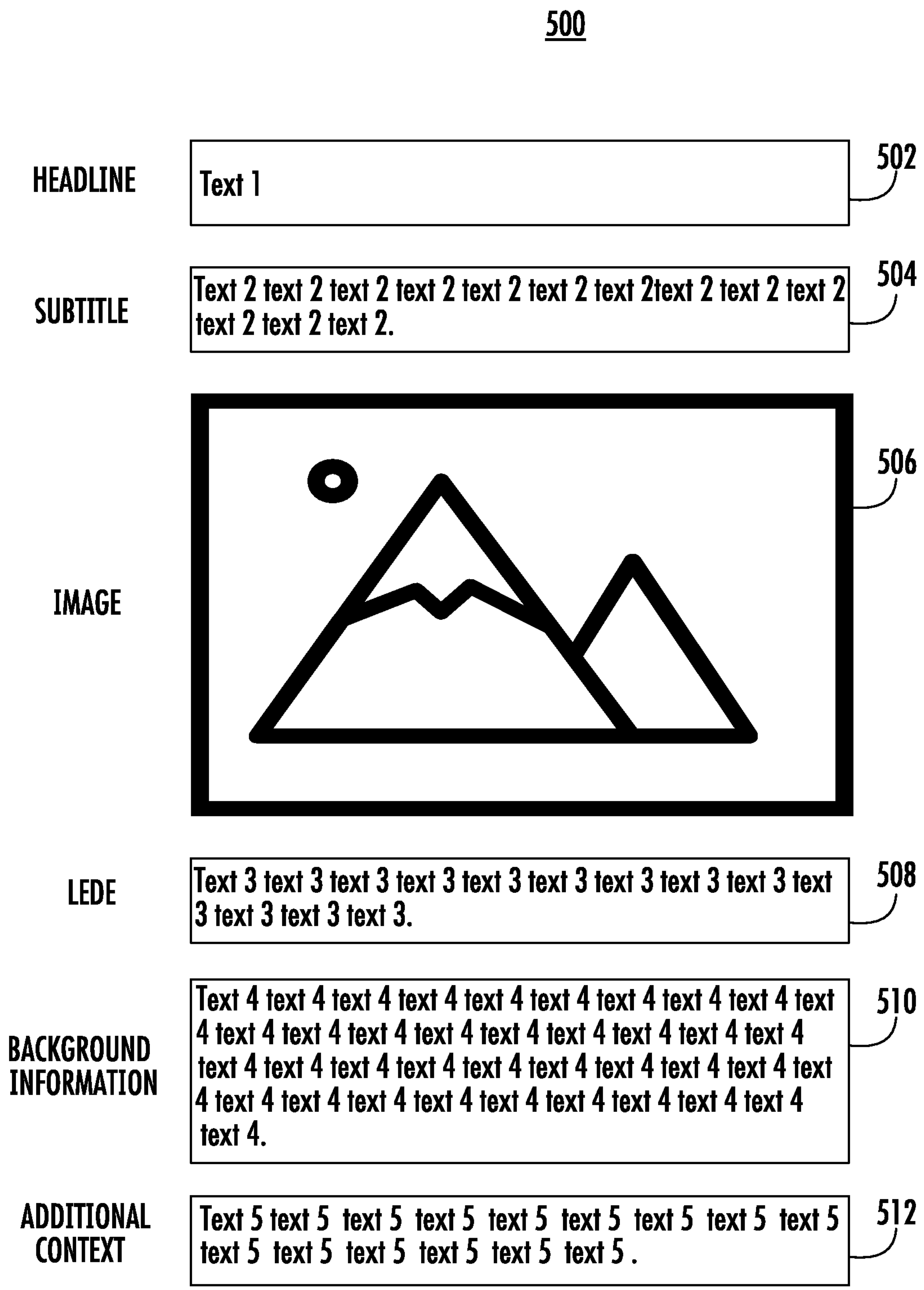
FIG. 5 depicts an illustration of an example news article structure according to example embodiments of the present disclosure.

FIG. 5 depicts an illustration of an example news article structure 500 according to example embodiments of the present disclosure. The domain of journalism (e.g., news articles) can have a particular structure. In particular, news articles can have a news article structure 500 that follows a reverse pyramid structure. The reverse pyramid structure can include beginning with the most important information that the reader needs to know, while the level of importance of the information declines as the news article goes on. More specifically, the key information from the story may be provided in the lede 508 of the news article, which may be the first part of the news article. The information that follows in the background information 510 and the additional context 512 may include more detailed information on the key information. For example, the lede 508 may include the who, what, where, when, why, and/or how of the story, while the background information 510 and the additional context 512 provide additional details and context supporting the information included in the lede 508.

The news article structure 500 can further include a headline 502, a subtitle 504, and/or a media content item 506 (e.g., an image). The headline 502 and/or the subtitle 504 may draw the reader in by including information on the topic of the news article and may include a hook. The media content item 506 can include a visual that supports and/or complements the information provided in the news article.

The generative model disclosed herein can be tuned to generate content items that include this news article structure 500, which may include language generation tasks and/or image generation tasks.

FIG. 6A depicts an illustration of an example pre-tuned content generation according to example embodiments of the present disclosure. In particular, an initial source 610 can be obtained and processed with an untuned generative model to generate the untuned model-generated content item 612. The untuned model-generated content item 612 can include a natural language flow and can include factual grounding from the initial source 610. However, the untuned model-generated content item 612 can fail to generate a news article with the correct structure (e.g., the untuned model-generated content item 612 may not include a proper lede) and may suffer from plagiarism due to verbatim overlap with the initial source 610.

FIG. 6B depicts an illustration of an example journalist rewrite according to example embodiments of the present disclosure. In particular, an industry professional may rewrite the initial source 610 and/or the untuned model-generated content item 612 to provide an example rewritten content item 614 that includes a domain-specific structure, style, tone, and/or terminology. The example rewritten content item 614 may be leveraged as part of a domain-specific training dataset to tune and/or train the generative model for domain-specific content generation.

FIG. 6C depicts an illustration of an example tuned domain-specific content generation according to example embodiments of the present disclosure. In particular, a domain-specific generative model may process the initial source 610 to generate a domain-specific model-generated content item 616 that includes a plurality of domain-specific attributes. The plurality of domain-specific attributes can include a proper news article structure, active voice, an objective tone, factual grounding, limited verbatim usage, proper attribution, and journalistic terminology.

Figure 7:
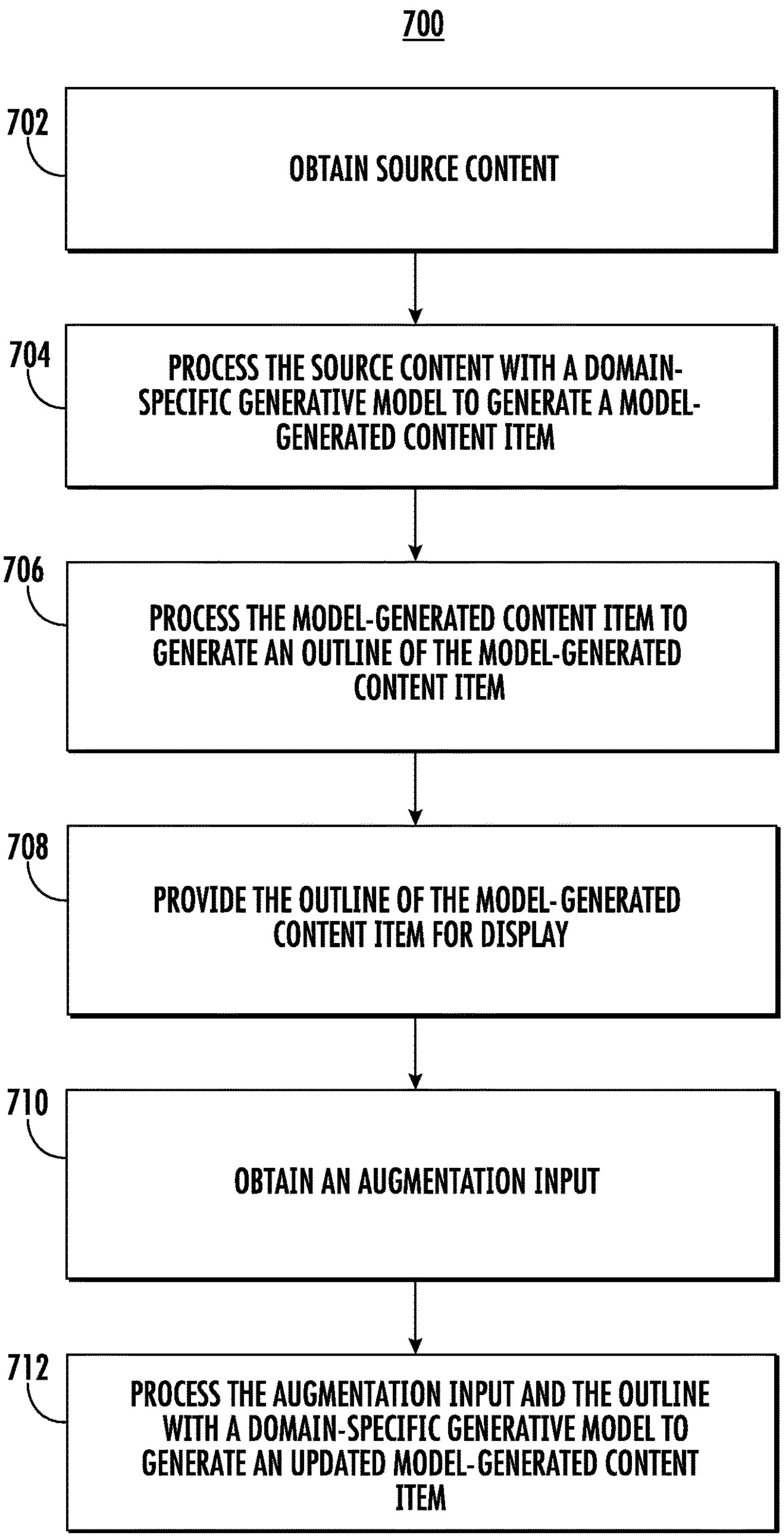
FIG. 7 depicts a flow chart diagram of an example method to perform domain-specific model-generated content item generation according to example embodiments of the present disclosure.

FIG. 7 depicts a flow chart diagram of an example method to perform according to example embodiments of the present disclosure. Although FIG. 7 depicts steps performed in a particular order for purposes of illustration and discussion, the methods of the present disclosure are not limited to the particularly illustrated order or arrangement. The various steps of the method 700 can be omitted, rearranged, combined, and/or adapted in various ways without deviating from the scope of the present disclosure.

At 702, a computing system can obtain source content. The source content can include details associated with a particular topic. The source content may include a press release, one or more interview transcripts, a set of facts, research data, and/or other source content. The particular topic can include an event (e.g., a crash, a heartfelt moment, a sporting event, etc.), a set of events, and/or other topics. The source content may include one or more sources. In some implementations, the source content may include one or more root sources and/or one or more peripheral sources. The one or more root sources and/or the one or more peripheral sources may be selected by the user and/or may be automatically determined. The root sources may include a timely source directly and/or uniquely describing a newsworthy event. In some implementations, the input request of the user may be associated with generating a story that revolves around the topics of the root source. The peripheral sources may include a source that adds information and/or context that is relevant to the story and/or presents a counterpoint to the root source(s). The source content may include multiple root sources, multiple peripheral sources, one root source, and/or one peripheral source. In some implementations, the one or more root sources and/or the one or more peripheral sources may be obtained and/or determined with a search engine and/or a generative language model. For example, a search engine and/or a generative language model may process an input request and/or an initial source and may determine the one or more root sources and/or the one or more peripheral sources based on the input request and/or the initial source. In some implementations, the one or more peripheral sources may be determined based on processing the one or more root sources with a search engine and/or one or more machine-learned models. The user may be provided with a user interface that provides candidate sources for display and for selection. The user can then select sources to be included as part of the source content. The user interface may include options that allow a user to select whether a source is to be utilized as a root source or a peripheral source, which can then condition how the generative model weights and/or leverages the content of that source.

At 704, the computing system can process the source content with a domain-specific generative model to generate a model-generated content item. The model-generated content item may include a model-generated news article. The domain-specific generative model may have been tuned on a domain-specific training dataset to generate content items that comprise a particular information structure and a particular set of stylistic characteristics associated with a particular publication type (e.g., news articles). In some implementations, the domain-specific generative model can be trained to process the source content, determine a hierarchy of information from the source content (e.g., organize the details based on importance (e.g., what are the who/what/when/where/why and what details are pivotal details versus background details)) and/or categorize information from the details of the source content (e.g., categorize the details based on sub-topics and/or type of details), and/or determine the detail organization based on leveraging the hierarchy determination and/or the categorization to generate a model-generated content item that conforms with the particular information structure (e.g., an inverted pyramid structure for news articles). Additionally and/or alternatively, the domain-specific generative model can be trained and/or tuned to learn the particular set of stylistic characteristics associated with the particular publication type (e.g., the type of voice for the particular publication type (e.g., active voice or passive voice), the type of perspective for the particular publication type (e.g., first person or third person), and/or other publication-specific stylistic characteristics). The model-generated content item can include one or more domain-specific attributes. The one or more domain-specific attributes can include the particular information structure and the particular set of stylistic characteristics. In some implementations, the source content can include a press release and/or one or more interview transcripts, and the model-generated content item and/or the updated model-generated content item may include model-generated news articles (e.g., a plurality of drafts of model-generated news articles) associated with the particular topic of the press release and/or interview. Additionally and/or alternatively, the domain-specific generative model may have been tuned on a publisher-specific training dataset to generate content items that emulate the style of a particular publisher. The one or more domain-specific attributes may include a domain-specific structure, a domain-specific vocabulary, and/or a domain-specific tone. The domain-specific generative model may include a pre-trained generative language model that was then tuned for a domain-specific usage on a domain-specific training dataset.

At 706, the computing system can process the model-generated content item to generate an outline of the model-generated content item. The model-generated content item may be generated by processing the model-generated content item with the domain-specific generative model. In some implementations, the outline of the model-generated content item can include structured topic points and/or sub-topic points. The topic points and/or sub-topic points may be presented with fact phrases, reasoning phrases, logic strings, sentences, and/or other data.

At 708, the computing system can provide the outline of the model-generated content item for display. The outline may be provided for display in a graphical user interface that may include a plurality of user interface elements for editing the outline. Editing the outline can include adding information, changing information, and/or deleting information. Editing the outline may include adding sections, reordering sections, and/or deleting sections.

At 710, the computing system can obtain an augmentation input. The augmentation input can be associated with augmenting the outline. In some implementations, the outline can be provided for display within a graphical user interface. The augmentation input can be received via the graphical user interface. The augmentation input may be associated with a request to edit the information, order, and/or structure of the outline.

At 712, the computing system can process the augmentation input and the outline with a domain-specific generative model to generate an updated model-generated content item. The updated model-generated content item can include an updated model-0 generated news article. In some implementations, an augmented outline may be generated based on the augmentation input and the outline. The augmented outline can then be processed with the domain-specific generative model to generate the updated model-generated content item.

In some implementations, the computing system can provide the updated model-generated content item for display. The updated model-generated content item may be provided for display via the graphical user interface. The updated model-generated content item may include an updated news article, an updated newsletter, an updated email, and/or other updated model-generated content.

In some implementations, one or more source suggestions can be determined based on the model-generated content item and/or the outline (e.g., portions of the model-generated content item and/or the outline may be processed with a search engine and/or one or more machine-learned models to determine sources associated with the contents of the model-generated content item and/or the outline). The one or more source suggestions can then be provided for display in a user interface. The user can then interact with the user interface to determine, if, which, and/or how the suggested sources are utilized. For example, the computing system may receive a selection to use a first source suggestion as a peripheral source. The outline and the first source suggestion may be processed with the domain-specific generative model to generate the updated model-generated content item in which the updated model-generated content item includes seeds (e.g., facts and/or details) from the source associated with the first source suggestion. The updated model-generated content item can include citations and quotes from the source associated with the first source suggestion and/or the source content. In some implementations, the augmentation input can include adjusting the outline to include content from one or more additional sources (e.g., the first source suggestions, the second source suggestions, etc.).

In some implementations, the source suggestions may be associated with a context, the content of the outline, the content of the model-generated content item, past user interactions (e.g., a user search history, a user browsing history, etc.), and/or other data. The source suggestions may include user notes, past user-generated content items, trusted databases, web resources, local resources, recordings, and/or other sources.

Additionally, and/or alternatively, source suggestion and outline augmentation may include identifying information topics (e.g., sub-topics to the main topic identified in the source content) that may complement the current information of the outline, identifying sources that include relevant content to the identified information topics, determining relevant parts of the identified sources, and augmenting the outline and/or the model-generated content item to include additional content from the relevant parts of the identified sources. The source suggestion and outline augmentation may be performed with a generative language model and may include one or more requests for additional user inputs (e.g., requesting a user to select a suggested source from a list of suggested sources). In some implementations, identifying information topics that may complement the current information of the outline may include determining an element of the model-generated content item and/or the outline (e.g., topic, term, sentence, and/or entity) in the text that would benefit from extra content (e.g., extra details (e.g., a detailed description)).

Figure 8:
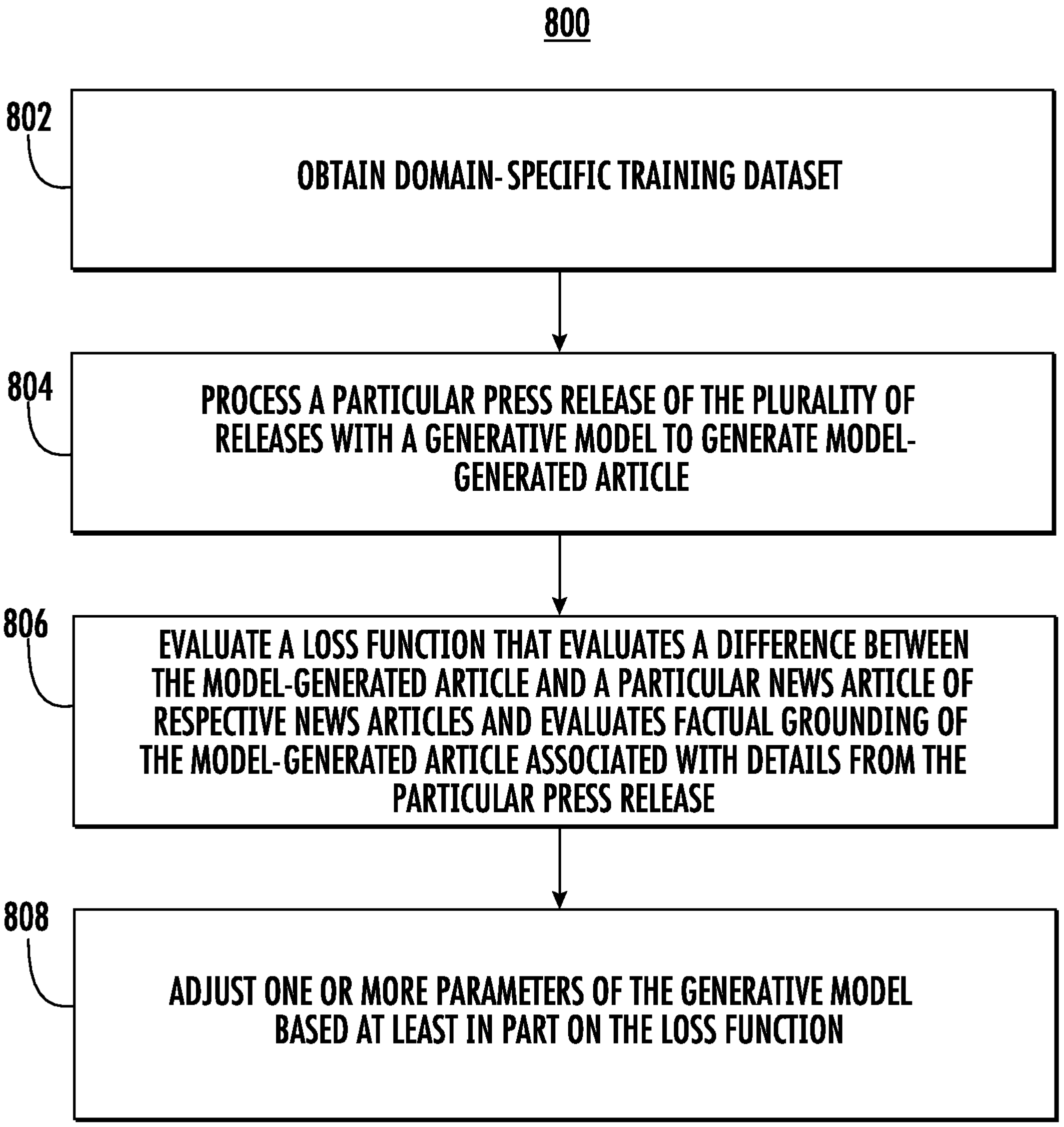
FIG. 8 depicts a flow chart diagram of an example method to perform domain-specific tuning according to example embodiments of the present disclosure.

FIG. 8 depicts a flow chart diagram of an example method to perform according to example embodiments of the present disclosure. Although FIG. 8 depicts steps performed in a particular order for purposes of illustration and discussion, the methods of the present disclosure are not limited to the particularly illustrated order or arrangement. The various steps of the method 800 can be omitted, rearranged, combined, and/or adapted in various ways without deviating from the scope of the present disclosure.

At 802, a computing system can obtain domain-specific training dataset. The domain-specific training dataset can include a plurality of press releases (and/or interviews) and a plurality of respective news articles. In some implementations, the plurality of respective news articles can include one or more domain-specific attributes associated with journalistic style and structure. The one or more domain-specific attributes can include a journalistic style associated with a press style book (e.g., a style guide that may include style guidelines including citation guidelines) and an inverted pyramid information structure (e.g., most important information first with level of importance decreasing as the article continues). The plurality of respective news articles can be associated with a plurality of news topics associated with the plurality of press releases. The one or more domain-specific attributes can include a format of content that includes opening the news article with the key information then providing the background information and further details as the news article continues. In some implementations, the one or more domain-specific attributes can include journalism specific terminology, sentence structure, and/or syntax.

At 804, the computing system can process a particular press release of the plurality of releases with a generative model to generate a model-generated article. The model-generated article can include a predicted article generated based on the particular press release (and/or the one or more interviews). The particular press release may include a set of facts. The model-generated article can be generated to generate a predicted news article with the set of facts of the particular press release.

At 806, the computing system can evaluate a loss function that evaluates a difference between the model-generated article and a particular news article of respective news articles and evaluates factual grounding of the model-generated article associated with details from the particular press release. The loss function may be a combined loss function and/or a piecewise loss function that includes a plurality of loss functions. In some implementations, the loss function may include a plurality of penalization terms associated with domain-specific attributes, inappropriateness, grounding, length, recitation accuracy, attribution quality, level of verbatim, and/or other quality metrics.

In some implementations, the loss function can further evaluate the model-generated article based on a structural comparison between content of the model-generated article and the particular news article of the plurality of respective news articles.

Additionally and/or alternatively, the loss function may evaluate the model-generated article based on a verbatim penalization term. The verbatim penalization term may adjust a gradient descent based on a verbatim similarity measure between the model-generated article and at least one of the particular news article or the particular press release. The verbatim determination may be determined based on an N character and/or word span of exact match verbatim words (e.g., seven, nine, or eleven words). In some implementations, the number of words (and/or number of characters) for the verbatim determination may be varied based on how unique the words and/or word sequence is. For example, the "elephant laid a purple egg" may be more unique than "The New York City mayor's office held a press conference on Tuesday" and may therefore be more likely to be determined to have an unfavorable verbatim value (e.g., an unfavorable verbatim score) as the "The New York City mayor's office held a press conference on Tuesday" is a more common sequence of words than "elephant laid a purple egg" even with the length difference.

In some implementations, the loss function may evaluate the model-generated article based on a recitation penalization term. The recitation penalization term may adjust a gradient descent based on whether quotes within the model-generated article correctly recite excerpts of at least one of the particular press release and/or the one or more interview transcripts. For example, text within quotation marks may be cross-referenced against the source content.

Additionally and/or alternatively, the loss function further may evaluate the model-generated article based on an attribution penalization term. The attribution penalization term may adjust a gradient descent based on evaluating a quality of an attribution within the model-generated article.

In some implementations, the loss function can evaluate a style and structure of the model-generated article based on a comparison with a ground truth style and structure of the particular news article.

At 808, the computing system can adjust one or more parameters of the generative model based at least in part on the loss function. The parameter adjustment may be based on a gradient descent generated by the one or more loss functions. The parameter adjustment may include freezing a subset of the parameters of the generative model and adjusting at least a portion of the non-frozen parameters.

Figure 9:
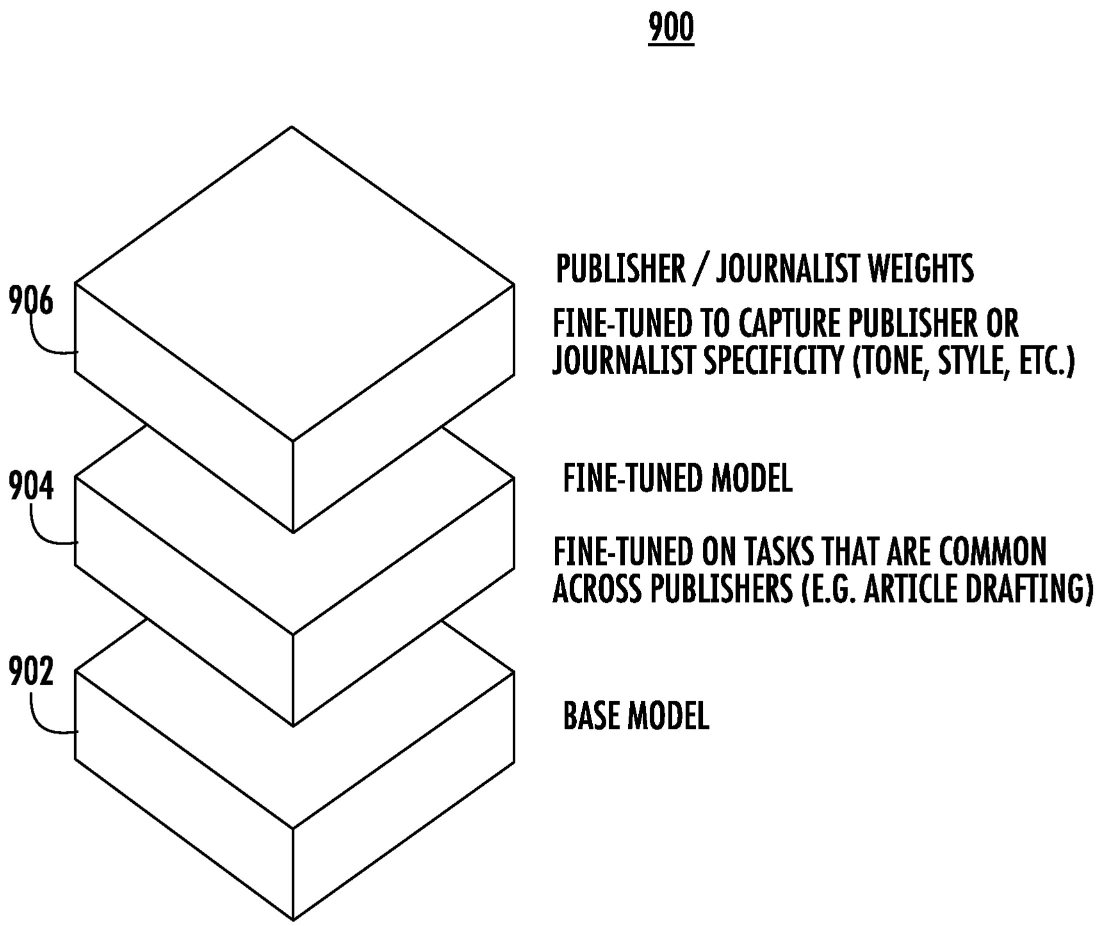
FIG. 9 depicts a block diagram of an example tuning-training system according to example embodiments of the present disclosure.

FIG. 9 depicts a block diagram of an example tuning-training system 900 according to example embodiments of the present disclosure. In particular, the systems and methods disclosed herein may include a multi-layered and/or multi-part approach for configuring and/or training the system for domain-specific and user-specific content generation.

For example, a base model 902 can be obtained and/or generated to be the foundation of the system. The base model 902 can include a generative model trained for a plurality of different tasks. The base model can include an autoregressive language model, a diffusion model, and/or other model configurations.

The base model 902 can then be fine-tuned for domain-specific content generation. In particular, the base model 902 can be domain-based fine-tuned on tasks (e.g., attribute-based generation) that are common across a domain (e.g., can be fine-tuned on tasks that are common across publishers (e.g., article drafting)) to generate a domain-specific generative model 904.

After the domain-based fine-tuning, the domain-specific generative model 904 can be fine-tuned for user-specific tuning 906. The user-specific tuning 906 can include adjusting weights and/or parameters of the domain-specific generative model 904 and/or a soft prompt. The user-specific tuning 906 can include fine-tuning "publisher weights" (or "journalist weights") to capture publisher or journalist specificity (e.g., a specific tone, a specific style, etc.).

After user-specific tuning 906, the model can be leveraged for domain-specific and user-specific content generation. For example, the model can process source content to generate news articles that include the journalistic style, structure, and/or terminology with publisher and/or journalist specificity including a journalist style and/or tone.

Figure 10:
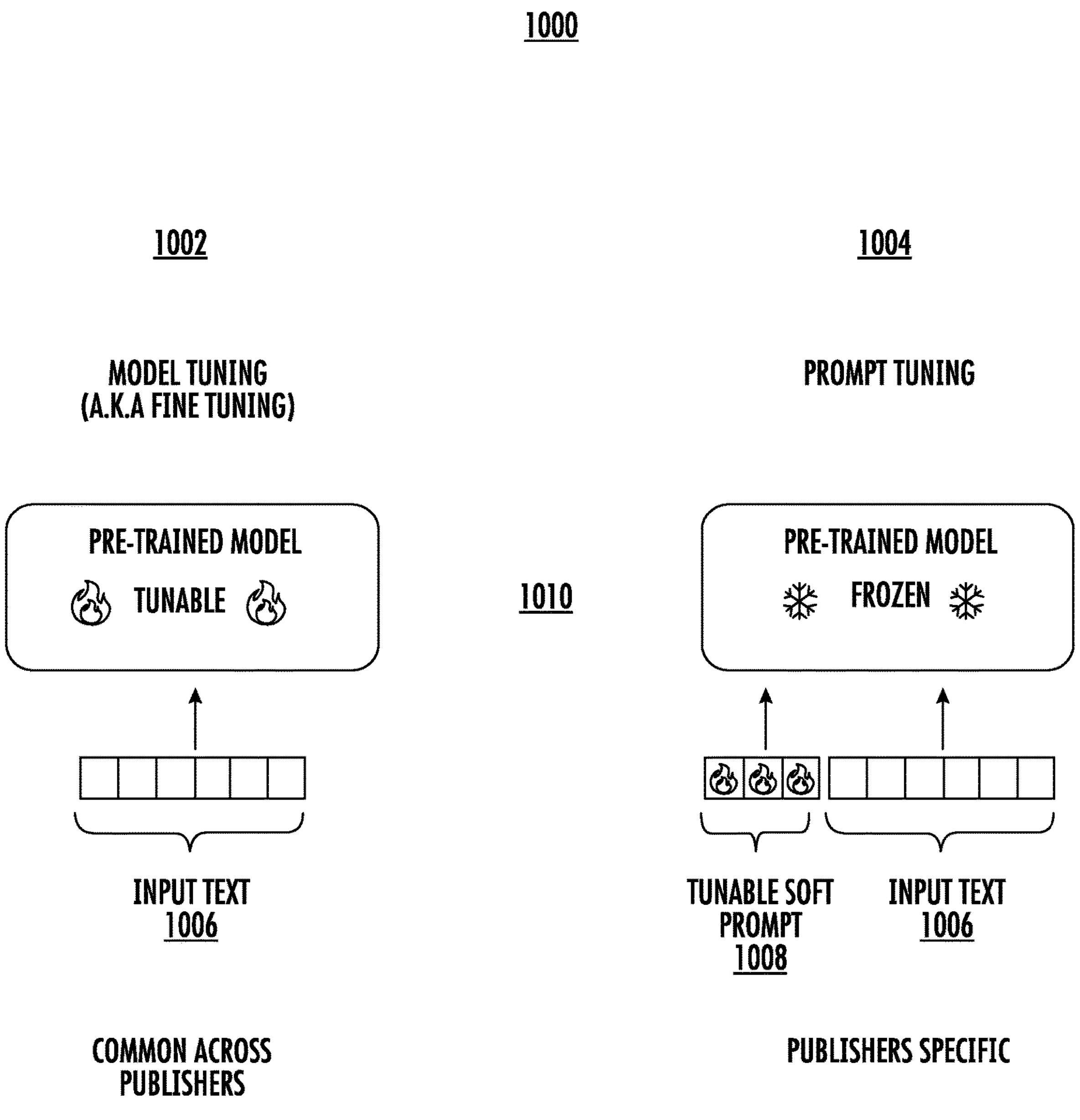
FIG. 10 depicts a block diagram of an example soft prompt tuning system according to example embodiments of the present disclosure.

FIG. 10 depicts a block diagram of an example soft prompt tuning system 1000 according to example embodiments of the present disclosure. In particular, the systems and methods disclosed herein can include model tuning 1002 for domain-specific training (e.g. tuning for tasks (or attributes) common across publishers) and can include prompt tuning 1004 for user-specific conditioning (e.g., tuning for tasks (or attributes) specific to a particular publisher and/or journalist).

For example, model tuning 1002 can be leveraged for domain-specific fine-tuning. The input text 1006 can be processed with the pre-trained model 1010 to generate an output that can then be evaluated to generate a gradient descent. One or more parameters of the pre-trained model 1010 may then be adjusted based on the gradient descent to tune the pre-trained model 1010 to generate content items with domain-specific attributes.

The prompt tuning 1004 can be leveraged for user-specific fine-tuning (and/or user-specific conditioning). The input text 1006 and the tunable soft prompt 1008 can be processed with the pre-trained model 1010 to generate an output that can then be evaluated to generate a gradient descent. One or more parameters of the tunable soft prompt 1008 may then be adjusted based on the gradient descent. The parameters of the pre-trained model 1010 may remain unchanged (i.e., frozen). The tunable soft prompt 1008 can be fine-tuned to be processed with the input text 1006 to condition the pre-trained model 1010 to generate content items with user-specific attributes.

Prompt tuning 1004 can retain the strong task performance of model tuning 1002, while keeping the pre-trained model frozen (e.g., not adjusting parameters of the generative model, while adjusting parameters of the soft prompt), enabling efficient multitask serving. FIG. 10 can depict that although model tuning 1002 can have strong task performance, model tuning 302 is computationally expensive and can require a newly trained model for each new task. Alternatively, engineered prompt design (e.g., the use of several canonical examples with a task description) can allow the use of a single model for multiple tasks; however, task performance can be relatively weak due to the heavy reliance on the task description and the number of examples. However, prompt tuning 1004 can utilize a single pre-trained model for a plurality of downstream tasks while maintaining strong task performance as tunable soft prompts are learned for each task in which each tunable soft prompt includes a limited number of learned parameters.

Figure 11:
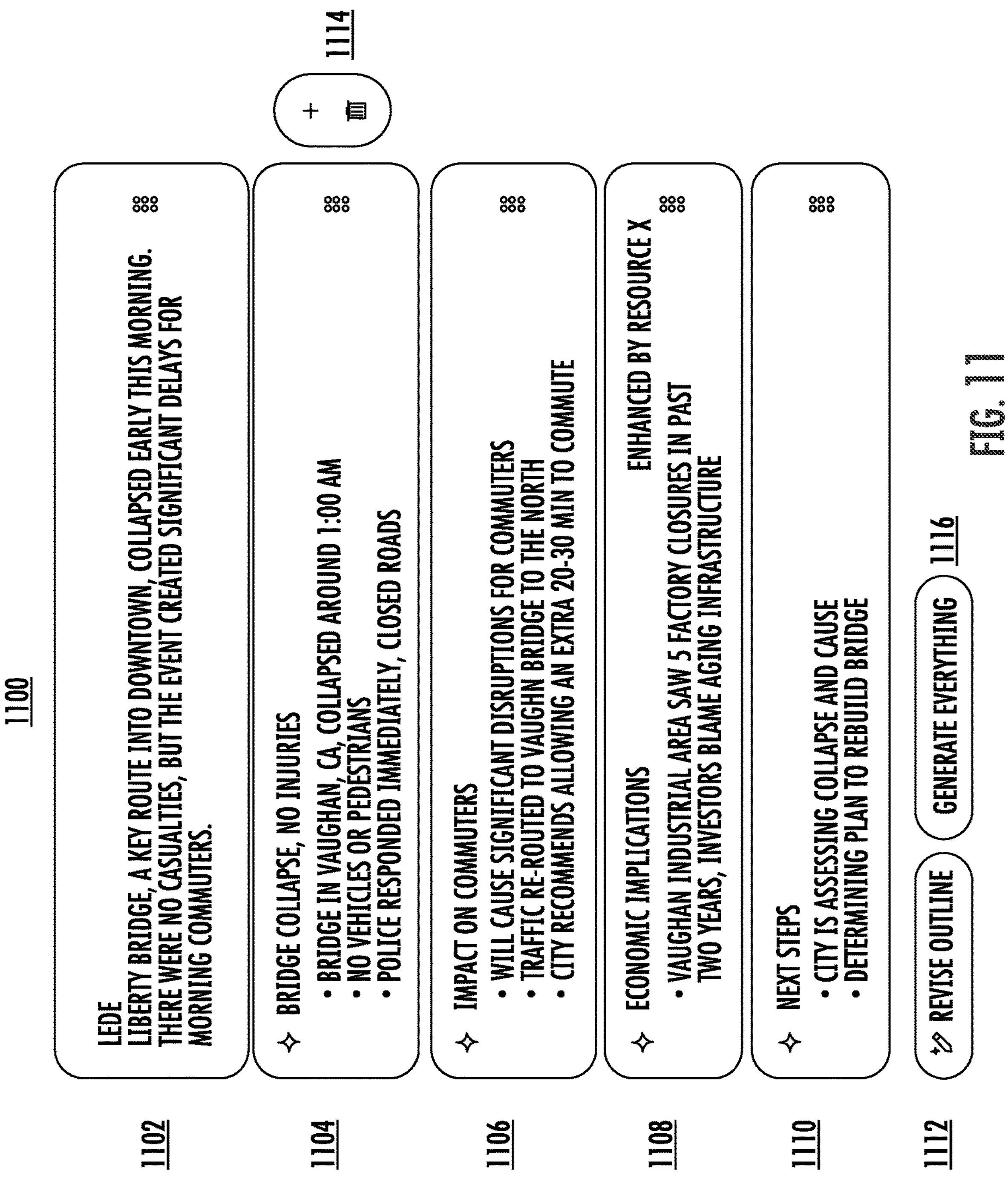
FIG. 11 depicts an illustration of an example outline user interface according to example embodiments of the present disclosure.

FIG. 11 depicts an illustration of an example outline user interface 1100 according to example embodiments of the present disclosure. In particular, the model-generated outline can be provided in an outline user interface 1100 to allow a user to review and/or augment the content, structure, and/or order of the model-generated content item.

For example, the outline user interface 1100 can include a plurality of interactive blocks, which may include a first block 1102 for the lede, a second block 1104 for a first sub-topic, a third block 1106 for a second sub-topic, a fourth block 1108 for a third sub-topic, and a fifth block 1110 for a wrap-up. The blocks may be augmented (e.g., added to, edited, and/or deleted) by interacting with one or more user interface elements (e.g., the edit user interface element 1114). The user may reorder the sup-topic blocks via tap selections and/or drag gestures. In some implementations, the outline user interface 1100 can include a revise outline user interface element 1112 to augment the content of the model-generated outline. Additionally and/or alternatively, the outline user interface 1100 can include a content item generation user interface element 1116, which can be selected to generate the updated model-generated content item. The updated model-generated content item can be generated based on the outline as augmented and/or displayed.

Figure 12A:
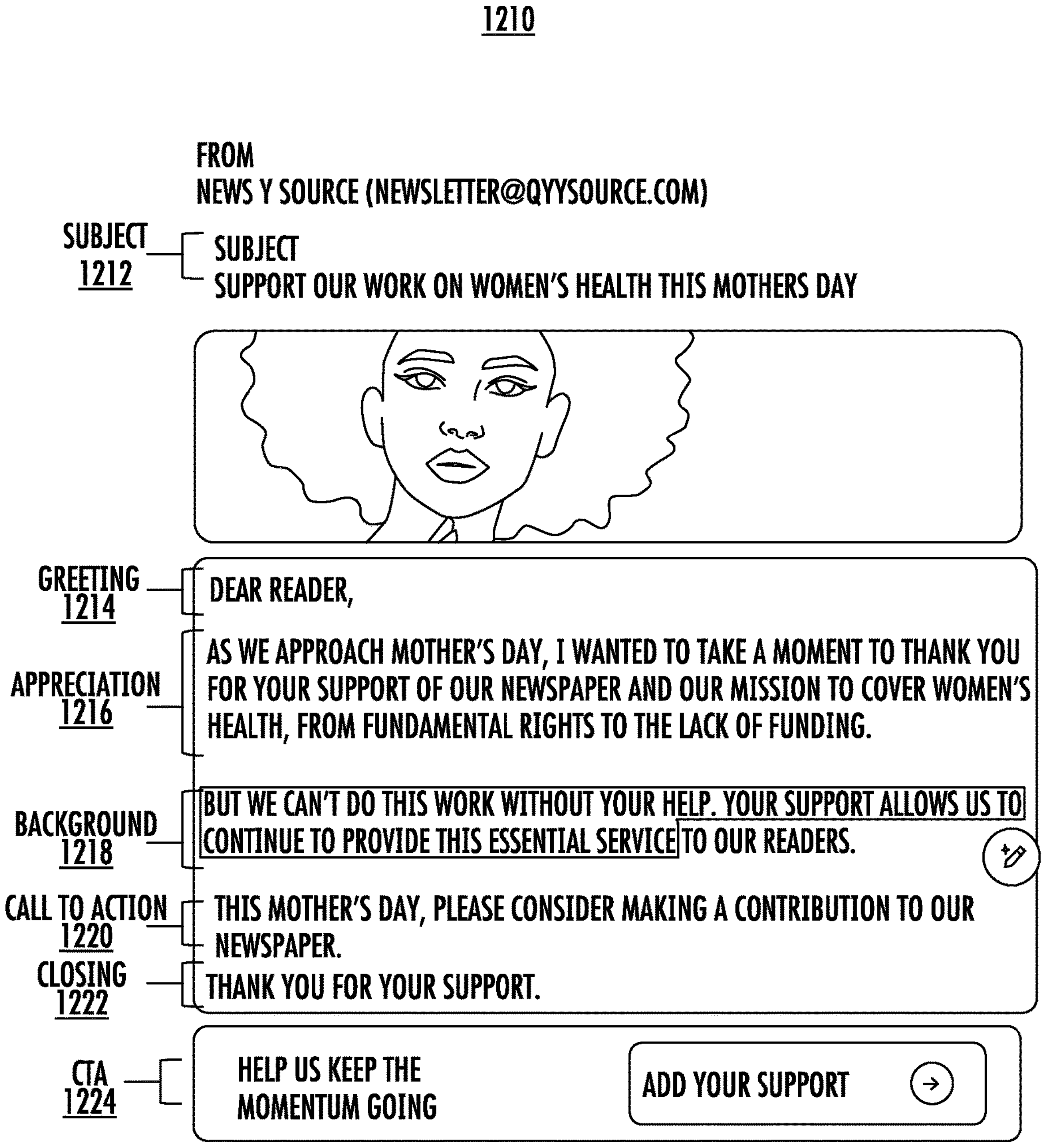
FIG. 12A depicts an illustration of an example email according to example embodiments of the present disclosure.

FIG. 12A depicts an illustration of an example email 1210 according to example embodiments of the present disclosure. In particular, the domain may be associated with emails (e.g., business and/or fundraiser focused emails). The model-generated content item can include an email. The email structure can include a subject line 1212 of the email, a greeting line 1214, an appreciation section 1216 (e.g., an introduction paragraph), a background section 1218, a call to action section 1220, a closing section 1222, and/or an interactive interface element 1224. For example, the model-generated content-item can be generated to have a traditional email structure that may have variances based on the type of email and/or the user. The interactive interface element 1224 can be a selectable interface element to perform one or more actions, which may include navigating to a web portal.

FIG. 12B depicts an illustration of an example newsletter 1250 according to example embodiments of the present disclosure. In particular, the domain may be associated with newsletters. For example, news articles, article headlines, article ledes, and/or news blurbs may be submitted by a publisher and/or other user to the generative model to generate a newsletter 1250. The newsletter structure can include a header 1252 descriptive of a time, a location, a topic, and/or other context of the newsletter 1250. The newsletter structure can include a message from the editor 1254, which may include a newsletter introduction, primer, summary, and/or preface. The newsletter structure can then include a curated list of stories 1256, which may be indicated by story headlines, story summaries, story image thumbnails, and/or story hyperlinks.

Figure 13:
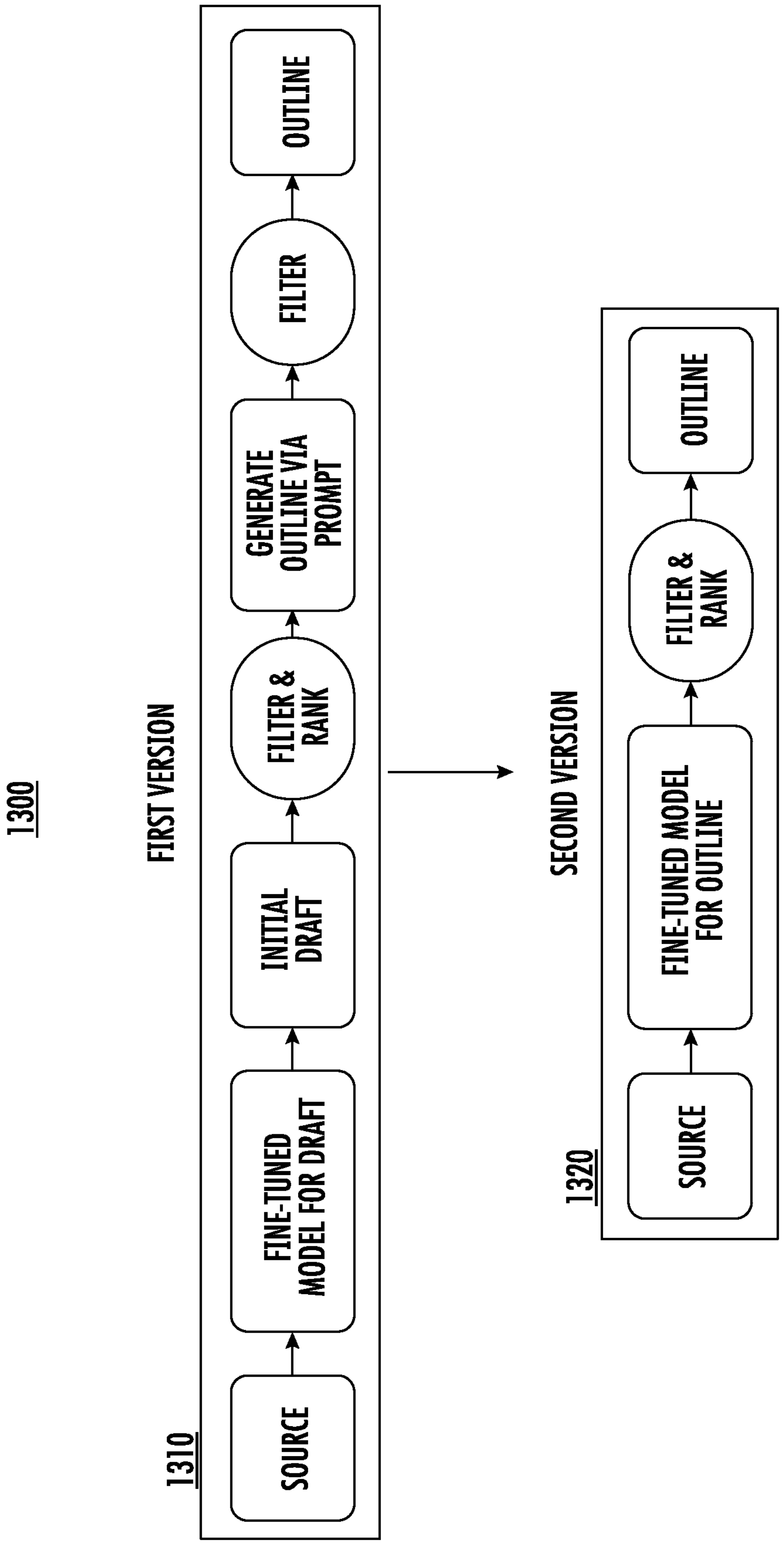
FIG. 13 depicts a block diagram of example outline generation systems according to example embodiments of the present disclosure.

FIG. 13 depicts a block diagram of example outline generation systems 1300 according to example embodiments of the present disclosure. The outline generation systems 1300 may include a plurality of configurations. For example, a first version 1310 can include processing source content with a fine-tuned model that is fine-tuned to generate a model-generated content item draft. The fine-tuned model can generate one or more initial drafts based on the source content. The one or more initial drafts can then be filtered and/or ranked. A particular initial draft may then be selected based on the filtering and/or ranking. The particular initial draft may then be processed to generate an outline based on processing an outline generation prompt. The outline(s) may be filtered before being provided for display to the user.

A second version 1320 can be streamlined by fine-tuning the generative model for outline generation. For example, the fine-tuned generative model can process the source content to directly generate one or more model-generated outlines. The one or more model-generated outlines can be filtered and/or ranked to select a particular model-generated outline that can then be provided to the user for display.

FIG. 14 depicts an illustration of an example mark-up interface 1400 according to example embodiments of the present disclosure. In particular, the mark-up interface 1400 can be leveraged to show annotations of evaluation data points for a model-generated content item 1402. For example, the model-generated content item 1402 can be processed to evaluate the model-generated content item 1402 on a plurality of signals, which may include appropriateness, grounding, length, recitation, attribution, verbatim, and/or other signals. The marked-up version 1404 can be displayed in the mark-up interface 1400 to indicate which portions may have potential issues (e.g., verbatim language, inaccurate facts, is potentially inappropriate, inaccurate recitation, incorrect and/or lack of attribution, and/or a length outside of a threshold range) and/or which portions have factual grounding, proper recitation, and/or other evaluation signals. The mark-up can then be utilized to show portions that may need to be edited.

Figure 15:
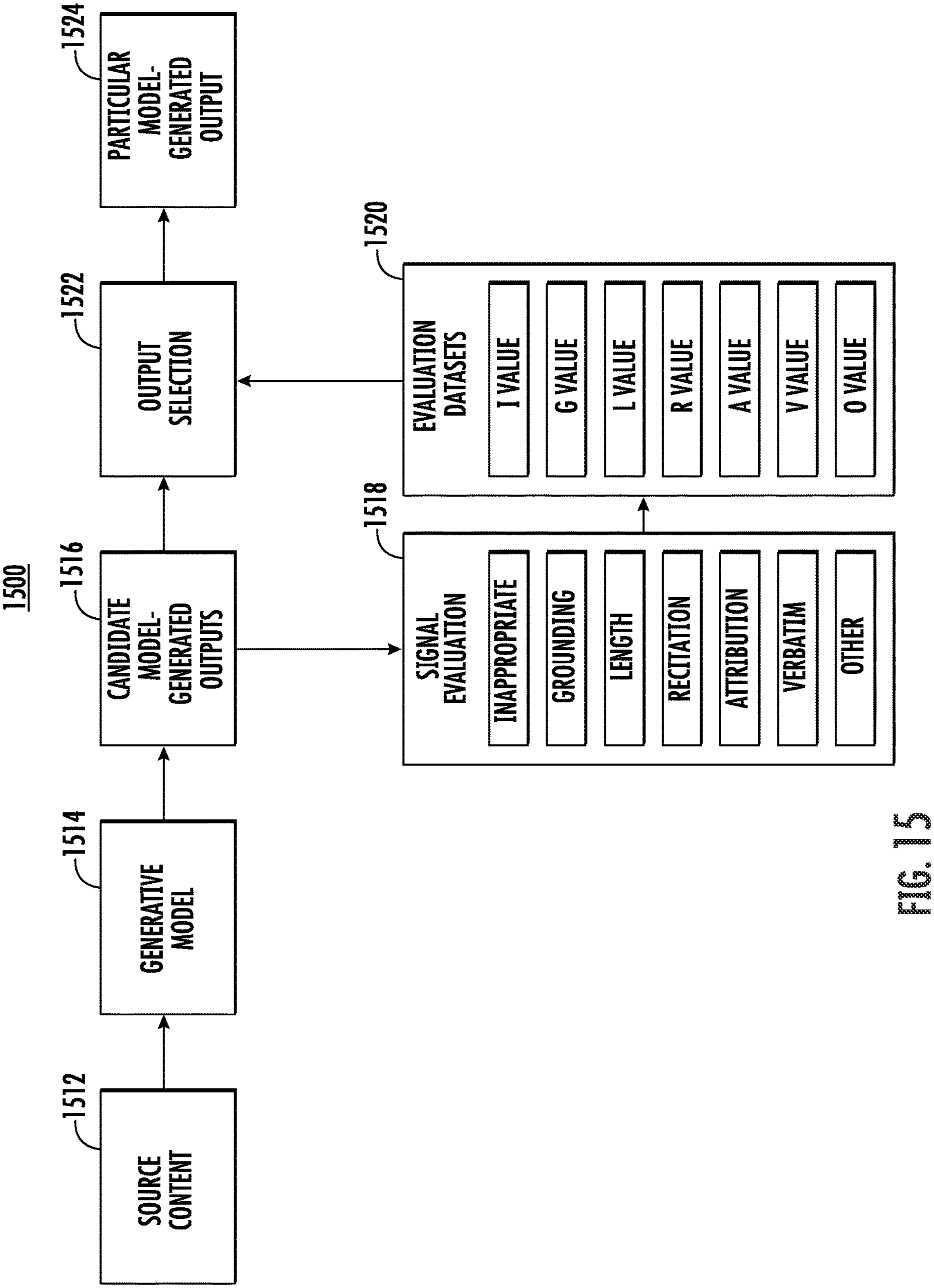
FIG. 15 depicts a block diagram of an example candidate model-generated content item selection system according to example embodiments of the present disclosure.

FIG. 15 depicts a block diagram of an example candidate model-generated content item selection system 1500 according to example embodiments of the present disclosure. In particular, the candidate model-generated content item selection system 1500 can process the source content 1512 with one or more generative models 1514 to generate a plurality of candidate model-generated outputs 1516. The plurality of candidate model-generated outputs 1516 can then be processed to perform signal evaluation 1518 for the plurality of candidate model-generated outputs 1516 to generate a plurality of respective evaluation datasets 1520. The plurality of respective evaluation datasets 1520 can then be utilized for output selection 1522 to select a particular model-generated output 1524 to provide to the user computing system.

For example, the candidate model-generated content item selection system 1500 can obtain source content 1512. The source content 1512 can include a set of details to be leveraged to generate a longform domain-specific content item. The source content 1512 can include a press release, interviews, experimental data, a set of news articles, a fact pattern, and/or other source information.

The source content 1512 can be processed to select one or more particular generative models 1514 to utilize. For example, the source content 1512 can be processed to determine one or more tasks associated with the source content 1512. One or more particular generative models 1514 of a plurality of candidate generative models may be determined based on the one or more tasks. The plurality of candidate generative models can include a plurality of domain-specific generative models that may perform differently on different tasks. In particular, the plurality of candidate generative models may have different configurations, different training datasets, different tuning datasets, and/or different sizes.

The one or more generative models 1514 can process the source content 1512 to generate a plurality of candidate model-generated outputs 1516 (e.g., a plurality of candidate model-generated content items). The plurality of candidate model-generated outputs 1516 (e.g., a plurality of draft domain-specific content items) can include a plurality of model-generated news articles, a plurality of model-generated research papers, a plurality of model-generated newsletters, a plurality of model-generated emails, and/or a plurality of other domain-specific model-generated content items.

The plurality of candidate model-generated outputs 1516 can then be evaluated via signal evaluation 1518. For example, each of the plurality of candidate model-generated outputs 1516 can be evaluated for inappropriateness, factual grounding, length, recitation, attribution, verbatim, and/or other quality signals. The inappropriateness can be associated with profanity, sensitive topics, pornography, private information, legality, gore, and/or other appropriateness factors. The factual grounding can be determined based on whether facts in the candidate model-generated outputs 1516 have factual grounding in the source content 1512 and/or other factual resources. The length can be determined based on a range associated with the particular domain. The recitation can be determined based on quotes and/or other direct recitations are accurately recited. The attribution can be based on the accuracy and/or appropriateness of attributions (e.g., quote attributions, resource citations, etc.). The verbatim can be determined based on a determined level of verbatim inclusion of content. For example, a likelihood of plagiarism may be determined.

The signal evaluation 1518 can be performed to generate a plurality of evaluation datasets 1520. Each of the plurality of evaluation datasets 1520 can include a plurality of signal values associated with a respective candidate model-generated output. Each evaluation dataset 1520 can include an inappropriateness value, a factual grounding value, a length value, a recitation value, an attribution value, a verbatim value, and/or other quality signal values.

The plurality of evaluation datasets 1520 can then be processed to perform output selection 1522. The output selection 1522 can include filtering and/or ranking. For example, the candidate model-generated outputs may be filtered to filter out candidate model-generated outputs that do not meet one or more thresholds (e.g., each value may have a threshold value). In some implementations, the output selection 1522 may include ranking the plurality of candidate model-generated outputs 1516 based on the plurality of respective evaluation datasets 1520.

The output selection 1522 can be performed to determine a particular model-generated output 1524 to provide to the user computing system as output. Alternatively and/or additionally, the particular model-generated output 1524 may be processed to generate a model-generated outline that may then be provided to the user computing system.

Figure 16:
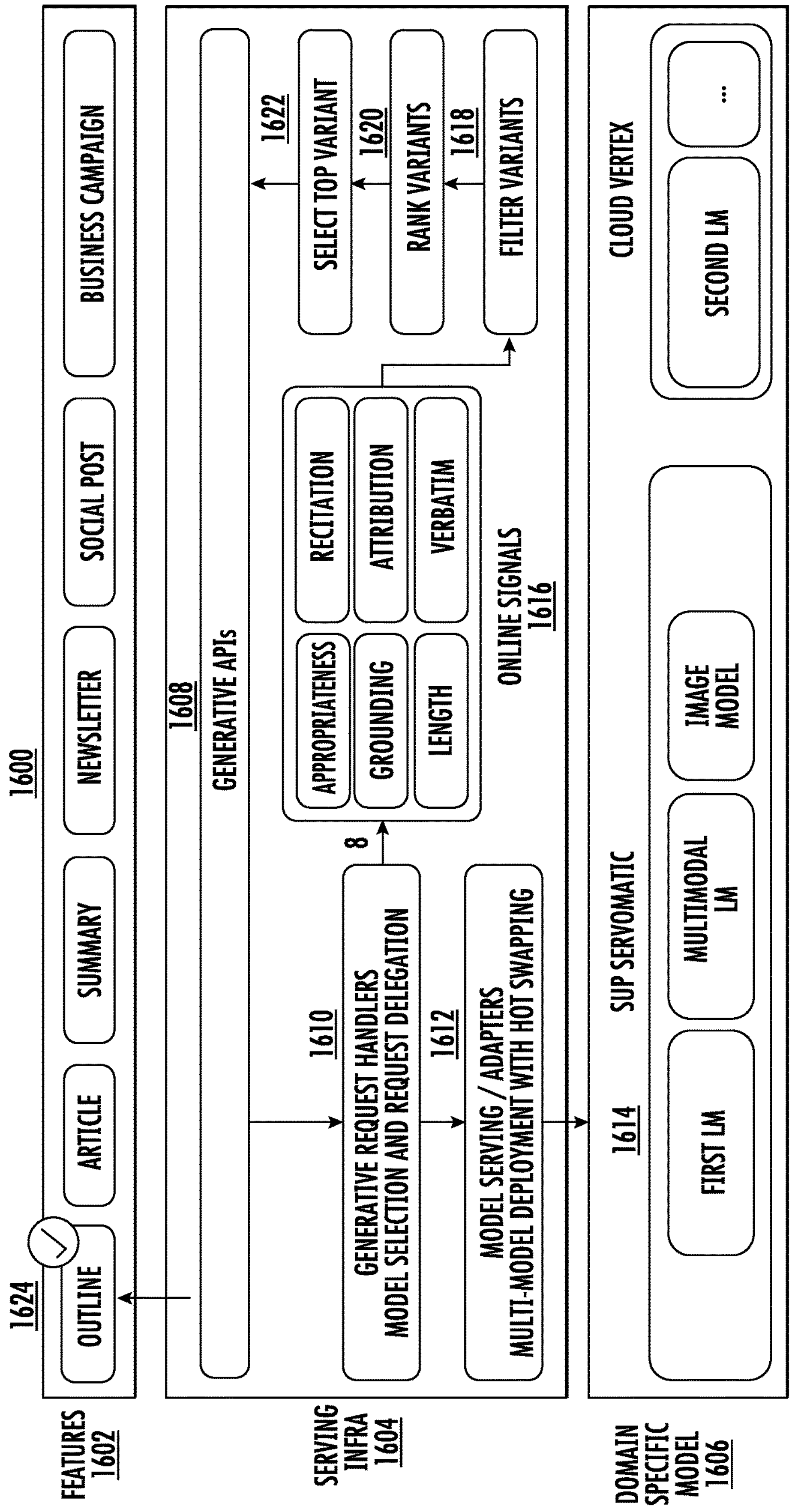
FIG. 16 depicts a block diagram of an example infrastructure system according to example embodiments of the present disclosure.

FIG. 16 depicts a block diagram of an example infrastructure system 1600 according to example embodiments of the present disclosure. The infrastructure system 1600 can process source content to select one or more domain-specific generative models 1606, which can then be utilized to process the source content to generate a plurality of candidate model-generated outputs (e.g., model-generated content items and/or model-generated outlines) that may then be evaluated to select a particular model-generated output to provide to the user.

In particular, the infrastructure system 1600 can include features 1602 for generating outlines 1624, articles, summaries, newsletters, social posts, business campaigns, and/or other content items. The infrastructure system 1600 can include a serving infrastructure 1604 for handling the input data obtainment, processing, output generation, output selection, and/or output transmission. The infrastructure system 1600 can include a plurality of different domain-specific models 1606 that may be utilized for content generation.

For example, the serving infrastructure 1604 can leverage a generative application programming interface 1608 to obtain input data and facilitate the output generation and/or processing. In particular, the generative application programming interface 1608 can instruct a generative request handler 1610 to have a model-serving/adapter 1612 interface with one or more domain specific models 1606, which may include a server stored model 1614 and/or a cloud stored model. The one or more particular domain-specific models 1606 may be selected for the content generation. The one or more domain specific models 1606 can include a first language model, a second language model, a multimodal language model, and/or an image generation model. The one or more particular domain-specific models 1606 can process the source content to generate a plurality of candidate model-generated outputs. The generation may be limited to a certain number of candidate model-generated outputs (e.g., eight).

The generative request handler 1610 may facilitate the evaluation of the plurality of candidate model-generated outputs based on a plurality of signals 1616. The plurality of signals 1616 can include a plurality of online signals, which may include an inappropriateness signal, a grounding signal, a length signal, a recitation signal, an attribution signal, a verbatim signal, and/or other signals. The plurality of candidate model-generated outputs (and/or variants) may then be filtered 1618 to filter out candidates that do not meet one or more signal thresholds. The remaining candidate model-generated outputs may then be ranked based on the plurality of signals 1616 to select 1622 a particular candidate model-generated output (e.g., a top variant).

The generative application programming interface 1608 may then transmit the particular candidate model-generated output (e.g., a top variant) to the user computing system for display.

FIGS. 17A-17H depicts illustrations of an example content generation interface according to example embodiments of the present disclosure. In particular, the content generation interface can be provided at a user computing device, which may include a desktop computer, a personal computer, a mobile computing device, a smart wearable, and/or other computing device.

Figure 17A:
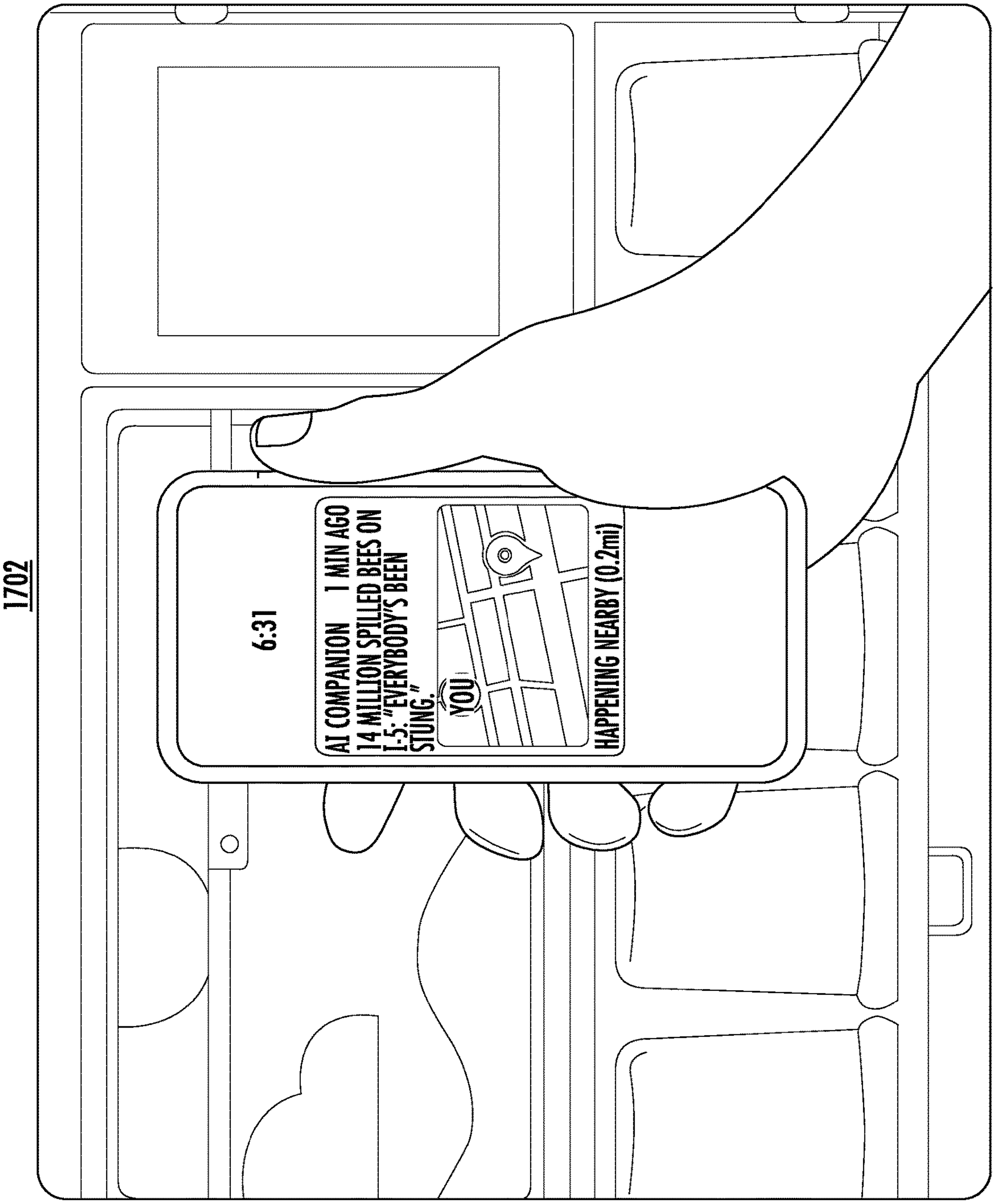
FIGS. 17A-17H depicts illustrations of an example content generation interface according to example embodiments of the present disclosure.

At 1702 of FIG. 17A, a mobile-first scenario can be provided for display. A journalist can use a content generation interface (e.g., an updraft companion) to track breaking news and report on a story while out in the field. The content generation interface can monitor public safety channels and other sources in the background to gather signals on potential new stories. When the content generation interface identifies a developing story, the content generation interface can trigger an alert.

Figure 17B:
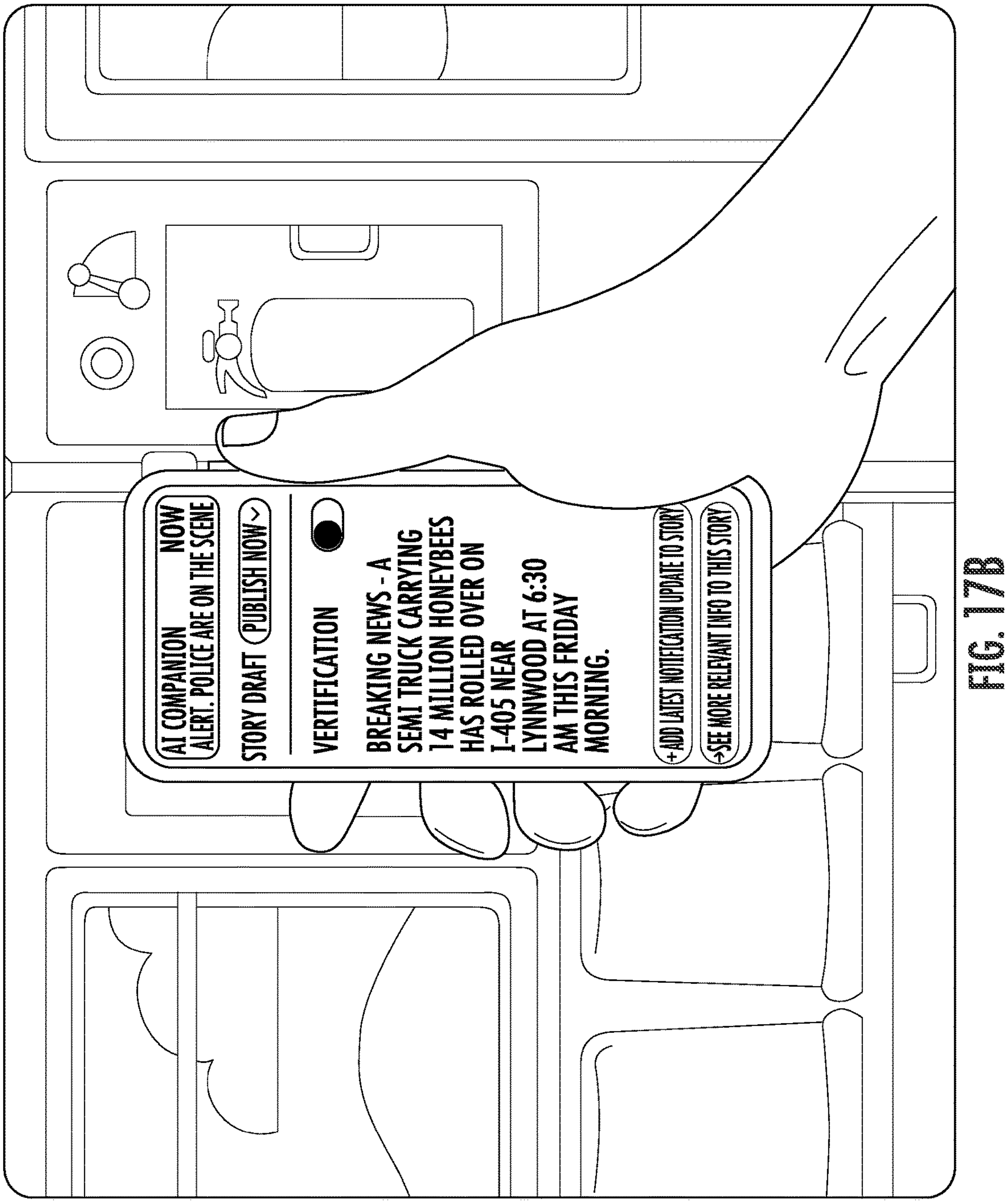

At 1704 of FIG. 17B, after a user taps on an alert, the journalist can respond quickly to draft a breaking news story with the domain-specific generative model. The tap can initiate the source content being transmitted to the domain-specific generative model to generate one or more model-generated content items (e.g., one or more news articles (e.g., one or more stories)).

Figure 17C:
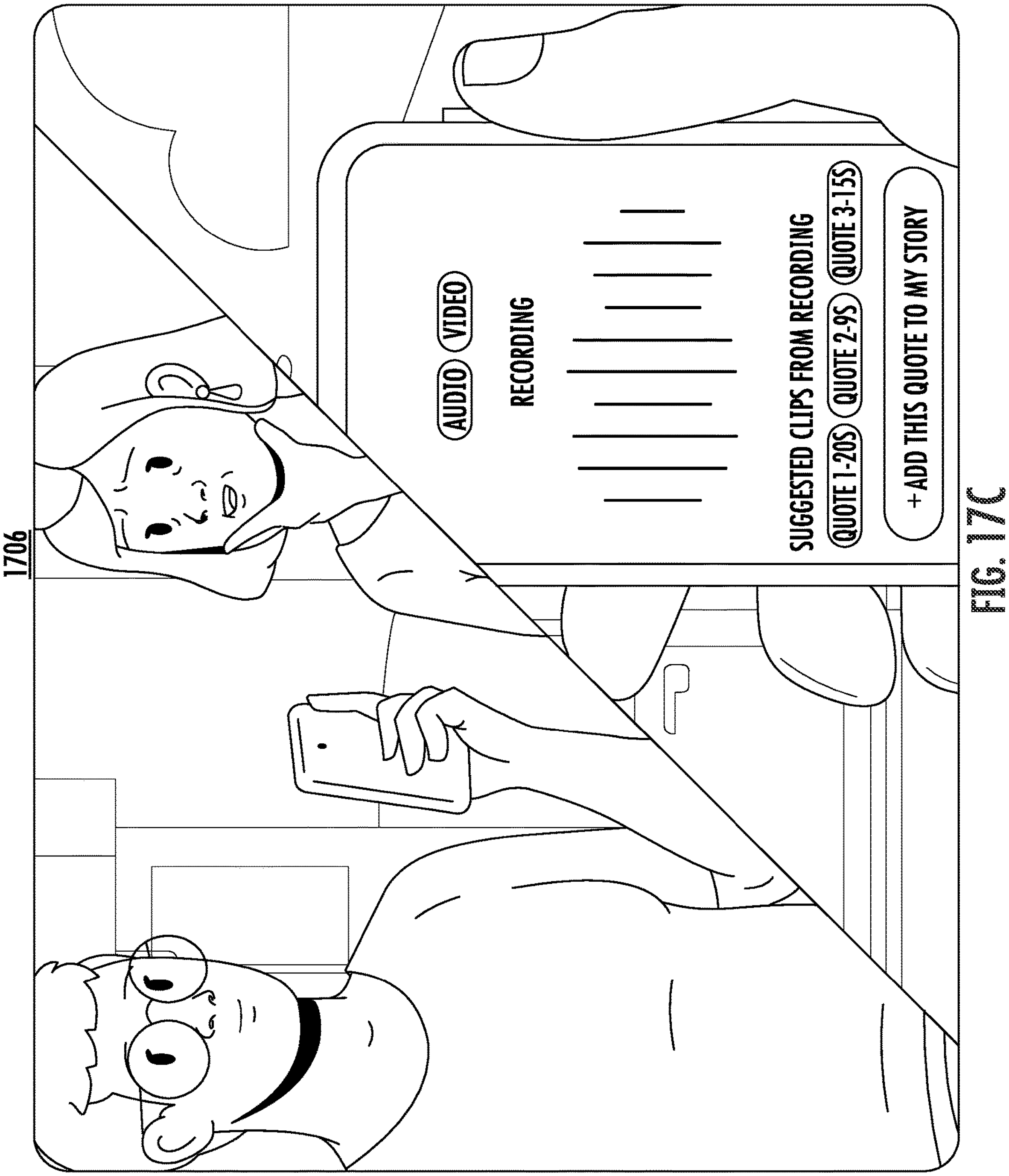

At 1706 of FIG. 17C, the journalist can arrive on the scene and can interview an eyewitness. The content generation interface can transcribe the recording and can summarize the interview with suggested "pull quotes" to add to the story. The transcribed interview and/or the summary may be provided with the news alert information to the domain-specific generative model to act as source content for generating the model-generated content item.

Figure 17D:
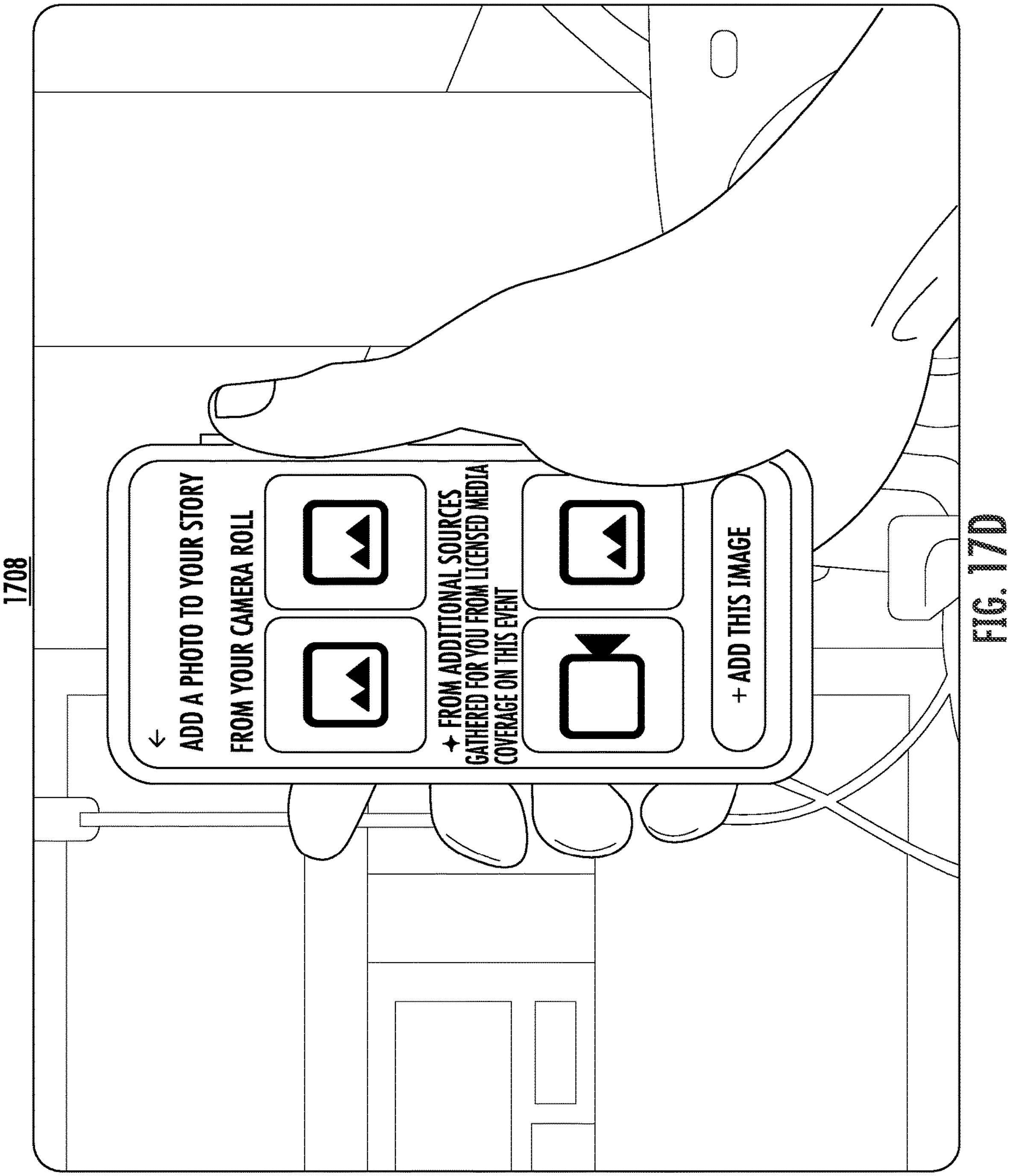

At 1708 of FIG. 17D, the journalist can take photos on the scene, can use the content generation interface to save the photos, can crop the one or more photos, and can organize the photos. The content generation interface can scan social media (e.g., the social media of the user and/or a user's image gallery) for additional imagery. The images may be obtained based on an embedding search, a label search, and/or a keyword search.

Figure 17E:
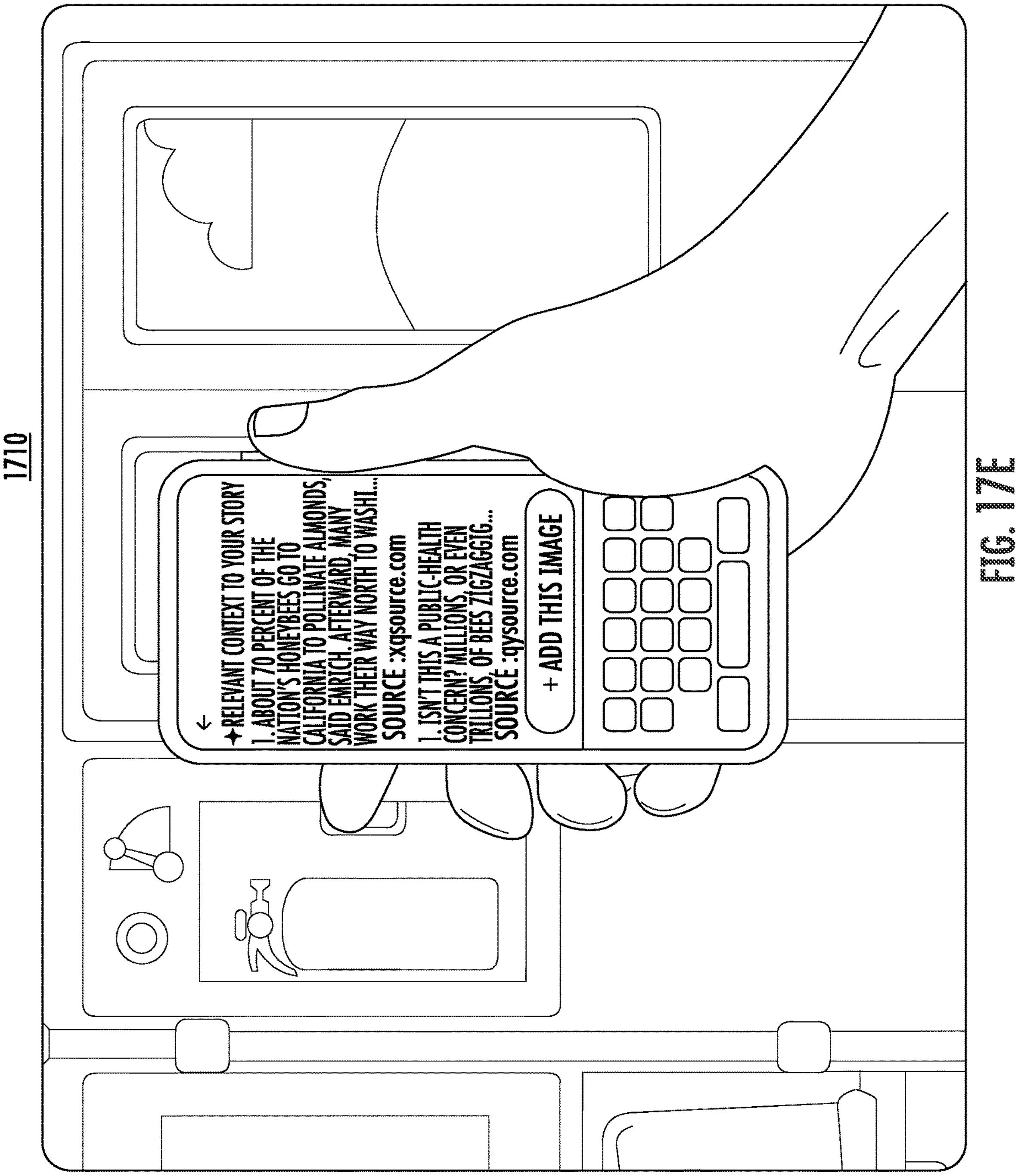

At 1710 of FIG. 17E, the content generation interface can search web sources in the background for additional contextually relevant information. The contextually relevant information can include "This is the 2nd truck accident at the same location this month," and/or "There are economic and environmental implications to the loss of pollinators." The contextually relevant information may be obtained from one or more trusted web resources.

Figure 17F:
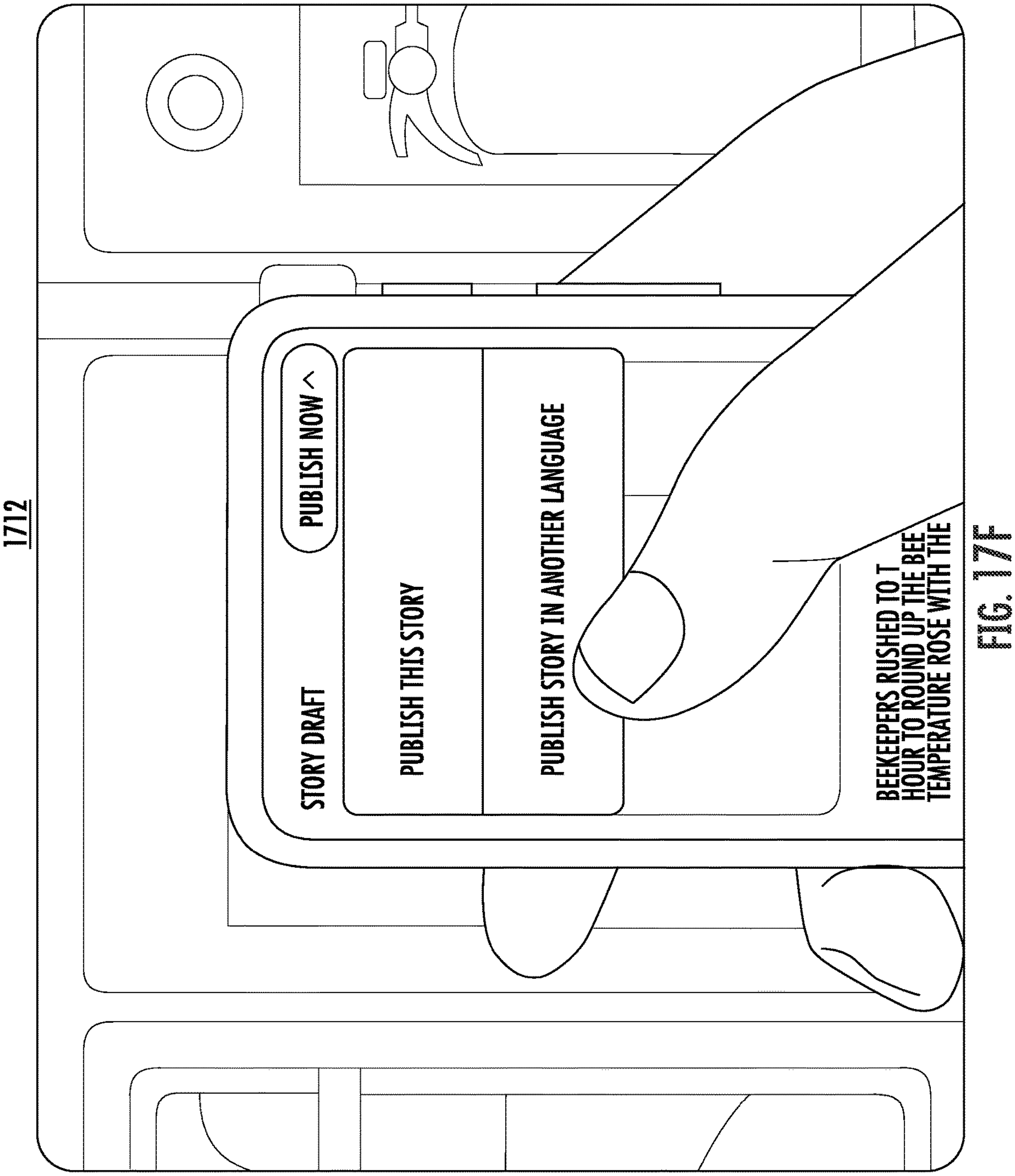

At 1712 of FIG. 17F, the journalist can tap Publish, and can see the option to publish the story as is, and may be given the option to translate the model-generated content item to another language. Additionally and/or alternatively, the user (i.e., the journalist) can be provided with options to edit (and/or update) the model-generated content item.

Figure 17G:
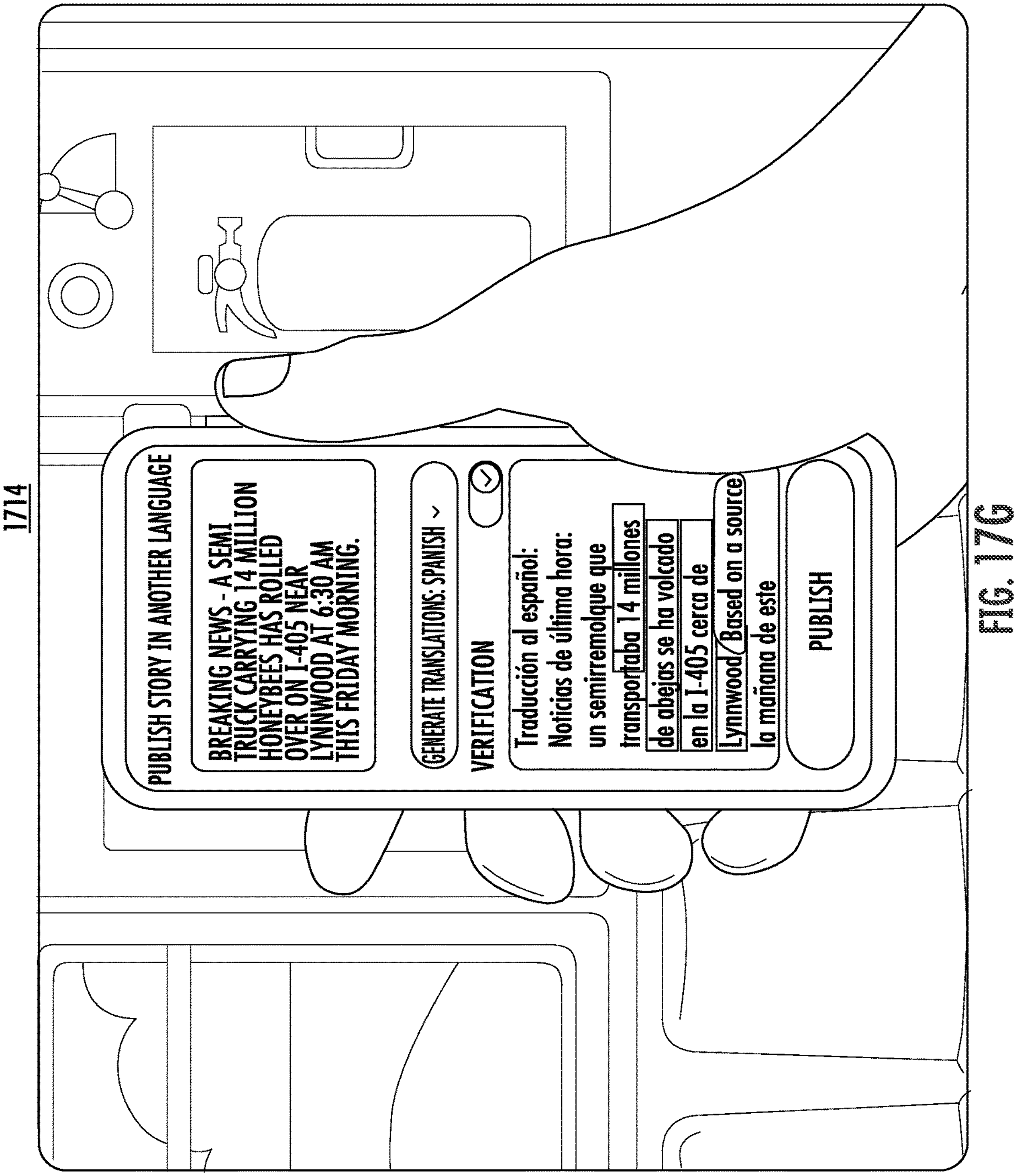

At 1714 of FIG. 17G, the journalist can choose to publish a Spanish version of the story (i.e., the model-generated content item), to serve a community's Spanish-speaking population. Additionally and/or alternatively, the content generation interface can enable the journalist to assess the quality of the translation and can verify that the story is still "grounded" in reliable sources.

Figure 17H:
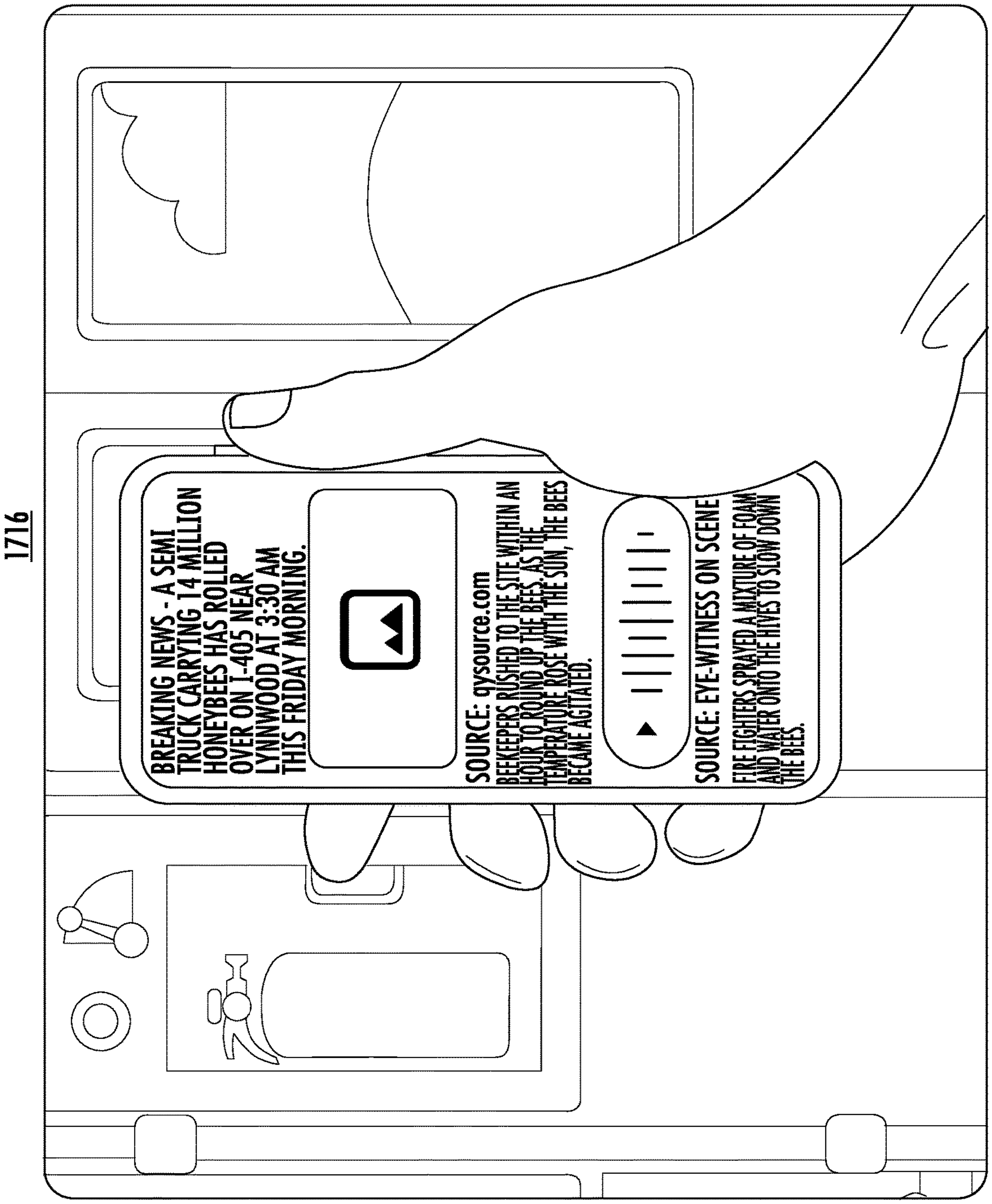

At 1716 of FIG. 17H, the story (i.e., the model-generated content item) story can be ready to go, and the journalist can publish the story directly from their mobile device to web/email/social media.

Figure 18:
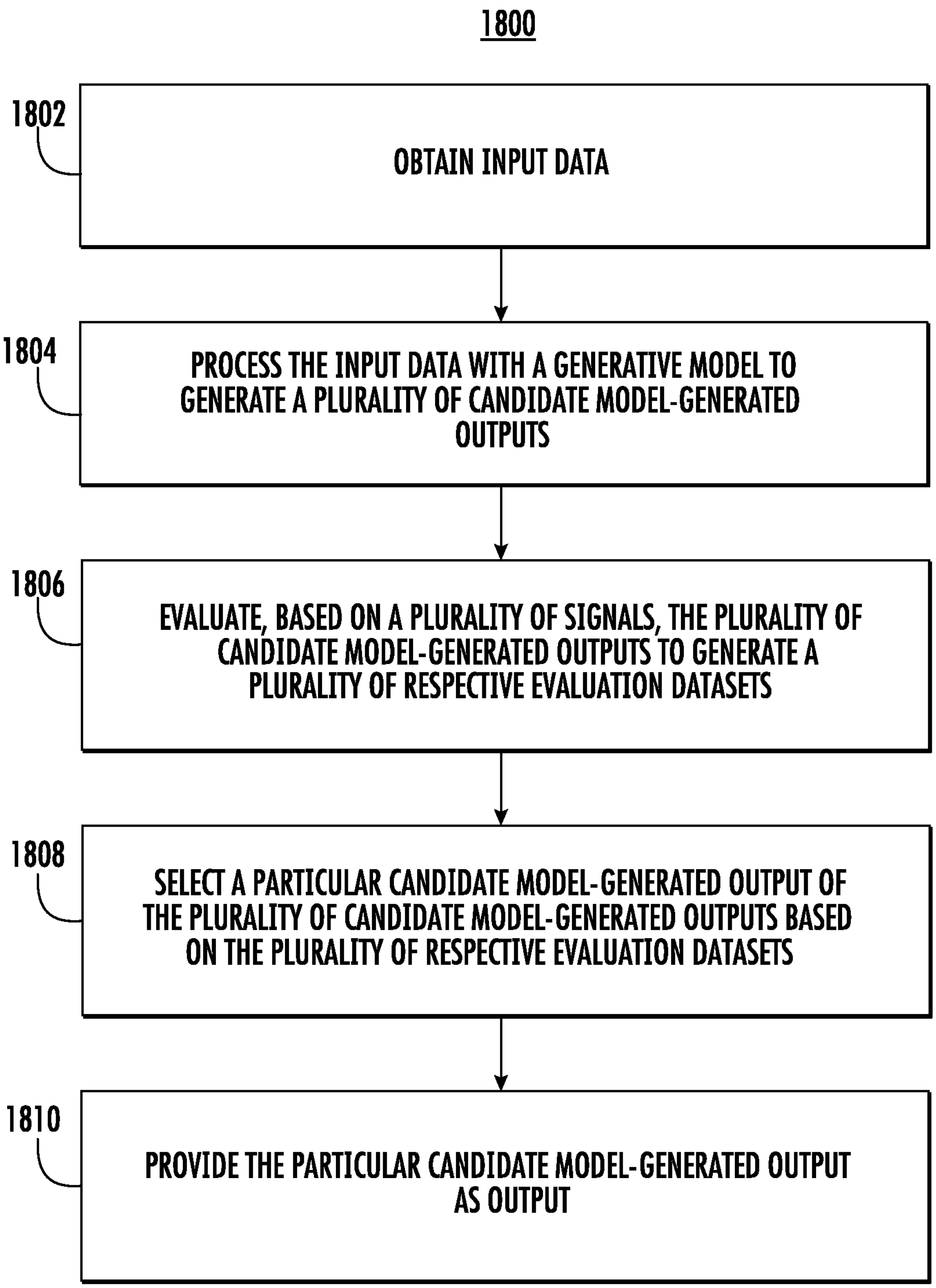
FIG. 18 depicts a flow chart diagram of an example method to perform candidate output selection according to example embodiments of the present disclosure.

FIG. 18 depicts a flow chart diagram of an example method to perform according to example embodiments of the present disclosure. Although FIG. 18 depicts steps performed in a particular order for purposes of illustration and discussion, the methods of the present disclosure are not limited to the particularly illustrated order or arrangement. The various steps of the method 1800 can be omitted, rearranged, combined, and/or adapted in various ways without deviating from the scope of the present disclosure.

At 1802, a computing system can obtain input data. The input data can include source content that includes a set of details associated with a topic. The input data may include a soft prompt associated with the particular user. The soft prompt may include a plurality of parameters and/or weights tuned to emulate the style of writing of the particular user. The source content may include a press release, interviews, a box score of a sporting event, an email, and/or other sources. The set of details may include a set of facts, a direction for a story, and/or other details.

At 1804, the computing system can process the input data with a generative model to generate a plurality of candidate model-generated outputs. The plurality of candidate model-generated outputs may include a plurality of candidate model-generated news article drafts. The plurality of candidate model-generated outputs (e.g., the plurality of candidate model-generated news article drafts) can be generated based on the source content. In some implementations, the generative model may have been tuned on a domain-specific training dataset associated with a particular field of expertise. For example, the generative model may have been tuned on a domain-specific training dataset that includes a plurality of news articles. The plurality of news articles can include a particular information structure and a particular set of publication type-specific stylistic characteristics. The generative model may include a domain-specific generative model. The domain-specific generative model may include a pre-trained generative language model that was tuned on a domain-specific training dataset to generate predicted content items that include one or more domain-specific attributes.

In some implementations, the domain-specific training dataset can include a plurality of content items of a particular publication type. The particular publication type can include a news article type, a research paper type, a newsletter type, an email type, and/or other publication type. The plurality of content items of the particular publication type can include a particular information structure and a particular set of publication type-specific stylistic characteristics. The particular information structure can include an inverted pyramid structure for news article types. For example, the news article can begin with the who, what, when, where, why, and how of the story (e.g., the most newsworthy information). The news article can then include important details that provide additional key details associated with the who, what, when, where, why, and how of the story. Other lesser details can then be included after the additional key details. The particular information structure for scientific research papers can include a high-level abstract then an introduction, then related works, then a discussion of the discovery including the researcher's method, then experimental data, and then a conclusion. The particular information structure for a newsletter can include a title, a greeting, an introduction, and a list of pertinent topics.

In some implementations, the particular set of publication type-specific stylistic characteristics can include the tone (e.g., a factual tone for news article), particular publication type-specific stylistic name or term use (e.g., news articles write out the full name of a person upon first instance, news articles may limit slang to quotes, and/or news articles may use particular term for a certain occupation, pace, or thing), particular lengths (e.g., news articles may have relatively short sentences and paragraphs, when compared to a literary review of an artistic work), publication type-specific citations (e.g., attribution in news articles can follow different citation style requirements than academic papers or law briefs), and/or other publication type-specific stylistic characteristics.

At 1806, the computing system can evaluate, based on a plurality of signals, the plurality of candidate model-generated outputs to generate a plurality of respective evaluation datasets. Each of the plurality of respective evaluation datasets can be associated with a respective candidate model-generated output (e.g., a respective model-generated news article draft) of the plurality of candidate model-generated outputs (e.g., the plurality of candidate model-generated news article drafts). The plurality of signals may be associated with appropriateness of the content, factual grounding, length, correct recitation of quotes and/or facts, proper attribution to the one or more sources, a level of verbatim word and/or phrase usage, and/or other quality signals. Evaluating the plurality of candidate model-generated outputs may include processing the source content and the plurality of candidate model-generated outputs with one or more machine-learned models. The one or more machine-learned models may include the generative model.

At 1808, the computing system can select a particular candidate model-generated output of the plurality of candidate model-generated outputs based on the plurality of respective evaluation datasets. Selecting the particular candidate model-generated output of the plurality of candidate model-generated outputs (e.g., a particular candidate model-generated news article draft of the plurality of candidate model-generated news article drafts) can include comparing the plurality of respective evaluation datasets. The selection may be based on candidate filtering based on the individual and/or combined signal-based evaluation values and/or based on signal-based evaluation value ranking.

In some implementations, selecting the particular candidate model-generated output of the plurality of candidate model-generated outputs based on the plurality of respective evaluation datasets can include filtering, based on the plurality of respective evaluation datasets, the plurality of candidate model-generated outputs based on a plurality of thresholds associated with the plurality of signals. The thresholds may differ for each signal being evaluated. For example, an appropriateness signal evaluation threshold may be more strict than a length signal evaluation threshold. In some implementations, if a candidate model-generated output is determined to include one or more hallucinations, the hallucinations may be removed, and/or the candidate model-generated output may be filtered out altogether.

Additionally and/or alternatively, selecting the particular candidate model-generated output of the plurality of candidate model-generated outputs based on the plurality of respective evaluation datasets can include comparing the plurality of plurality of respective evaluation datasets associated with the plurality of candidate model-generated outputs to generate a respective ranking for each of the plurality of candidate model-generated outputs and selecting the particular candidate model-generated output of the plurality of candidate model-generated outputs based on the respective rankings.

At 1810, the computing system can provide the particular candidate model-generated output as output. The particular candidate model-generated output (e.g., the particular candidate model-generated news article draft) may be provided for display in a graphical user interface. In some implementations, the particular candidate model-generated output may be published to a web platform and/or transmitted to one or more users. The web platform may include a news web page, a blogging platform, a video hosting platform, and/or other web platform. The particular candidate model-generated output may be transmitted via email and/or one or more other transmission techniques.

In some implementations, the computing system can process the input data to determine one or more particular generative models of a plurality of candidate generative models to process the source content with to generate the plurality of candidate model-generated outputs. The generative model can include the one or more particular generative models. The plurality of candidate generative models can include one or more generative language models and one or more image generation models.

In some implementations, processing the input data to determine the one or more particular generative models of a plurality of candidate generative models can include determining a particular task associated with the input data and determining the one or more particular generative models of a plurality of candidate generative models are associated with the particular task.

Additionally and/or alternatively, the computing system can process the particular candidate model-generated output (e.g., the particular candidate model-generated news article draft) with the generative model to generate an outline of the particular candidate model-generated output (e.g., an outline for the particular candidate model-generated news article draft) and provide the outline of the particular candidate model-generated output for display. The outline may be descriptive of high-level points (and/or topics) covered within the particular candidate model-generated output. The outline may be provided for display within the graphical user interface.

In some implementations, the computing system can obtain an augmentation input associated with a request to augment the outline of the particular candidate model-generated output. The computing system can generate an augmented outline based on the augmentation input and the outline of the particular candidate model-generated output and provide the augmented outline for display.

In some implementations, the computing system can process the augmented outline with the generative model to generate an updated model-generated output. The updated model-generated output can include an updated model-generated news article. The computing system can provide the updated model-generated output for display. The augmentation input can adjust the structure and one or more topic points of the outline of the particular candidate model-generated output. In some implementations, the updated model-generated output and the particular candidate model-generated output can include different structures. The updated model-generated output can include one or more additional sections associated with one or more additional topic points compared to the particular candidate model-generated output.

Figure 19:
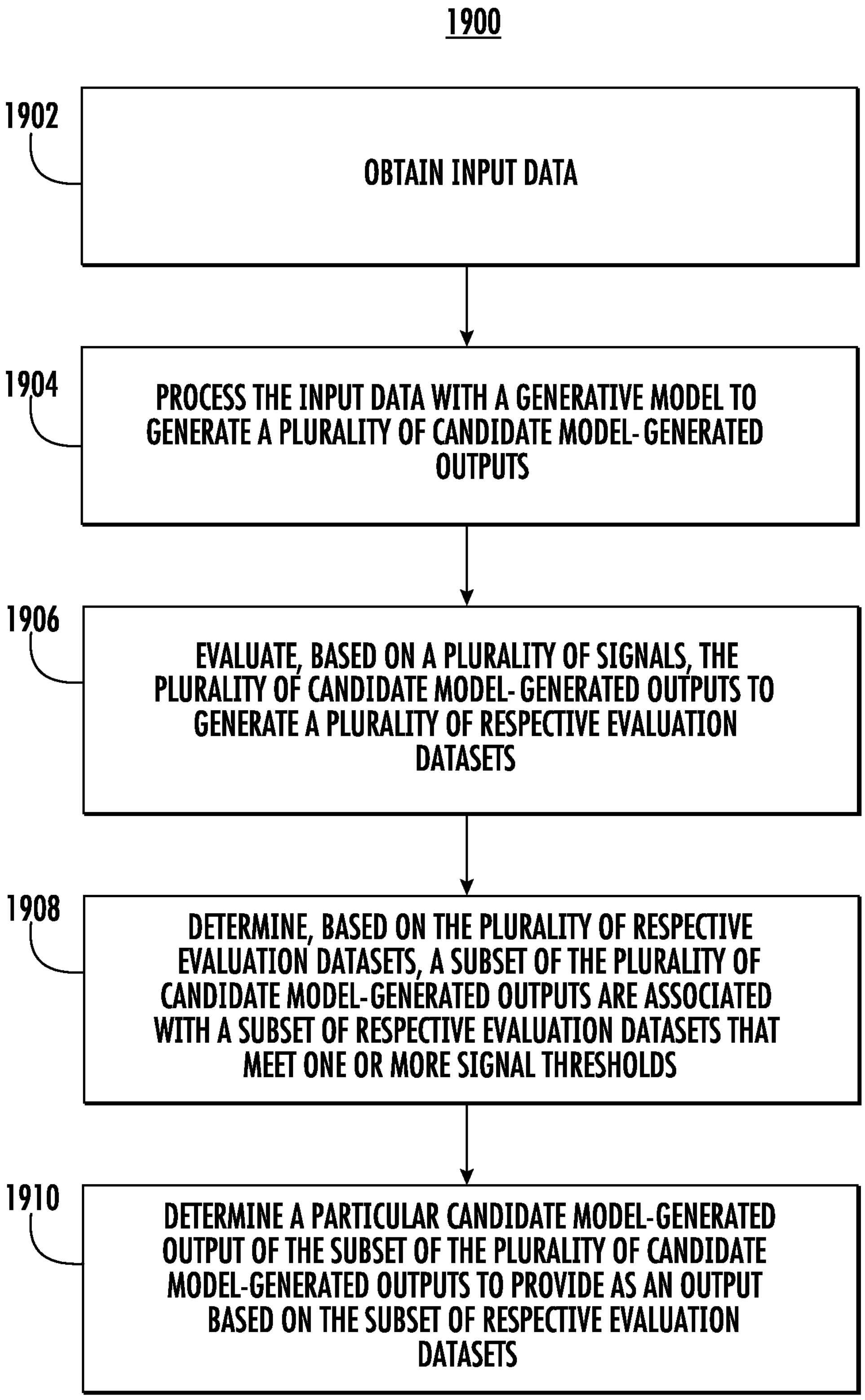
FIG. 19 depicts a flow chart diagram of an example method to perform candidate content item determination according to example embodiments of the present disclosure.

FIG. 19 depicts a flow chart diagram of an example method to perform according to example embodiments of the present disclosure. Although FIG. 19 depicts steps performed in a particular order for purposes of illustration and discussion, the methods of the present disclosure are not limited to the particularly illustrated order or arrangement. The various steps of the method 1900 can be omitted, rearranged, combined, and/or adapted in various ways without deviating from the scope of the present disclosure.

At 1902, a computing system can obtain input data. The input data can include source content that can include a set of details associated with a topic. The source content may include a press release, one or more interview transcripts, a set of facts, research data, and/or other source content. The particular topic can include an event (e.g., a crash, a heartfelt moment, a sporting event, etc.), a set of events, and/or other topics.

At 1904, the computing system can process the input data with a generative model to generate a plurality of candidate model-generated outputs. The plurality of candidate model-generated outputs can include a plurality of candidate model-generated news articles. The plurality of candidate model-generated outputs can be generated based on the source content. The generative model may have been tuned on a domain-specific training dataset associated with a particular field of expertise. For example, the generative model may have been tuned on a domain-specific training dataset associated with journalism. The domain-specific training dataset may include a plurality of news articles that include a particular information structure and a particular set of publication type-specific stylistic characteristics. In some implementations, the source content can include a press release associated with a particular topic. Each of the plurality of candidate model-generated outputs can include content associated with the particular topic. The plurality of candidate model-generated outputs can include a plurality of candidate news articles that includes at least a subset of the set of details from the press release.

In some implementations, the plurality of candidate model-generated outputs can include one or more domain-specific attributes. In some implementations, the source content can include a press release, the model-generated content item, and/or an updated model-generated content item may include model-generated news articles associated with the particular topic of the press release. Additionally and/or alternatively, the domain-specific generative model may have been tuned on a publisher-specific training dataset to generate content items that emulate the style of a particular publisher. The one or more domain-specific attributes may include a domain-specific structure, a domain-specific vocabulary, and/or a domain-specific tone. The domain-specific generative model may include a pre-trained generative language model that was then tuned for a domain-specific usage on a domain-specific training dataset.

In some implementations, the domain-specific training dataset can include a plurality of content items of a particular publication type. The particular publication type can include a news article type, a research paper type, a newsletter type, an email type, and/or other publication type. The plurality of content items of the particular publication type can include a particular information structure and a particular set of publication type-specific stylistic characteristics. The particular information structure can include an inverted pyramid structure for news article types. For example, the news article can begin with the who, what, when, where, why, and how of the story (e.g., the most newsworthy information). The news article can then include important details that provide additional key details associated with the who, what, when, where, why, and how of the story. Other lesser details can then be included after the additional key details. The particular information structure for scientific research papers can include a high-level abstract then an introduction, then related works, then a discussion of the discovery including the researcher's method, then experimental data, and then a conclusion. The particular information structure for a newsletter can include a title, a greeting, an introduction, and a list of pertinent topics.

In some implementations, the particular set of publication type-specific stylistic characteristics can include the tone (e.g., a factual tone for news article), particular publication type-specific stylistic name or term use (e.g., news articles write out the full name of a person upon first instance, news articles may limit slang to quotes, and/or news articles may use particular term for a certain occupation, pace, or thing), particular lengths (e.g., news articles may have relatively short sentences and paragraphs, when compared to a literary review of an artistic work), publication type-specific citations (e.g., attribution in news articles can follow different citation style requirements than academic papers or law briefs), and/or other publication type-specific stylistic characteristics.

At 1906, the computing system can evaluate, based on a plurality of signals, the plurality of candidate model-generated outputs to generate a plurality of respective evaluation datasets. Each of the plurality of respective evaluation datasets can be associated with a respective candidate model-generated output of the plurality of respective evaluation datasets. The plurality of signals may vary based on the domain. Alternatively and/or additionally, the evaluation techniques may vary based on the domain.

In some implementations, the plurality of signals can include a grounding signal. Each of the plurality of respective evaluation datasets can include a grounding metric descriptive of a level of factual grounding a respective candidate model generated output has. The level of factual grounding can be determined based on cross checking facts in the respective candidate model-generated output to facts in the source content.

Additionally and/or alternatively, the plurality of signals can include an attribution signal. Each of the plurality of respective evaluation datasets can include an attribution metric descriptive of a level of attribution a respective candidate model generated output has. The level of attribution can be determined based on determining a quality of attributions in the respective candidate model generated output associated with whether attributions are correctly included and whether the attributions cite a correct source.

Additionally and/or alternatively, the plurality of signals can include a verbatim signal. Each of the plurality of respective evaluation datasets can include a verbatim metric descriptive of a level of verbatim matching a respective candidate model generated output has with the source content.

At 1908, the computing system can determine, based on the plurality of respective evaluation datasets, a subset of the plurality of candidate model-generated outputs are associated with a subset of respective evaluation datasets that meet one or more signal thresholds. The determination may include ranking and/or filtering the plurality of candidate model-generated outputs based on the plurality of respective evaluation datasets.

At 1910, the computing system can determine a particular candidate model-generated output of the subset of the plurality of candidate model-generated outputs to provide as an output based on the subset of respective evaluation datasets. The determination may include ranking and/or filtering the plurality of candidate model-generated outputs based on the subset of respective evaluation datasets.

Figure 20:
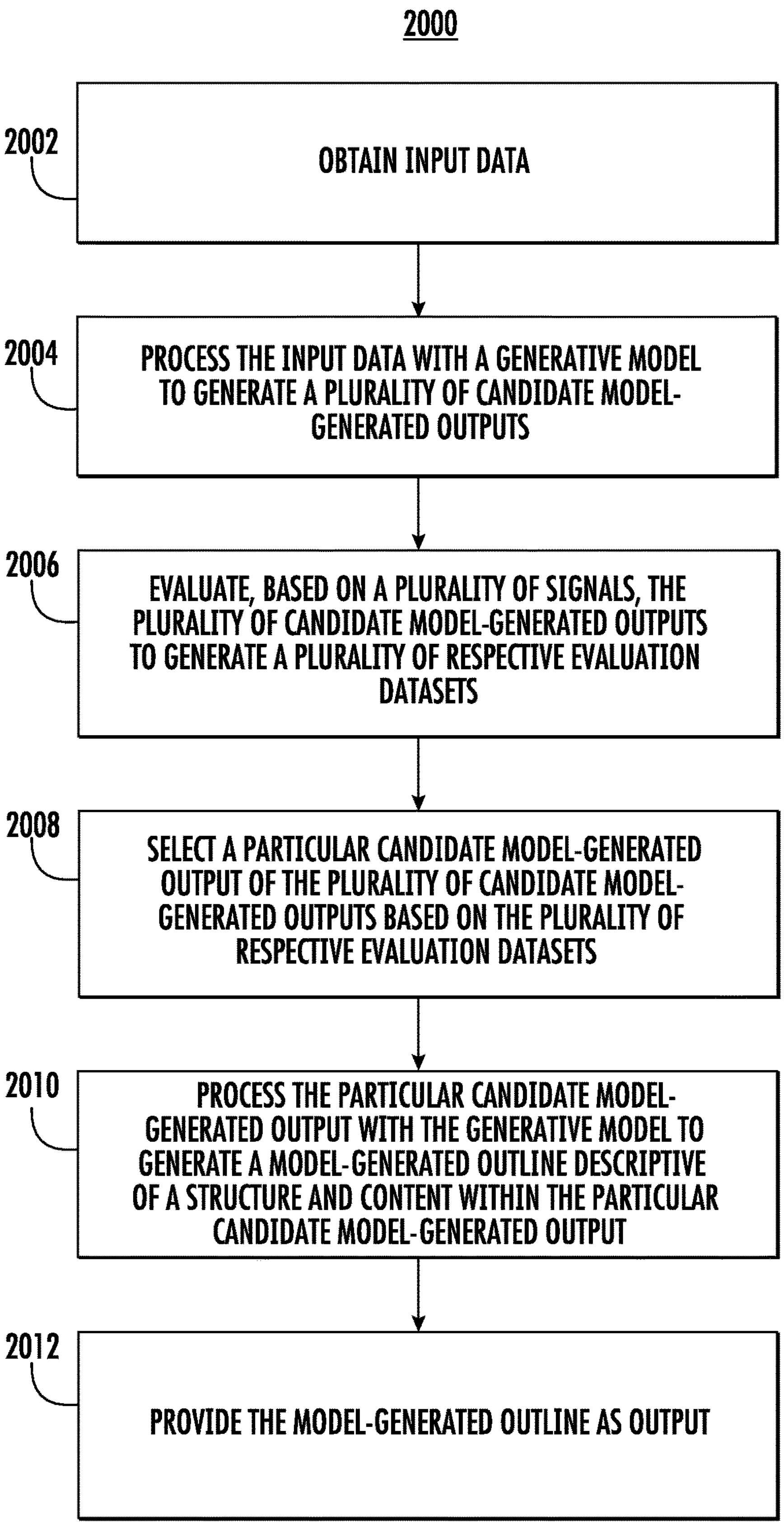
FIG. 20 depicts a flow chart diagram of an example method to perform outline generation according to example embodiments of the present disclosure.

FIG. 20 depicts a flow chart diagram of an example method to perform according to example embodiments of the present disclosure. Although FIG. 20 depicts steps performed in a particular order for purposes of illustration and discussion, the methods of the present disclosure are not limited to the particularly illustrated order or arrangement. The various steps of the method 2000 can be omitted, rearranged, combined, and/or adapted in various ways without deviating from the scope of the present disclosure.

At 2002, a computing system can obtain input data. The input data can include source content that includes a set of details associated with a topic. The input data may include a few-shot example for a domain-specific reference. The source content may include a press release, one or more interview transcripts, a fact pattern, a sporting event box score, research results, experimental data, and/or other source information. The few-shot example may include example news articles, example research papers, an example sports column, an example newsletter, an example email, and/or other example domain-specific content.

At 2004, the computing system can process the input data with a generative model to generate a plurality of candidate model-generated outputs. The plurality of candidate model-generated outputs can include a plurality of candidate model-generated news articles. Each of the plurality of candidate model-generated news articles can include a particular news article structure (e.g., beginning with a lede then having the following paragraphs having more background detail with decreasing levels of importance as the article goes on), a lede, a particular journalistic tone (e.g., an objective, factual tone), a particular style that meets style requirements of a journalism style book, and/or particular journalistic terminology. The plurality of candidate model-generated outputs can be generated based on the source content. In some implementations, the generative model may have been tuned on a domain-specific training dataset associated with a particular field of expertise. The generative model can include a pre-trained generative model that was tuned on the domain-specific training dataset after an initial training. The generative model may include an autoregressive language model. In some implementations, the generative model may include a diffusion model. The generative model may include one or more transformer models.

In some implementations, processing the input data with the generative model to generate the plurality of candidate model-generated outputs can include obtaining a set of tunable parameters associated with a particular user. The set of tunable parameters may have been tuned on a plurality of user-generated content items. Processing the input data with the generative model to generate the plurality of candidate model-generated outputs can include processing the input data and the set of tunable parameters with the generative model to generate the plurality of candidate model-generated outputs.

At 2006, the computing system can evaluate, based on a plurality of signals, the plurality of candidate model-generated outputs to generate a plurality of respective evaluation datasets. Each of the plurality of respective evaluation datasets can be associated with a respective candidate model-generated output of the plurality of respective evaluation datasets. The plurality of signals may be determined based on the domain. The plurality of signals may be determined by the generative model. In some implementations, the generative model may perform the evaluation.

At 2008, the computing system can select a particular candidate model-generated output of the plurality of candidate model-generated outputs based on the plurality of respective evaluation datasets. The selection may be performed based on evaluation value based filtering, which may include the utilization of one or more thresholds. The thresholds may be deterministic and/or may be machine-learned. Additionally and/or alternatively, the selection may be performed based on evaluation value based ranking.

At 2010, the computing system can process the particular candidate model-generated output with the generative model to generate a model-generated outline descriptive of a structure and content within the particular candidate model-generated output. In some implementations, the generative model for generating the outline may differ from the generative model for generating the particular candidate model-generated output. Alternatively and/or additionally, the same generative model may be utilized to perform the different generative tasks.

At 2012, the computing system can provide the model-generated outline as output. The model-generated outline may be provided for display in an interactive user interface that may be configured to receive inputs to augment the outline. The user may then utilize the interactive user interface to augment the outline. The augmented outline can then be processed to generate an updated model-generated content item.

In some implementations, an application programming interface can be utilized to transmit the source content to the generative model, obtain the plurality of candidate model-generated outputs, transmit the plurality of candidate model-generated outputs to a ranking engine, obtain the particular candidate model-generated output, and transmit the particular candidate model-generated output to the generative model to generate the model-generated outline.

Figure 21A:
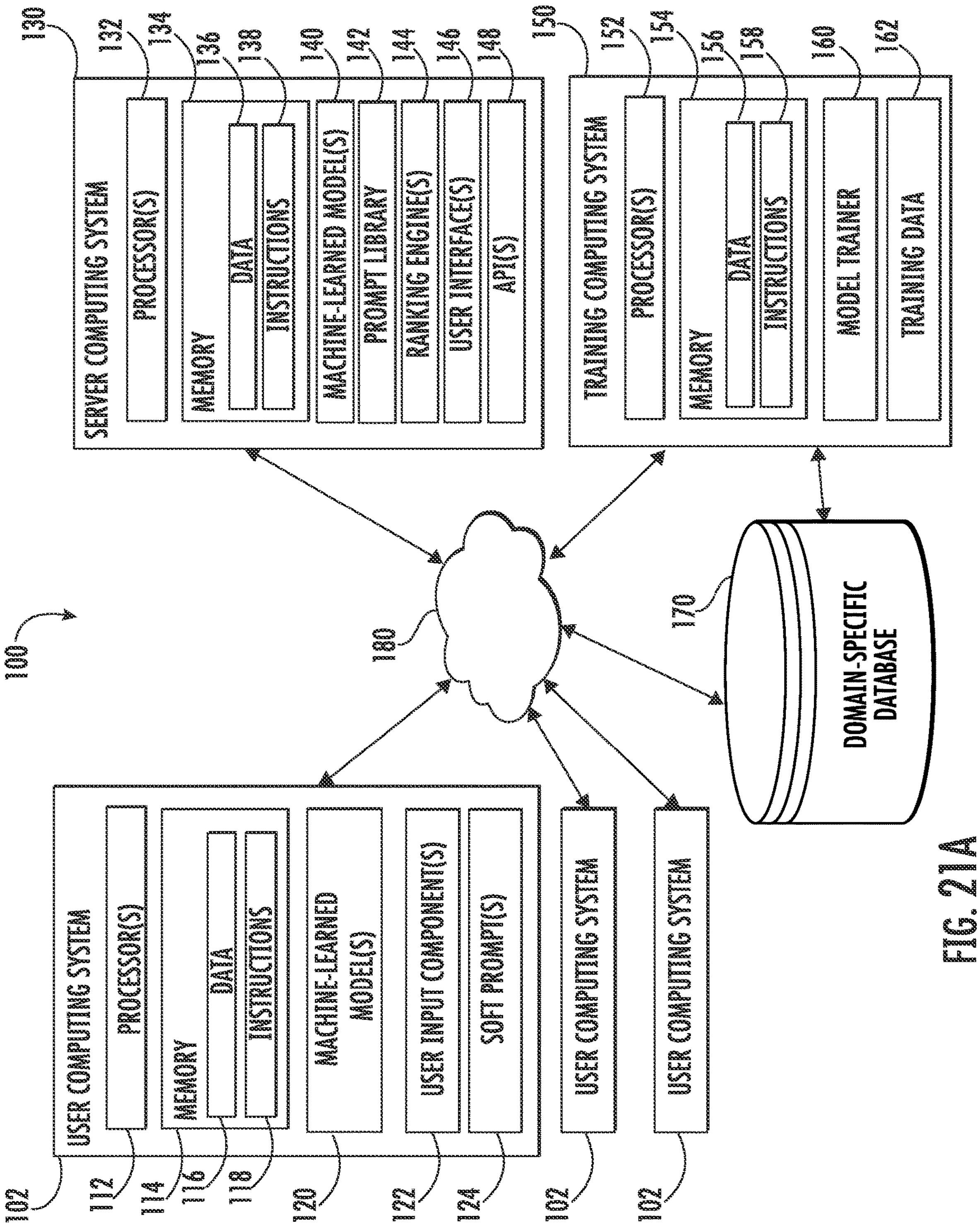
FIG. 21A depicts a block diagram of an example computing system that performs domain-specific content item generation according to example embodiments of the present disclosure.

FIG. 21A depicts a block diagram of an example computing system 100 that performs domain-specific content item generation according to example embodiments of the present disclosure. The system 100 includes a user computing system 102, a server computing system 130, and a training computing system 150 that are communicatively coupled over a network 180. The system 100 can include iterative communications between the user computing system 102, the server computing system 130, and/or the training computing system 150. For example, the user computing system 102 and the server computing system 130 may exchange transmissions upon each instance of content generation. Alternatively and/or additionally, the user computing system 102, the server computing system 130, and/or the training computing system 150 may be utilized to train one or more machine-learned models 120 and/or one or more soft prompts 124 that may then be transmitted and/or stored on the user computing system 102 for off server (and/or offline) content generation.

The user computing system 102 can include any type of computing device, such as, for example, a personal computing device (e.g., laptop or desktop), a mobile computing device (e.g., smartphone or tablet), a gaming console or controller, a wearable computing device, an embedded computing device, an edge computing device, and/or any other type of computing device.

The user computing system 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing system 102 to perform operations.

In some implementations, the user computing system 102 can store or include one or more machine-learned models 120 (e.g., machine-learned generative models). For example, the machine-learned models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks, and/or other forms of neural networks. The one or more machine-learned models 120 can include one or more feed-forward models, one or more recurrent models, one or more convolutional models, one or more self-attention models, one or more transformer models, and/or one or more other models. The one or more machine-learned models can include different layers, blocks, sub-models, and/or models in one or more configurations, which can include parallel processing, processing in series, bypass processing, recurrent processing, and/or a mixture of approaches. The one or more machine-learned models 120 can include pre-trained generative models that are then tuned based on a domain-specific training dataset. The one or more generative models may include one or more transformer models. In some implementations, the one or more generative models can include a large language model (e.g., a foundational model, a vision language model, etc.), an image generation model (e.g., a text-to-image model, an audio generation model, and/or one or more other data generation models. The one or more generative models may include an autoregressive language model and/or a diffusion model. Example machine-learned models 120 are discussed with reference to FIGS. 1-4, 7-10, 15-16, & 18-20.

In some implementations, the one or more machine-learned models 120 can be received from the server computing system 130 over network 180, stored in the user computing device memory 114, and then used or otherwise implemented by the one or more processors 112. In some implementations, the user computing system 102 can implement multiple parallel instances of a single machine-learned model 120 (e.g., to perform parallel domain-specific content item generation across multiple instances of input/obtained source content).

More particularly, the machine-learned model 120 can be trained and/or tuned for domain-specific content generation (e.g., a domain-specific generative model). The domain-specific content generation model can process input data to generate one or more domain-specific model-generated content items. The input data can include source content that can provide details (e.g., facts and/or a theme) that can be leveraged by the generative model to generate the one or more domain-specific model-generated content items. The domain may include news articles, research papers, newsletters, and/or another field of expertise. For example, a pre-trained generative model may be tuned to generate news articles based on press releases (e.g., the source content may be the press release and the domain-specific model-generated content item may be a model-generated news article).

Additionally or alternatively, one or more machine-learned models 140 can be included in or otherwise stored and implemented by the server computing system 130 that communicates with the user computing system 102 according to a client-server relationship. For example, the machine-learned models 140 can be implemented by the server computing system 130 as a portion of a web service (e.g., a domain-specific content item generation service). Thus, one or more models 120 can be stored and implemented at the user computing system 102 and/or one or more models 140 can be stored and implemented at the server computing system 130.

The user computing system 102 can also include one or more user input component 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

In some implementations, the computing system 100 may utilize one or more soft prompts 124 for conditioning the one or more machine-learned models (120 and/or 140) for downstream tasks. The one or more soft prompts 124 can include a set of tunable parameters that can be trained (or tuned) as the parameters of the one or more machine-learned models (120 and/or 140) are fixed. The one or more soft prompts 124 can be trained for a specific task and/or a specific set of tasks. Alternatively and/or additionally, the one or more soft prompts 124 may be trained to condition the one or more machine-learned models (120 and/or 140) to perform inferences for a particular individual and/or one or more entities such that the output is tailored for that particular individual and/or particular entities. The one or more soft prompts 124 can be obtained and processed with one or more inputs by the one or more machine-learned models (120 and/or 140).

The one or more soft prompts 124 can include a set of machine-learned weights. In particular, the one or more soft prompts 124 can include weights that were trained to condition a generative model to generate model-generated content items that emulate a style, tone, and/or vocabulary of a user and/or a set of users. For example, the one or more soft prompts 124 can be utilized by a user to generate the style, tone, and/or vocabulary of their manually authored works. The one or more soft prompts 124 can be extended to a plurality of users. For example, a publisher associated with a publication (e.g., a newspaper) may tune the set of parameters on a plurality of their content items to condition the generative model to generate content items that include their style, tone, and/or vocabulary. The one or more soft prompts 124 may include a plurality of learned vector representations that may be model-readable.

A particular soft prompt 124 can be obtained based on a particular user and/or set of users (e.g., members of a particular publishing company (e.g., a newspaper)). The particular soft prompt 124 can include a set of learned parameters. The set of learned parameters can be processed with the generative model to generate the model-generated content item.

The user computing system 102 and/or the server computing system 130 may store one or more soft prompts 124 associated with the particular user. The soft prompt(s) 124 can include a set of parameters. The user computing system 102 and/or the server computing system 130 may leverage the set of parameters of the soft prompt(s) 124 and a machine-learned content generation model to generate a model-generated content item. In some implementations, the model-generated content item can be generated based on the set of parameters associated with the particular user.

The utilization of a soft prompt (i.e., a set of parameters that can be processed with a generative model for downstream task conditioning) can reduce the computational cost for parameter tuning for user-specific content generation by reducing the parameters to be tuned. The set of parameters can be limited and may be adjusted while the parameters of the pre-trained generative model stay fixed. The set of parameters of the soft prompt can be utilized to condition the pre-trained generative model (e.g., the machine-learned content generation model) for particular downstream tasks (e.g., content generation that is associated with a style and/or vocabulary of a user).

In some implementations, the generative language model and/or one or more soft prompts 124 (e.g., a set of machine-learned parameters that can be processed with the input by the generative language model) can be trained to emulate the tone, style, and/or vocabulary of a particular user and/or a set of users to provide content items in terms, tone, styles, and/or dialects that a user traditionally uses.

Machine-learned model(s) 120 can be or include one or multiple machine-learned models or model components. Example machine-learned models can include neural networks (e.g., deep neural networks). Example machine-learned models can include non-linear models or linear models. Example machine-learned models can use other architectures in lieu of or in addition to neural networks. Example machine-learned models can include decision tree based models, support vector machines, hidden Markov models, Bayesian networks, linear regression models, k-means clustering models, etc.

Example neural networks can include feed-forward neural networks, recurrent neural networks (RNNs), including long short-term memory (LSTM) based recurrent neural networks, convolutional neural networks (CNNs), diffusion models, generative-adversarial networks, and/or other forms of neural networks. Example neural networks can be deep neural networks. Some example machine-learned models can leverage an attention mechanism such as self-attention. For example, some example machine-learned models can include multi-headed self-attention models.

Machine-learned model(s) can include a single or multiple instances of the same model configured to operate on data from input(s). Machine-learned model(s) can include an ensemble of different models that can cooperatively interact to process data from input(s). For example, machine-learned model(s) can employ a mixture-of-experts structure. See, e.g., Zhou et al., *Mixture-of-Experts with Expert Choice Routing*, arXiv:2202.09368v2 (Oct. 14, 2022).

Input(s) can generally include or otherwise represent various types of data. Input(s) can include one type or many different types of data. Output(s) can be data of the same type(s) or of different types of data as compared to input(s). Output(s) can include one type or many different types of data.

Example data types for input(s) or output(s) include natural language text data, software code data (e.g., source code, object code, machine code, or any other form of computer-readable instructions or programming languages), machine code data (e.g., binary code, assembly code, or other forms of machine-readable instructions that can be executed directly by a computer's central processing unit), assembly code data (e.g., low-level programming languages that use symbolic representations of machine code instructions to program a processing unit), genetic data or other chemical or biochemical data, image data, audio data, audiovisual data, haptic data, biometric data, medical data, financial data, statistical data, geographical data, astronomical data, historical data, sensor data generally (e.g., digital or analog values, such as voltage or other absolute or relative level measurement values from a real or artificial input, such as from an audio sensor, light sensor, displacement sensor, etc.), and the like. Data can be raw or processed and can be in any format or schema.

In multimodal inputs or outputs, example combinations of data types include image data and audio data, image data and natural language data, natural language data and software code data, image data and biometric data, sensor data and medical data, etc. It is to be understood that any combination of data types in an input or an output can be present.

An example input can include one or multiple data types, such as the example data types noted above. An example output can include one or multiple data types, such as the example data types noted above. The data type(s) of input can be the same as or different from the data type(s) of output. It is to be understood that the example data types noted above are provided for illustrative purposes only. Data types contemplated within the scope of the present disclosure are not limited to those examples noted above.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Example models 140 are discussed with reference to FIGS. 1-4, 7-10, 15-16, & 18-20.

In some implementations, the server computing system 130 can include a prompt library 142. The prompt library 142 can store a plurality of prompt templates and/or a plurality of soft prompts. The plurality of prompt templates can include hard prompt templates (e.g., text string data) that may be combined with the source content to generate a more detailed and complete prompt for the generative model to process. The templates can include text descriptive of the request. The templates may be domain-specific, user-specific, and/or content-specific. The plurality of prompt templates may include few-shot examples.

The prompt library 142 can store a plurality of soft prompts. The plurality of soft prompts may be associated with a plurality of different domains and/or a plurality of different users. The plurality of soft prompts can include learned parameters and/or learned weights that can be processed with the generative model to condition the generative model to generate content items with particular attributes. The plurality of soft prompts may have been tuned by freezing the parameters of a pre-trained generative model, while the parameters of the soft prompt are learned based on a particular task and/or user. The plurality of soft prompts can include a plurality of different soft prompts associated with a plurality of different users and/or a plurality of different sets of users.

The server computing system 130 may include one or more ranking engines 144. The one or more ranking engines 144 can include one or more functions and/or one or more machine-learned models. The one or more ranking engines 144 can be configured and/or trained to process a plurality of candidate model-generated content items to generate a ranking of the plurality of candidate model-generated content items based on one or more signals (e.g., a plurality of evaluation signals).

In some implementations, the server computing system 130 can include one or more user interfaces 146 that can be utilized to obtain input data and provide output data to the user computing system 102. The one or more user interfaces 146 can include graphical user interfaces configured to obtain inputs from a user and provide the outputs for display to the user. The one or more user interfaces 146 can include a source content input interface, an outline editing interface, a model-generated content item display interface, and/or one or more other interfaces.

Additionally and/or alternatively, the server computing system 130 may utilize one or more application programming interfaces (API) 148. The application programming interfaces can facilitate input retrieval, generative model interfacing, ranking engine transmissions, and/or other tasks. The application programming interfaces (API) 148 can facilitate the exchange of information between applications, models, computing systems, and/or platforms.

The user computing system 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing system 102 and/or the server computing system 130 using various training or learning techniques, such as, for example, backwards propagation of errors. For example, a loss function can be backpropagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated backpropagation through time. The model trainer 160 can perform a number of generalization techniques (e.g., weight decays, dropouts, etc.) to improve the generalization capability of the models being trained.

In particular, the model trainer 160 can train the machine-learned models 120 and/or 140 based on a set of training data 162. The training data 162 can include, for example, a domain-specific training dataset that may include a plurality of input examples (e.g., press releases, experimental data, etc.) and a plurality of respective domain-specific content items. The plurality of respective domain-specific content items can include example domain-specific content items (e.g., example news articles, example research papers, etc.). The plurality of domain-specific content items can include one or more domain-specific attributes.

Training can include utilizing and/or interfacing with a domain-specific database 170. The user computing system 102, the server computing system 130, and/or the training computing system 150 may communicate with the domain-specific database 170 via the network 180. Alternatively and/or additionally, the domain-specific database 170 may be part of the server computing system 130 and/or the training computing system 150.

The domain-specific database 170 can store one or more domain-specific training datasets. The domain-specific database 170 can include a plurality of content items associated with one or more domains (e.g., one or more fields of expertise (e.g., journalism, physics research papers, literary analysis theses, etc.)). In some implementations, the domain-specific database 170 can include a plurality of input examples, which can include a plurality of example source content datasets. The domain-specific database 170 can include real-world content items, curated content items, and/or synthetic content items (e.g., model-generated content items).

The domain-specific database 170 can be generated based on content item owners (e.g., authors, publishers, and/or other assignees) submitting their content items to the database. Users can be given the option on whether their content item is utilized for training and/or tuning. The system 100 can provide users with options on if, when, how, and/or to what extent their content items are utilized. Users can be provided with the option to not provide the content item for storage and/or usage. The domain-specific database 170 and/or the domain-specific training dataset can be limited to only input examples and/or content items that are received based on permissions provided by the rights holder of the particular input examples and/or content items. The user may direct the system 100 to only utilize their content during soft prompt tuning. The soft prompts 124 may then be stored on the user computing system 102 and/or the prompt library 142 with restrictions to only be utilized by the particular user. Rights holders and/or users can rescind their permissions, which can then cause the adjustment of if, when, how, and/or to what extent their content is utilized (which may include stopping all storage and/or usage).

The system 100 can leverage evaluation signals, filtering, and/or loss functions to train and/or configure the system to ensure that model-generated content items are not plagiarizing content items from the domain-specific database 170 and/or the domain-specific training dataset.

An example machine-learned model can include a generative model (e.g., a large language model, a foundation model, a vision language model, an image generation model, a text-to-image model, an audio generation model, and/or other generative models).

Training and/or tuning the machine-learned model can include obtaining a training instance. A set of training data can include a plurality of training instances divided between multiple datasets (e.g., a training dataset, a validation dataset, or testing dataset). A training instance can be labeled or unlabeled. The runtime inferences can form training instances when a model is trained using an evaluation of the model's performance on that runtime instance (e.g., online training/learning). Example data types for the training instance and various tasks associated therewith are described throughout the present disclosure.

Training and/or tuning can include processing, using one or more machine-learned models, the training instance to generate an output. The output can be directly obtained from the one or more machine-learned models or can be a downstream result of a chain of processing operations that includes an output of the one or more machine-learned models.

Training and/or tuning can include receiving an evaluation signal associated with the output. The evaluation signal can be obtained using a loss function. Various determinations of loss can be used, such as mean squared error, likelihood loss, cross entropy loss, hinge loss, contrastive loss, or various other loss functions. The evaluation signal can be computed using known ground-truth labels (e.g., supervised learning), predicted or estimated labels (e.g., semi- or self-supervised learning), or without labels (e.g., unsupervised learning). The evaluation signal can be a reward (e.g., for reinforcement learning). The reward can be computed using a machine-learned reward model configured to generate rewards based on output(s) received. The reward can be computed using feedback data describing human feedback on the output(s).

Training and/or tuning can include updating the machine-learned model using the evaluation signal. For example, values for parameters of the machine-learned model(s) can be learned, in some embodiments, using various training or learning techniques, such as, for example, backwards propagation. For example, the evaluation signal can be backpropagated from the output (or another source of the evaluation signal) through the machine-learned model(s) to update one or more parameters of the model(s) (e.g., based on a gradient of the evaluation signal with respect to the parameter value(s)). For example, system(s) containing one or more machine-learned models can be trained in an end-to-end manner. Gradient descent techniques can be used to iteratively update the parameters over a number of training iterations. In some implementations, performing backwards propagation of errors can include performing truncated backpropagation through time. Training and/or tuning can include implementing a number of generalization techniques (e.g., weight decays, dropouts, etc.) to improve the generalization capability of the models being trained.

In some implementations, the above training loop can be implemented for training a machine-learned model from an initialized state to a fully trained state (e.g., when the model exhibits a desired performance profile, such as based on accuracy, precision, recall, etc.).

In some implementations, the above training loop can be implemented for particular stages of a training procedure. For instance, in some implementations, the above training loop can be implemented for pre-training a machine-learned model. Pre-training can include, for instance, large-scale training over potentially noisy data to achieve a broad base of performance levels across a variety of tasks/data types. In some implementations, the above training loop can be implemented for fine-tuning a machine-learned model. Fine-tuning can include, for instance, smaller-scale training on higher-quality (e.g., labeled, curated, etc.) data. Fine-tuning can affect all or a portion of the parameters of a machine-learned model. For example, various portions of the machine-learned model can be "frozen" for certain training stages. For example, parameters associated with an embedding space can be "frozen" during fine-tuning (e.g., to retain information learned from a broader domain(s) than present in the fine-tuning dataset(s)). An example fine-tuning approach includes reinforcement learning. Reinforcement learning can be based on user feedback on model performance during use.

In some implementations, the one or more machine-learned models (e.g., 120 and/or 140) can include one or more generative models to generate a model-generated content item that can then be provided to a user. The generation may be prompted based on a user selection and/or may be automatically performed (e.g., automatically performed based on one or more conditions, which may be associated with a threshold amount of search results not being identified).

The one or more generative models can include language models (e.g., large language models and/or vision language models), image generation models (e.g., text-to-image generation models and/or image augmentation models), audio generation models, video generation models, graph generation models, and/or other data generation models (e.g., other content generation models). The one or more generative models can include one or more transformer models, one or more convolutional neural networks, one or more recurrent neural networks, one or more feedforward neural networks, one or more generative adversarial networks, one or more self-attention models, one or more embedding models, one or more encoders, one or more decoders, and/or one or more other models. In some implementations, the one or more generative models can include one or more autoregressive models (e.g., a machine-learned model trained to generate predictive values based on previous behavior data) and/or one or more diffusion models (e.g., a machine-learned model trained to generate predicted data based on generating and processing distribution data associated with the input data).

The one or more generative models can be trained to process input data and generate model-generated content items, which may include a plurality of predicted words, pixels, signals, and/or other data. The model-generated content items may include novel content items that are not the same as any pre-existing work. The one or more generative models can leverage learned representations, sequences, and/or probability distributions to generate the content items, which may include phrases, storylines, settings, objects, characters, beats, lyrics, and/or other aspects that are not included in pre-existing content items.

The one or more generative models may include a vision language model. The vision language model can be trained, tuned, and/or configured to process image data and/or text data to generate a natural language output. The vision language model may leverage a pre-trained large language model (e.g., a large autoregressive language model) with one or more encoders (e.g., one or more image encoders and/or one or more text encoders) to provide detailed natural language outputs that emulate natural language composed by a human.

The vision language model may be utilized for zero-shot image classification, few shot image classification, image captioning, multimodal query distillation, multimodal question and answering, and/or may be tuned and/or trained for a plurality of different tasks. The vision language model can perform visual question answering, image caption generation, feature detection (e.g., content monitoring (e.g. for inappropriate content)), object detection, scene recognition, and/or other tasks.

The vision language model may leverage a pre-trained language model that may then be tuned for multimodality. Training and/or tuning of the vision language model can include image-text matching, masked-language modeling, multimodal fusing with cross attention, contrastive learning, prefix language model training, and/or other training techniques. For example, the vision language model may be trained to process an image to generate predicted text that is similar to ground truth text data (e.g., a ground truth caption for the image). In some implementations, the vision language model may be trained to replace masked tokens of a natural language template with textual tokens descriptive of features depicted in an input image. Alternatively and/or additionally, the training, tuning, and/or model inference may include multi-layer concatenation of visual and textual embedding features. In some implementations, the vision language model may be trained and/or tuned via jointly learning image embedding and text embedding generation, which may include training and/or tuning a system to map embeddings to a joint feature embedding space that maps text features and image features into a shared embedding space. The joint training may include image-text pair parallel embedding and/or may include triplet training. In some implementations, the images may be utilized and/or processed as prefixes to the language model.

The one or more generative models may be stored on-device and/or may be stored on a server computing system. In some implementations, the one or more generative models can perform on-device processing to determine suggested searches, suggested actions, and/or suggested prompts. The one or more generative models may include one or more compact vision language models that may include less parameters than a vision language model stored and operated by the server computing system. The compact vision language model may be trained via distillation training. In some implementations, the visional language model may process the display data to generate suggestions. The display data can include a single image descriptive of a screenshot and/or may include image data, metadata, and/or other data descriptive of a period of time preceding the current displayed content (e.g., the applications, images, videos, messages, and/or other content viewed within the past 30 seconds). The user computing device may generate and store a rolling buffer window (e.g., 30 seconds) of data descriptive of content displayed during the buffer. Once the time has elapsed, the data may be deleted. The rolling buffer window data may be utilized to determine a context, which can be leveraged for query, content, action, and/or prompt suggestion.

In some implementations, the generative models can include machine-learned sequence processing models. An example system can pass inputs to sequence processing models. Sequence processing models can include one or more machine-learned components. Sequence processing models can process the data from inputs to obtain an input sequence. Input sequence can include one or more input elements obtained from inputs. The sequence processing model can process the input sequence using prediction layers to generate an output sequence. The output sequence can include one or more output elements generated based on input sequence. The system can generate outputs based on output sequence.

Sequence processing models can include one or multiple machine-learned model components configured to ingest, generate, or otherwise reason over sequences of information. For example, some example sequence processing models in the text domain are referred to as "Large Language Models," or LLMs. See, e.g., "PaLM 2 Technical Report," Google, https://ai.google/static/documents/palm2techreport.pdf (n.d.). Other example sequence processing models can operate in other domains, such as image domains, see, e.g., Dosovitskiy et al., *An Image is Worth* 16×16 *Words: Transformers for Image Recognition at Scale*, arXiv: 2010.11929v2 (Jun. 3, 2021), audio domains, see, e.g., Agostinelli et al., *MusicLM: Generating Music From Text*, arXiv:2301.11325v1 (Jan. 26, 2023), biochemical domains, see, e.g., Jumper et al., Highly accurate protein structure prediction with AlphaFold, 596 Nature 583 (Aug. 26, 2021), by way of example. Sequence processing models can process one or multiple types of data simultaneously. Sequence processing models can include relatively large models (e.g., more parameters, computationally expensive, etc.), relatively small models (e.g., fewer parameters, computationally lightweight, etc.), or both.

In general, sequence processing models can obtain an input sequence using data from inputs. For instance, input sequence can include a representation of data from inputs in a format understood by sequence processing models. One or more machine-learned components of sequence processing models can ingest the data from inputs, parse the data into pieces compatible with the processing architectures of sequence processing models (e.g., via "tokenization"), and project the pieces into an input space associated with prediction layers (e.g., via "embedding").

Sequence processing models can ingest the data from inputs and parse the data into a sequence of elements to obtain input sequence. For example, a portion of input data from inputs can be broken down into pieces that collectively represent the content of the portion of the input data. The pieces can provide the elements of the sequence.

In some implementations, processing the input data can include tokenization. For example, a tokenizer may process a given portion of an input source and output a series of tokens (e.g., corresponding to input elements) that represent the portion of the input source. Various approaches to tokenization can be used. For instance, textual input sources can be tokenized using a byte-pair encoding (BPE) technique. See, e.g., Kudo et al., *SentencePiece: A simple and language independent subword tokenizer and detokenizer for Neural Text Processing,* Proceedings of the 2018 Conference on Empirical Methods in Natural Language Processing (System Demonstrations), pages 66-71 (Oct. 31-Nov. 4, 2018), https://aclanthology.org/D18-2012.pdf. Image-based input sources can be tokenized by extracting and serializing patches from an image.

In general, arbitrary data types can be serialized and processed into an input sequence.

Prediction layers can predict one or more output elements based on the input elements. Prediction layers can include one or more machine-learned model architectures, such as one or more layers of learned parameters that manipulate and transform the inputs to extract higher-order meaning from, and relationships between, input elements. In this manner, for instance, example prediction layers can predict new output elements in view of the context provided by input sequence.

Prediction layers can evaluate associations between portions of input sequence and a particular output element. These associations can inform a prediction of the likelihood that a particular output follows the input context. For example, consider the textual snippet, "The carpenter's toolbox was small and heavy. It was full of ______." Example prediction layers can identify that "It" refers back to "toolbox" by determining a relationship between the respective embeddings. Example prediction layers can also link "It" to the attributes of the toolbox, such as "small" and "heavy." Based on these associations, prediction layers can, for instance, assign a higher probability to the word "nails" than to the word "sawdust."

A transformer is an example architecture that can be used in prediction layers. See, e.g., Vaswani et al., *Attention Is All You Need*, arXiv:1706.03762v7 (Aug. 2, 2023). A transformer is an example of a machine-learned model architecture that uses an attention mechanism to compute associations between items within a context window. The context window can include a sequence that contains input sequence and potentially one or more output elements. A transformer block can include one or more attention layers and one or more post-attention layers (e.g., feedforward layers, such as a multi-layer perceptron).

Prediction layers can include other machine-learned model architectures in addition to or in lieu of transformer-based architectures. For example, recurrent neural networks (RNNs) and long short-term memory (LSTM) models can also be used, as well as convolutional neural networks (CNNs). In general, prediction layers can leverage various kinds of artificial neural networks that can understand or generate sequences of information.

Output sequence can include or otherwise represent the same or different data types as input sequence. For instance, input sequence can represent textual data, and output sequence can represent textual data. The input sequence can represent image, audio, or audiovisual data, and output sequence can represent textual data (e.g., describing the image, audio, or audiovisual data). It is to be understood that prediction layers, and any other interstitial model components of sequence processing models, can be configured to receive a variety of data types in input sequences and output a variety of data types in output sequences.

The output sequence can have various relationships to an input sequence. Output sequence can be a continuation of input sequence. The output sequence can be complementary to the input sequence. The output sequence can translate, transform, augment, or otherwise modify input sequence. The output sequence can answer, evaluate, confirm, or otherwise respond to input sequence. The output sequence can implement (or describe instructions for implementing) an instruction provided via an input sequence.

The output sequence can be generated autoregressively. For instance, for some applications, an output of one or more prediction layers can be passed through one or more output layers (e.g., softmax layer) to obtain a probability distribution over an output vocabulary (e.g., a textual or symbolic vocabulary) conditioned on a set of input elements in a context window. In this manner, for instance, the output sequence can be autoregressively generated by sampling a likely next output element, adding that element to the context window, and re-generating the probability distribution based on the updated context window, and sampling a likely next output element, and so forth.

The output sequence can also be generated non-autoregressively. For instance, multiple output elements of the output sequence can be predicted together without explicit sequential conditioning on each other. See, e.g., Saharia et al., "Non-Autoregressive Machine Translation with Latent Alignments," arXiv:2004.07437v3 (Nov. 16, 2020).

The output sequence can include one or multiple portions or elements. In an example content generation configuration, the output sequence can include multiple elements corresponding to multiple portions of a generated output sequence (e.g., a textual sentence, values of a discretized waveform, computer code, etc.). In an example classification configuration, the output sequence can include a single element associated with a classification output. For instance, an output "vocabulary" can include a set of classes into which an input sequence is to be classified. For instance, a vision transformer block can pass latent state information to a multilayer perceptron that outputs a likely class value associated with an input image.

In some implementations, if the user has provided consent, the training examples can be provided by the user computing system 102. Thus, in such implementations, the model 120 provided to the user computing system 102 can be trained by the training computing system 150 on user-specific data received from the user computing system 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM hard disk or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

The machine-learned models described in this specification may be used in a variety of tasks, applications, and/or use cases.

In some implementations, the input to the machine-learned model(s) of the present disclosure can be image data. The machine-learned model(s) can process the image data to generate an output. As an example, the machine-learned model(s) can process the image data to generate an image recognition output (e.g., a recognition of the image data, a latent embedding of the image data, an encoded representation of the image data, a hash of the image data, etc.). As another example, the machine-learned model(s) can process the image data to generate an image segmentation output. As another example, the machine-learned model(s) can process the image data to generate an image classification output. As another example, the machine-learned model(s) can process the image data to generate an image data modification output (e.g., an alteration of the image data, etc.). As another example, the machine-learned model(s) can process the image data to generate an encoded image data output (e.g., an encoded and/or compressed representation of the image data, etc.). As another example, the machine-learned model(s) can process the image data to generate an upscaled image data output. As another example, the machine-learned model(s) can process the image data to generate a prediction output.

In some implementations, the input to the machine-learned model(s) of the present disclosure can be text or natural language data. The machine-learned model(s) can process the text or natural language data to generate an output. As an example, the machine-learned model(s) can process the natural language data to generate a language encoding output. As another example, the machine-learned model(s) can process the text or natural language data to generate a latent text embedding output. As another example, the machine-learned model(s) can process the text or natural language data to generate a translation output. As another example, the machine-learned model(s) can process the text or natural language data to generate a classification output. As another example, the machine-learned model(s) can process the text or natural language data to generate a textual segmentation output. As another example, the machine-learned model(s) can process the text or natural language data to generate a semantic intent output. As another example, the machine-learned model(s) can process the text or natural language data to generate an upscaled text or natural language output (e.g., text or natural language data that is higher quality than the input text or natural language, etc.). As another example, the machine-learned model(s) can process the text or natural language data to generate a prediction output.

In some implementations, the input to the machine-learned model(s) of the present disclosure can be speech data. The machine-learned model(s) can process the speech data to generate an output. As an example, the machine-learned model(s) can process the speech data to generate a speech recognition output. As another example, the machine-learned model(s) can process the speech data to generate a speech translation output. As another example, the machine-learned model(s) can process the speech data to generate a latent embedding output. As another example, the machine-learned model(s) can process the speech data to generate an encoded speech output (e.g., an encoded and/or compressed representation of the speech data, etc.). As another example, the machine-learned model(s) can process the speech data to generate an upscaled speech output (e.g., speech data that is higher quality than the input speech data, etc.). As another example, the machine-learned model(s) can process the speech data to generate a textual representation output (e.g., a textual representation of the input speech data, etc.). As another example, the machine-learned model(s) can process the speech data to generate a prediction output.

In some implementations, the input to the machine-learned model(s) of the present disclosure can be latent encoding data (e.g., a latent space representation of an input, etc.). The machine-learned model(s) can process the latent encoding data to generate an output. As an example, the machine-learned model(s) can process the latent encoding data to generate a recognition output. As another example, the machine-learned model(s) can process the latent encoding data to generate a reconstruction output. As another example, the machine-learned model(s) can process the latent encoding data to generate a search output. As another example, the machine-learned model(s) can process the latent encoding data to generate a reclustering output. As another example, the machine-learned model(s) can process the latent encoding data to generate a prediction output.

In some implementations, the input to the machine-learned model(s) of the present disclosure can be statistical data. The machine-learned model(s) can process the statistical data to generate an output. As an example, the machine-learned model(s) can process the statistical data to generate a recognition output. As another example, the machine-learned model(s) can process the statistical data to generate a prediction output. As another example, the machine-learned model(s) can process the statistical data to generate a classification output. As another example, the machine-learned model(s) can process the statistical data to generate a segmentation output. As another example, the machine-learned model(s) can process the statistical data to generate a segmentation output. As another example, the machine-learned model(s) can process the statistical data to generate a visualization output. As another example, the machine-learned model(s) can process the statistical data to generate a diagnostic output.

In some implementations, the input to the machine-learned model(s) of the present disclosure can be sensor data. The machine-learned model(s) can process the sensor data to generate an output. As an example, the machine-learned model(s) can process the sensor data to generate a recognition output. As another example, the machine-learned model(s) can process the sensor data to generate a prediction output. As another example, the machine-learned model(s) can process the sensor data to generate a classification output. As another example, the machine-learned model(s) can process the sensor data to generate a segmentation output. As another example, the machine-learned model(s) can process the sensor data to generate a segmentation output. As another example, the machine-learned model(s) can process the sensor data to generate a visualization output. As another example, the machine-learned model(s) can process the sensor data to generate a diagnostic output. As another example, the machine-learned model(s) can process the sensor data to generate a detection output.

In some cases, the machine-learned model(s) can be configured to perform a task that includes encoding input data for reliable and/or efficient transmission or storage (and/or corresponding decoding). For example, the task may be an audio compression task. The input may include audio data and the output may include compressed audio data. In another example, the input can include visual data (e.g., one or more images or videos), the output can include compressed visual data, and the task can be a visual data compression task. In another example, the task may include generating an embedding for input data (e.g. input audio or visual data).

In some cases, the input can include visual data and the task is a computer vision task. In some cases, the input can include pixel data for one or more images, and the task can be an image processing task. For example, the image processing task can be image classification, where the output is a set of scores, each score corresponding to a different object class and representing the likelihood that the one or more images depict an object belonging to the object class. The image processing task may be object detection, where the image processing output identifies one or more regions in the one or more images and, for each region, a likelihood that region depicts an object of interest. As another example, the image processing task can be image segmentation, where the image processing output defines, for each pixel in the one or more images, a respective likelihood for each category in a predetermined set of categories. For example, the set of categories can be foreground and background. As another example, the set of categories can be object classes. As another example, the image processing task can be depth estimation, where the image processing output defines, for each pixel in the one or more images, a respective depth value. As another example, the image processing task can be motion estimation, where the network input includes multiple images, and the image processing output defines, for each pixel of one of the input images, a motion of the scene depicted at the pixel between the images in the network input.

In some cases, the input includes audio data representing a spoken utterance and the task is a speech recognition task. The output may include a text output which is mapped to the spoken utterance. In some cases, the task may include encrypting or decrypting input data. In some cases, the task can include a microprocessor performance task, such as branch prediction or memory address translation.

In some implementations, the task can be a generative task, and the one or more machine-learned models (e.g., 120 and/or 140) can be configured to output content generated in view of one or more inputs. For instance, the inputs can be or otherwise represent data of one or more modalities that encodes context for generating additional content.

In some implementations, the task can be a text completion task. The machine-learned models can be configured to process the inputs that represent textual data and to generate the outputs that represent additional textual data that completes a textual sequence that includes the inputs. For instance, the machine-learned models can be configured to generate the outputs to complete a sentence, paragraph, or portion of text that follows from a portion of text represented by inputs.

In some implementations, the task can be an instruction following task. The machine-learned models can be configured to process the inputs that represent instructions to perform a function and to generate the outputs that advance a goal of satisfying the instruction function (e.g., at least a step of a multi-step procedure to perform the function). The outputs can represent data of the same or of a different modality as the inputs. For instance, the inputs can represent textual data (e.g., natural language instructions for a task to be performed) and the machine-learned models can process the inputs to generate the outputs that represent textual data responsive to the instructions (e.g., natural language responses, programming language responses, machine language responses, etc.). The inputs can represent image data (e.g., image-based instructions for a task to be performed, optionally accompanied by textual instructions) and the machine-learned models can process the inputs to generate the outputs that represent textual data responsive to the instructions (e.g., natural language responses, programming language responses, machine language responses, etc.). One or more outputs can be iteratively or recursively generated to sequentially process and accomplish steps toward accomplishing the requested functionality. For instance, an initial output can be executed by an external system or be processed by the machine-learned models to complete an initial step of performing a function. Multiple steps can be performed, with a final output being obtained that is responsive to the initial instructions.

In some implementations, the task can be a question answering task. The machine-learned models can be configured to process the inputs that represent a question to answer and to generate the outputs that advance a goal of returning an answer to the question (e.g., at least a step of a multi-step procedure to perform the function). The outputs can represent data of the same or of a different modality as the inputs. For instance, the inputs can represent textual data (e.g., natural language instructions for a task to be performed) and the machine-learned models can process the inputs to generate the outputs that represent textual data responsive to the question (e.g., natural language responses, programming language responses, machine language responses, etc.). The inputs can represent image data (e.g., image-based instructions for a task to be performed, optionally accompanied by textual instructions) and the machine-learned models can process the inputs to generate the outputs that represent textual data responsive to the question (e.g., natural language responses, programming language responses, machine language responses, etc.). One or more outputs can be iteratively or recursively generated to sequentially process and accomplish steps toward answering the question. For instance, an initial output can be executed by an external system or be processed by the machine-learned models to complete an initial step of obtaining an answer to the question (e.g., querying a database, performing a computation, executing a script, etc.). Multiple steps can be performed, with a final output being obtained that is responsive to the question.

In some implementations, the task can be an image generation task. The machine-learned models can be configured to process the inputs that represent context regarding a desired portion of image content. The context can include text data, image data, audio data, etc. Machine-learned models can be configured to generate the outputs that represent image data that depicts imagery related to the context. For instance, the machine-learned models can be configured to generate pixel data of an image. Values for channels associated with the pixels in the pixel data can be selected based on the context (e.g., based on a probability determined based on the context).

In some implementations, the task can be an audio generation task. Machine-learned models can be configured to process the inputs that represent context regarding a desired portion of audio content. The context can include text data, image data, audio data, etc. The machine-learned models can be configured to generate the outputs that represent audio data related to the context. For instance, the machine-learned models can be configured to generate waveform data in the form of an image (e.g., a spectrogram). Values for channels associated with pixels of the image can be selected based on the context. The machine-learned models can be configured to generate waveform data in the form of a sequence of discrete samples of a continuous waveform. Values of the sequence can be selected based on the context (e.g., based on a probability determined based on the context).

In some implementations, the task can be a data generation task. Machine-learned models can be configured to process the inputs that represent context regarding a desired portion of data (e.g., data from various data domains, such as sensor data, image data, multimodal data, statistical data, etc.). The desired data can be, for instance, synthetic data for training other machine-learned models. The context can include arbitrary data types. The machine-learned models can be configured to generate the outputs that represent data that aligns with the desired data. For instance, the machine-learned models can be configured to generate data values for populating a dataset. Values for the data objects can be selected based on the context (e.g., based on a probability determined based on the context).

FIG. 21A illustrates one example computing system that can be used to implement the present disclosure. Other computing systems can be used as well. For example, in some implementations, the user computing system 102 can include the model trainer 160 and the training dataset 162. In such implementations, the models 120 can be both trained and used locally at the user computing system 102. In some of such implementations, the user computing system 102 can implement the model trainer 160 to personalize the models 120 based on user-specific data.

Figure 21B:
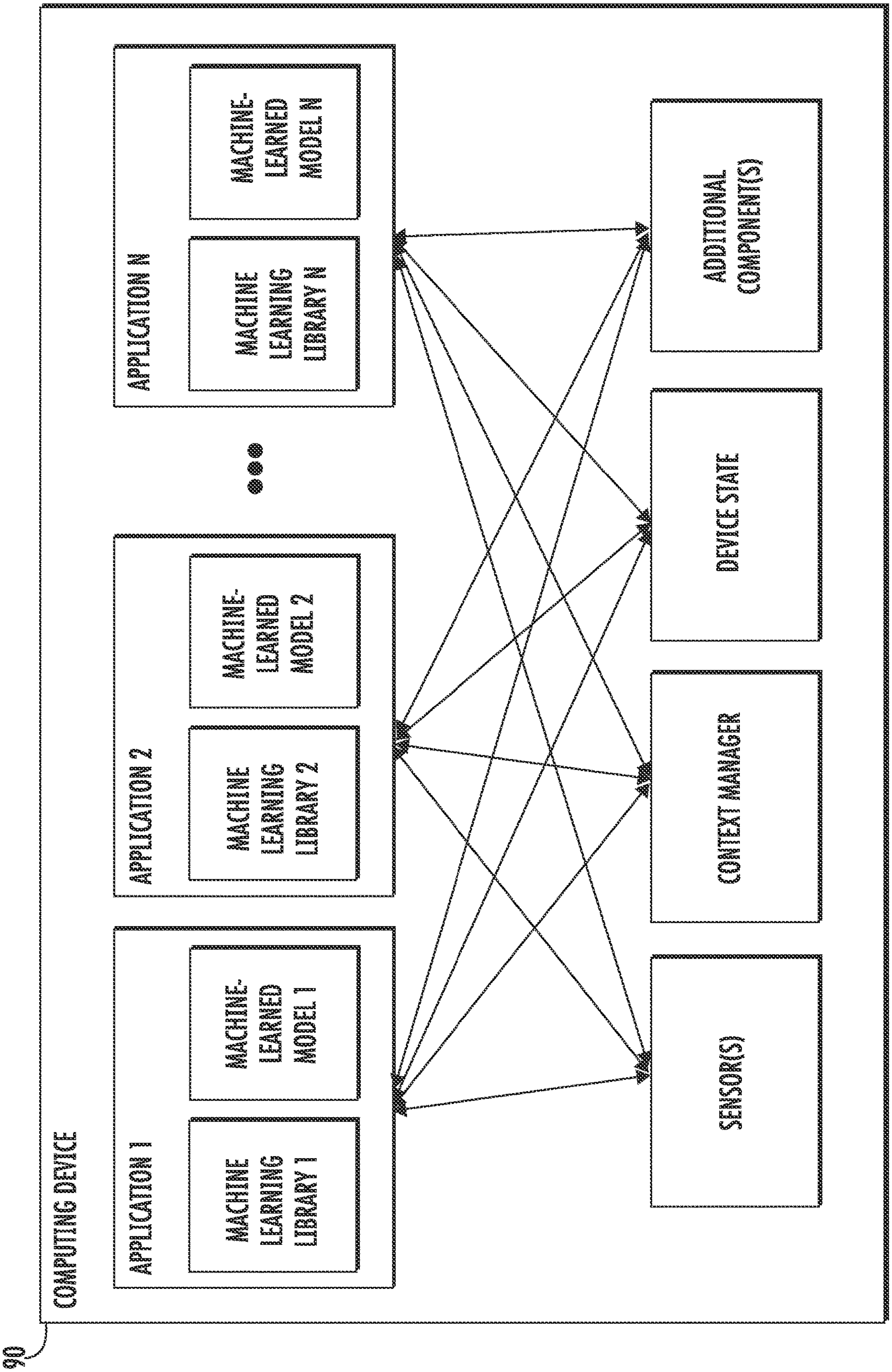
FIG. 21B depicts a block diagram of an example computing system that performs domain-specific content item generation according to example embodiments of the present disclosure.

FIG. 21B depicts a block diagram of an example computing device 90 that performs according to example embodiments of the present disclosure. The computing device 90 can be a user computing device or a server computing device.

The computing device 90 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 21B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 21C:
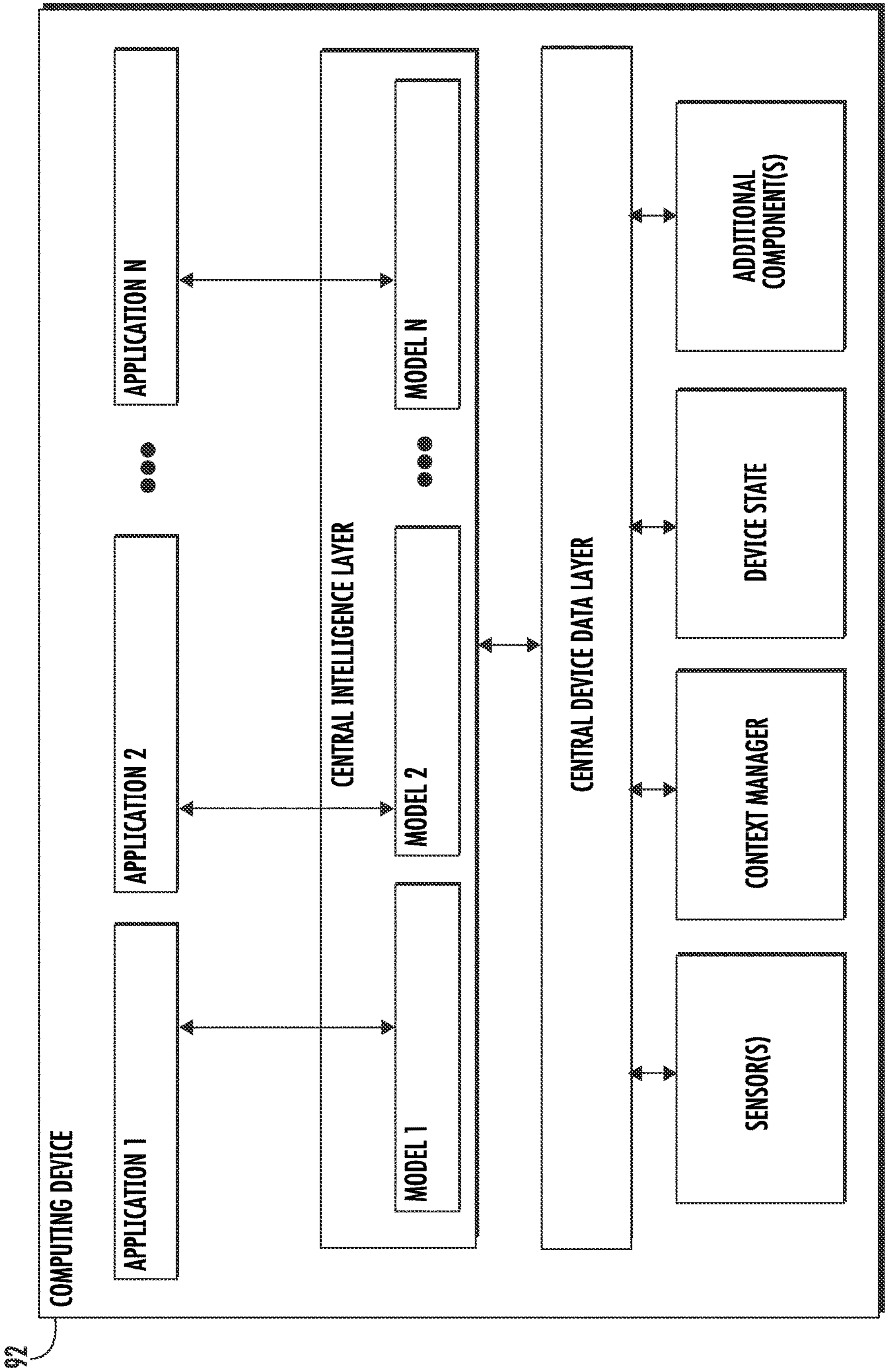
FIG. 21C depicts a block diagram of an example computing system that performs domain-specific content item generation according to example embodiments of the present disclosure.

FIG. 21C depicts a block diagram of an example computing device 92 that performs according to example embodiments of the present disclosure. The computing device 92 can be a user computing device or a server computing device.

The computing device 92 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 21C, a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing device 92.

The central intelligence layer can communicate with a central device data layer. The central device data layer can be a centralized repository of data for the computing device 92. As illustrated in FIG. 21C, the central device data layer can communicate with a number of other components of the computing device, such as, for example, one or more sensors, a context manager, a device state component, and/or additional components. In some implementations, the central device data layer can communicate with each device component using an API (e.g., a private API).

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computing system for machine-learned model content generation, the system comprising:

one or more processors; and one or more non-transitory computer-readable media that collectively store instructions that, when executed by the one or more processors, cause the computing system to perform operations, the operations comprising:

obtaining input data, wherein the input data comprises source content that comprises a set of details associated with a particular topic, wherein the source content comprises a press release and one or more interviews associated with the particular topic;

processing the input data with a generative model to generate a plurality of candidate model-generated news article drafts, wherein the plurality of candidate model-generated news article drafts are generated based on the source content, and wherein the generative model was tuned on a domain-specific training dataset comprising a plurality of news articles, wherein the plurality of news articles comprise a particular information structure and a particular set of publication type-specific stylistic characteristics, and wherein each of the plurality of candidate model-generated outputs comprises content associated with the particular topic;

evaluating, based on a plurality of signals, the plurality of candidate model-generated news article drafts to generate a plurality of respective evaluation datasets, wherein each of the plurality of respective evaluation datasets is associated with a respective candidate model-generated news article draft of the plurality of candidate model-generated news article drafts;

selecting a particular candidate model-generated news article draft of the plurality of candidate model-generated news article drafts based on the plurality of respective evaluation datasets; and providing the particular candidate model-generated news article draft as output.

2. The system of claim 1, wherein the operations further comprise:

processing the input data to determine one or more particular generative models of a plurality of candidate generative models to process the source content with to generate the plurality of candidate model-generated news article drafts; and wherein the generative model comprises the one or more particular generative models.

3. The system of claim 2, wherein the plurality of candidate generative models comprise one or more generative language models and one or more image generation models.

4. The system of claim 2, wherein processing the input data to determine the one or more particular generative models of a plurality of candidate generative models comprises:

determining a particular task associated with the input data; and determining the one or more particular generative models of a plurality of candidate generative models are associated with the particular task.

5. The system of claim 1, wherein selecting the particular candidate model-generated news article draft of the plurality of candidate model-generated news article drafts based on the plurality of respective evaluation datasets comprises:

Filtering, based on the plurality of respective evaluation datasets, the plurality of candidate model-generated news article drafts based on a plurality of thresholds associated with the plurality of signals.

6. The system of claim 1, wherein selecting the particular candidate model-generated news article drafts of the plurality of candidate model-generated news article drafts based on the plurality of respective evaluation datasets comprises:

comparing the plurality of respective evaluation datasets associated with the plurality of candidate model-generated news article drafts to generate a respective ranking for each of the plurality of candidate model-generated news article drafts; and selecting the particular candidate model-generated news article draft of the plurality of candidate model-generated news article drafts based on the respective rankings.

7. The system of claim 1, wherein the operations further comprise:

processing the particular candidate model-generated news article draft with the generative model to generate an outline of the particular candidate model-generated news article draft; and providing the outline of the particular candidate model-generated news article draft for display.

8. The system of claim 7, wherein the operations further comprise:

obtaining an augmentation input associated with a request to augment the outline of the particular candidate model-generated news article draft;

generating an augmented outline based on the augmentation input and the outline of the particular candidate model-generated news article draft; and providing the augmented outline for display.

9. The system of claim 8, wherein the operations further comprise:

processing the augmented outline with the generative model to generate an updated model-generated output, wherein the updated model-generated output comprises an updated model-generated news article draft; and providing the updated model-generated output for display.

10. The system of claim 9, wherein the augmentation input adjusts a structure and one or more topic points of the outline of the particular candidate model-generated news article draft, wherein the updated model-generated output and the particular candidate model-generated news article draft comprises different structures, and wherein the updated model-generated output comprises one or more additional sections associated with one or more additional topic points compared to the particular candidate model-generated news article draft.

11. A computer-implemented method, the method comprising:

obtaining, by a computing system comprising one or more processors, input data, wherein the input data comprises source content that comprises a set of details associated with a topic;

processing, by the computing system, the input data with a generative model to generate a plurality of candidate model-generated outputs, wherein the plurality of candidate model-generated outputs comprises a plurality of candidate model-generated news articles, wherein the plurality of candidate model-generated outputs are generated based on the source content, and wherein the generative model was tuned on a domain-specific training dataset associated with journalism, wherein the domain-specific training dataset comprises a plurality of news articles comprising a particular information structure and a particular set of publication type-specific stylistic characteristics;

evaluating, by the computing system and based on a plurality of signals, the plurality of candidate model-generated outputs to generate a plurality of respective evaluation datasets, wherein each of the plurality of respective evaluation datasets is associated with a respective candidate model-generated output of the plurality of respective evaluation datasets, wherein the plurality of signals comprises an attribution signal, wherein each of the plurality of respective evaluation datasets comprises an attribution metric descriptive of a level of attribution a respective candidate model generated output has, and wherein the level of attribution is determined based on determining a quality of attributions in the respective candidate model generated output associated with whether attributions are correctly included and whether the attributions cite a correct source;

determining, by the computing system and based on the plurality of respective evaluation datasets, a subset of the plurality of candidate model-generated outputs are associated with a subset of respective evaluation datasets that meet one or more signal thresholds; and determining, by the computing system, a particular candidate model-generated output of the subset of the plurality of candidate model-generated outputs to provide as an output based on the subset of respective evaluation datasets.

12. The method of claim 11, wherein the source content comprises a press release and one or more interviews associated with a particular topic, and wherein each of the plurality of candidate model-generated outputs comprises content associated with the particular topic.

13. The method of claim 12, wherein the plurality of candidate model-generated outputs comprise at least a subset of the set of details from the press release.

14. The method of claim 11, wherein the plurality of signals comprises a grounding signal, wherein each of the plurality of respective evaluation datasets comprises a grounding metric descriptive of a level of factual grounding a respective candidate model generated output has, and wherein the level of factual grounding is determined based on cross checking facts in the respective candidate model-generated output to facts in the source content.

15. The method of claim 11, wherein the plurality of signals comprises a verbatim signal, wherein each of the plurality of respective evaluation datasets comprises a verbatim metric descriptive of a level of verbatim matching a respective candidate model generated output has with the source content.

16. One or more non-transitory computer-readable media that collectively store instructions that, when executed by one or more computing devices, cause the one or more computing devices to perform operations, the operations comprising:

obtaining input data, wherein the input data comprises source content that comprises a set of details associated with a topic, wherein the source content comprises a press release and one or more interview transcripts;

processing the input data with a generative model to generate a plurality of candidate model-generated outputs, wherein the plurality of candidate model-generated outputs are generated based on the source content, wherein the plurality of candidate model-generated outputs comprises a plurality of candidate model-generated news articles, and wherein the generative model was tuned on a domain-specific training dataset associated with a particular field of expertise, wherein the generative model comprises a pre-trained generative model that was tuned on the domain-specific training dataset after an initial training;

evaluating, based on a plurality of signals, the plurality of candidate model-generated outputs to generate a plurality of respective evaluation datasets, wherein each of the plurality of respective evaluation datasets is associated with a respective candidate model-generated output of the plurality of respective evaluation datasets;

selecting a particular candidate model-generated output of the plurality of candidate model-generated outputs based on the plurality of respective evaluation datasets, wherein the particular candidate model-generated output comprises a particular model-generated news article of the plurality of candidate model-generated news articles;

processing the particular candidate model-generated output with the generative model to generate a model-generated outline descriptive of a structure and content within the particular candidate model-generated output; and providing the model-generated outline as output.

17. The one or more non-transitory computer-readable media of claim 16, wherein an application programming interface:

transmits the source content to the generative model;

obtains the plurality of candidate model-generated outputs;

transmits the plurality of candidate model-generated outputs to a ranking engine;

obtains the particular candidate model-generated output; and transmits the particular candidate model-generated output to the generative model to generate the model-generated outline.

18. The one or more non-transitory computer-readable media of claim 16, wherein processing the input data with the generative model to generate the plurality of candidate model-generated outputs comprises:

obtaining a set of tunable parameters associated with a particular user, wherein the set of tunable parameters were tuned on a plurality of user-generated content items; and processing the input data and the set of tunable parameters with the generative model to generate the plurality of candidate model-generated outputs.

* * * * *